(12) United States Patent
Kamiya et al.

(10) Patent No.: US 10,782,597 B2
(45) Date of Patent: Sep. 22, 2020

(54) IMAGE CAPTURING APPARATUS AND ACCESSORIES

(71) Applicant: CANON KABUSHIKI KAISHA, Tokyo (JP)

(72) Inventors: Jun Kamiya, Kawasaki (JP); Yasuyuki Watazawa, Tokyo (JP); Naoto Fujihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/992,742

(22) Filed: May 30, 2018

(65) Prior Publication Data
US 2018/0348608 A1   Dec. 6, 2018

(30) Foreign Application Priority Data
May 31, 2017 (JP) ................... 2017-108275

(51) Int. Cl.
*G03B 17/56* (2006.01)
*G03B 17/14* (2006.01)
(Continued)

(52) U.S. Cl.
CPC ............ *G03B 17/565* (2013.01); *G03B 7/20* (2013.01); *G03B 17/14* (2013.01); *G03B 17/18* (2013.01);
(Continued)

(58) Field of Classification Search
USPC ....................................... 396/532
See application file for complete search history.

(56) References Cited

U.S. PATENT DOCUMENTS 4,853,725 A   8/1989   Matsuda
4,922,283 A   5/1990   Fukui
(Continued)

FOREIGN PATENT DOCUMENTS

CN   1716715 A   1/2006
CN   102630308 A   8/2012
(Continued)

OTHER PUBLICATIONS

Wikipedia; Canon EF Lens Mount;URL: https://en.wikipedia.org/w/index.php?title=Canon_EF_lens_mount&oldid=775031532; pp. 1-19.

*Primary Examiner* — Clayton E. LaBalle
*Assistant Examiner* — Dennis Hancock
(74) *Attorney, Agent, or Firm* — Canon U.S.A., Inc. IP Division

(57) ABSTRACT

There are provided a plurality of terminals disposed in a circumferential direction of a second mount of an image capturing apparatus. The plurality of terminals correspond to a plurality of terminals disposed in a circumferential direction of a first mount of an accessory. The plurality of terminals of the image capturing apparatus include a first terminal used to supply power for driving an internal component of the accessory, and a second terminal used to supply power for controlling communication with the accessory. The first and second terminals are disposed further in a mount direction of the accessory than the other terminals of the image capturing apparatus on a predetermined stage of the terminal holder. An inter-terminal pitch between the first and second terminals is wider than at least one pitch among inter-terminal pitches of the other terminals.

32 Claims, 27 Drawing Sheets

(51) Int. Cl.
  *G03B 7/20* (2006.01)
  *G03B 17/18* (2006.01)
  *H04N 5/232* (2006.01)
  *H04N 5/225* (2006.01)
  *H01R 13/24* (2006.01)

(52) U.S. Cl.
  CPC ....... *G03B 17/566* (2013.01); *H01R 13/2471* (2013.01); *H04N 5/2254* (2013.01); *H04N 5/23209* (2013.01); *G03B 2206/00* (2013.01)

(56) References Cited

U.S. PATENT DOCUMENTS

| | | | |
|---|---|---|---|
| 4,924,249 A * | 5/1990 | Aihara | G03B 17/14 396/303 |
| 4,970,558 A | 11/1990 | Matsuda | |
| 4,999,659 A | 3/1991 | Fukahori | |
| 5,021,812 A * | 6/1991 | Kohno | G03B 17/14 348/372 |
| 5,060,005 A | 10/1991 | Itoh | |
| 5,079,578 A | 1/1992 | Kohno | |
| 5,185,622 A | 2/1993 | Yoshibe | |
| 5,359,379 A | 10/1994 | Kohno | |
| 5,404,190 A | 4/1995 | Kohno | |
| 5,613,171 A | 3/1997 | Aihara | |
| 5,889,555 A | 3/1999 | Kawase | |
| 7,599,617 B2 * | 10/2009 | Tokiwa | G03B 17/14 396/529 |
| 8,342,760 B2 | 1/2013 | Imafuji | |
| 8,405,734 B2 | 3/2013 | Misawa | |
| 8,714,844 B2 | 5/2014 | Oikawa | |
| 8,746,996 B2 | 6/2014 | Imafuji | |
| 9,041,855 B2 | 5/2015 | Imamura | |
| 9,357,100 B2 | 5/2016 | Okada et al. | |
| 9,453,984 B2 | 9/2016 | Hasegawa | |
| 2002/0118972 A1 | 8/2002 | Uenaka | |
| 2004/0046890 A1 | 3/2004 | Kikuchi | |
| 2006/0159445 A1 | 7/2006 | Ono et al. | |
| 2007/0077063 A1 | 4/2007 | Tokiwa | |
| 2007/0140681 A1 | 6/2007 | Tanaka | |
| 2007/0248356 A1 | 10/2007 | Toji | |
| 2009/0269049 A1 | 10/2009 | Ueda | |
| 2010/0091175 A1 | 4/2010 | Shintani | |
| 2011/0229118 A1 | 9/2011 | Imafuji | |
| 2012/0063016 A1 | 3/2012 | Imafuji | |
| 2012/0201532 A1 | 8/2012 | Hasuda | |
| 2013/0028590 A1 | 1/2013 | Hasuda | |
| 2013/0077952 A1 | 3/2013 | Sugiyama | |
| 2013/0077954 A1 | 3/2013 | Oikawa | |
| 2013/0077956 A1 | 3/2013 | Imafuji | |
| 2013/0265657 A1 | 10/2013 | Hasegawa | |
| 2013/0266303 A1 * | 10/2013 | Nishio | G03B 17/565 396/532 |
| 2013/0287388 A1 | 10/2013 | Nishio | |
| 2014/0022411 A1 | 1/2014 | Kano | |
| 2014/0022418 A1 | 1/2014 | Kano | |
| 2014/0229998 A1 | 8/2014 | Oh | |
| 2015/0116592 A1 | 4/2015 | Suzuki | |
| 2015/0346455 A1 | 12/2015 | Hasegawa | |
| 2018/0107098 A1 | 4/2018 | Ifuku | |
| 2018/0352140 A1 | 12/2018 | Tsukamoto | |

FOREIGN PATENT DOCUMENTS

| | | | |
|---|---|---|---|
| CN | 102650803 A | 8/2012 | |
| CN | 102970465 A | 3/2013 | |
| CN | 103018875 A | 4/2013 | |
| CN | 103019006 A | 4/2013 | |
| CN | 103019008 A | 4/2013 | |
| CN | 103365040 A | 10/2013 | |
| CN | 103365042 A | 10/2013 | |
| CN | 103365045 A | 10/2013 | |
| CN | 103685970 A | 3/2014 | |
| CN | 103959161 A | 7/2014 | |
| CN | 104204939 A | 12/2014 | |
| CN | 104954646 A | 9/2015 | |
| CN | 105190430 A | 12/2015 | |
| CN | 208424539 U | 1/2019 | |
| EP | 0372459 A2 | 6/1990 | |
| EP | 2648041 A2 | 10/2013 | |
| JP | H02-103522 A | 4/1990 | |
| JP | 4245872 A | 9/1992 | |
| JP | 3082951 B2 | 9/2000 | |
| JP | 2003015011 A | 1/2003 | |
| JP | 2007-101656 A | 4/2007 | |
| JP | 4343333 B2 | 10/2009 | |
| JP | 2010-282101 A | 12/2010 | |
| JP | 2012078770 A | 4/2012 | |
| JP | 2012-154967 A | 8/2012 | |
| JP | 2013-064867 A | 4/2013 | |
| JP | 2013172195 A | 9/2013 | |
| JP | 2013214009 A | 10/2013 | |
| JP | 2013-231949 A | 11/2013 | |
| JP | 2014-022998 A | 2/2014 | |
| JP | 2014038300 A | 2/2014 | |
| JP | 2014056131 A | 3/2014 | |
| JP | 2015-099396 A | 5/2015 | |
| JP | 2015-148720 A | 8/2015 | |
| JP | 201695530 A | 5/2016 | |
| KR | 90006823 A | 5/1990 | |
| KR | 10-2009-0025614 A | 3/2009 | |
| KR | 10-2010-0079704 A | 7/2010 | |
| KR | 10-2013-0104806 A | 9/2013 | |
| WO | 2008/099605 A1 | 8/2008 | |

* cited by examiner

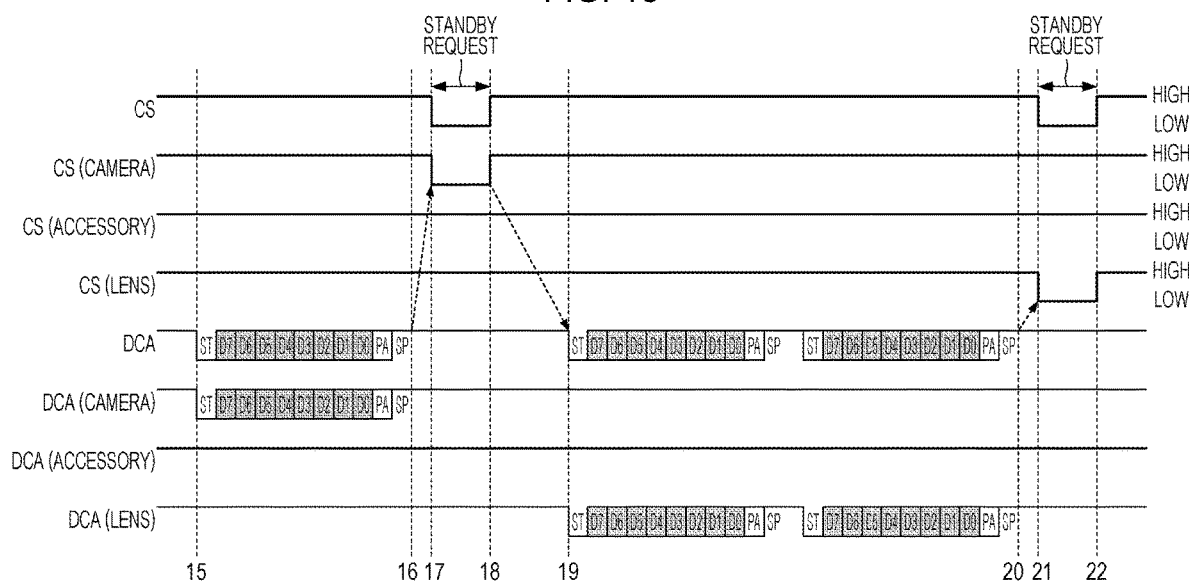

IMAGE CAPTURING APPARATUS AND ACCESSORIES

BACKGROUND OF THE INVENTION

Field of the Invention

The present invention relates to an image capturing apparatus and accessories each including a mount provided with terminals that enable electrical connection to another device.

Description of the Related Art

It is commonly known that an accessory (camera accessory) that can be mounted on and dismounted from an image capturing apparatus is supplied with power from the image capturing apparatus or performs communication to exchange, for example, various commands and data with the image capturing apparatus in a state where the accessory is mounted on the image capturing apparatus. In general, for power supply and communication as described above, a mount portion called a mount of the image capturing apparatus and that of the accessory are each provided with a plurality of terminals, the plurality of terminals of one of the mounts being electrically connected to those of the other mount when coming into contact with those of the other mount. The plurality of terminals may perform communication independently of one another using different communication systems respectively.

For example, Japanese Patent Laid-Open No. 2014-038300 discloses a technique for a terminal arrangement in which, in a case of mounting or dismounting an accessory on or from an image capturing apparatus with a bayonet coupling mechanism, a terminal provided in the image capturing apparatus for detecting mounting of the accessory does not slide on a power-supply-system terminal provided in the accessory.

SUMMARY OF THE INVENTION

An image capturing apparatus according to an aspect of the present invention is an image capturing apparatus including a second mount configured to allow coupling to a first mount included in an accessory, the accessory being mountable on and dismountable from the image capturing apparatus by rotating the first mount relative to the second mount in a circumferential direction of the second mount. The second mount includes a plurality of terminals disposed in a circumferential direction of the second mount and configured to be used in electrical connection, and a terminal holder configured to hold the plurality of terminals. The terminal holder has a height level difference for holding the plurality of terminals at different positions in a center-axis direction of the second mount. The plurality of terminals include a first terminal configured to be used to supply power for driving an internal component of the accessory, and a second terminal configured to be used to supply power for controlling communication with the accessory. Among the plurality of terminals, the first terminal and the second terminal are disposed further in a mount direction of the accessory than the other terminals of the plurality of terminals on a predetermined stage of the terminal holder. An inter-terminal pitch between the first terminal and the second terminal is wider than at least one pitch among inter-terminal pitches of terminals other than the first terminal and the second terminal.

Further features of the present invention will become apparent from the following description of exemplary embodiments with reference to the attached drawings.

BRIEF DESCRIPTION OF THE DRAWINGS

FIG. 15 is a timing chart illustrating P2P (peer-to-peer) communication in third communication.

DESCRIPTION OF THE EMBODIMENTS

Hereinafter, embodiments of the present invention will be described with reference to the drawings. Each of the embodiments of the present invention described below can be implemented solely or as a combination of a plurality of the embodiments or features thereof where necessary or where the combination of elements or features from individual embodiments in a single embodiment is beneficial.
Connection System of Image Capturing Apparatus and Camera Accessories An embodiment of the present invention is described below with reference to FIG. 1 through FIG. 22C.

Figure 1:
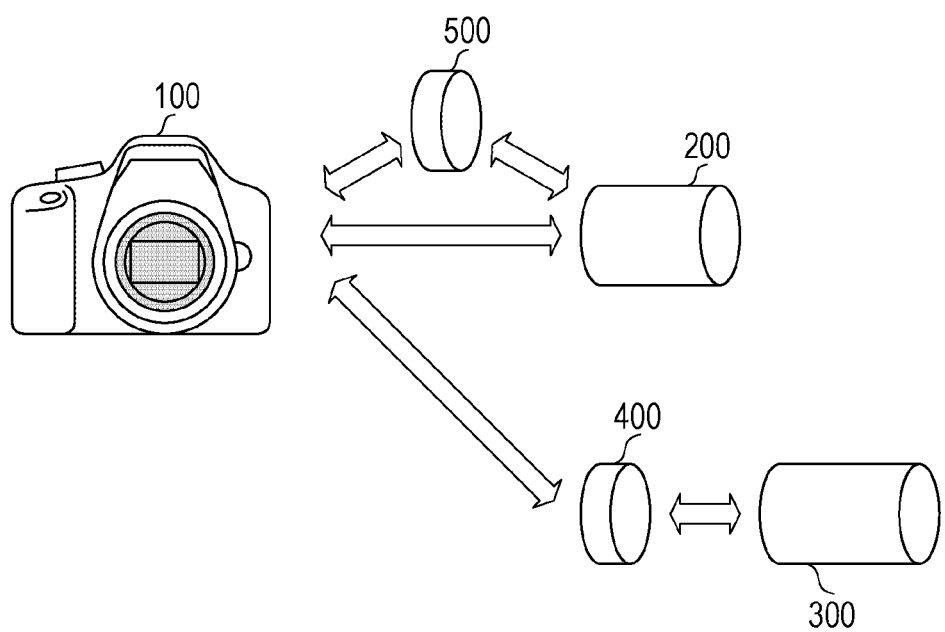
FIG. 1 is a system diagram illustrating types of camera accessories that can be mounted on a camera body.

First, example connections between an image capturing apparatus and camera accessories employing a lens interchange method are described with reference to FIG. 1. FIG. 1 is a system diagram illustrating types of camera accessories that can be mounted on a camera body 100. Examples of camera accessories include an interchangeable lens, an adaptor, and an intermediate accessory each including an accessory mount that can be coupled to a camera mount provided in the image capturing apparatus. Specifically, the accessory mount described above has a plurality of accessory tabs and a plurality of accessory recesses that can engage with a plurality of camera tabs and a plurality of camera recesses sequentially disposed in the camera mount in a circumferential direction substantially orthogonal to the optical axis. The accessory mount in a fitting state where the tabs and recesses of the accessory mount fit into the recesses and tabs of the camera mount can enter an engaging state where the tabs of the accessory mount engage with the tabs of the camera mount in the optical-axis direction. The fitting state is a camera accessory mounting start state described below and the engaging state is a camera accessory mounting (attaching) completion state described below.

Camera accessories that can be connected to the camera body 100 are described with reference to FIG. 1. A first interchangeable lens 200 is one of the camera accessories that can be mounted directly on the camera body 100 and includes a lens mount B, which is an accessory mount that can be directly coupled to a camera mount of the camera body 100 described below. An intermediate accessory 500 is one of the camera accessories that can be mounted directly on the camera body 100 and includes the lens mount B, which is an accessory mount that can be directly coupled to the camera body 100, and a camera mount A, which can be coupled directly to the first interchangeable lens 200. That is, the first interchangeable lens 200 can also be connected to the camera body 100 with the intermediate accessory 500 therebetween.

Further, a second interchangeable lens 300 can be mounted indirectly on the camera body 100 with an adaptor 400 therebetween, which can be mounted directly on the camera body 100. That is, a lens mount D, which is an accessory mount provided in the second interchangeable lens 300, is not capable of being coupled directly to the camera mount A provided in the camera body 100. A camera mount C provided in the adaptor 400 can be coupled directly to (mounted directly on) the lens mount D of the second interchangeable lens 300.

As described above, on the camera body 100, the first interchangeable lens 200, the first interchangeable lens 200 with the intermediate accessory 500 therebetween, and the second interchangeable lens 300 with the adaptor 400 therebetween can be mounted. Hereinafter, in a description common to the first interchangeable lens 200 and the second interchangeable lens 300, the first interchangeable lens 200 and the second interchangeable lens 300 are each simply referred to as an interchangeable lens. Similarly, the adaptor 400 and the intermediate accessory 500 are each simply referred to as an adapter.
Basic Configuration of Camera Body 100 and First Interchangeable Lens 200

Figure 2:
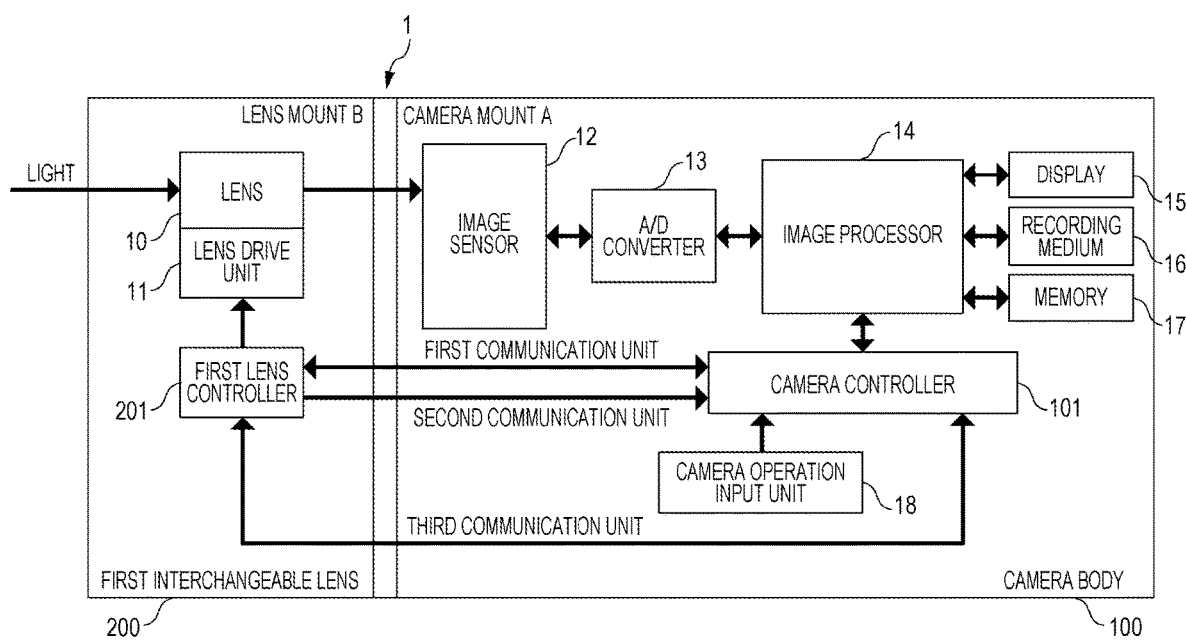
FIG. 2 is a block diagram illustrating a camera system that includes a first interchangeable lens and the camera body to which the first interchangeable lens can be directly coupled.

Next, the basic configuration of the camera body 100 and the first interchangeable lens 200 is described with reference to FIG. 2. FIG. 2 is a block diagram illustrating a camera system that includes the first interchangeable lens 200 and the camera body 100 to (on) which the first interchangeable lens 200 can be directly coupled (mounted). Although, it should be understood that in this embodiment, the image capturing apparatus (for example the camera body 100) and the camera accessory (for example the first interchangeable lens 200) are attachable and detachable from each other. In FIG. 2, a mount provided in the first interchangeable lens 200 and a mount provided in the camera body 100 are collectively referred to as a mount portion 1. The mount provided in the first interchangeable lens 200 and the mount provided in the camera body 100 will be described in detail below.

The camera body 100 is an image capturing apparatus, typically, a digital camera. As illustrated in FIG. 2, the camera body 100 includes a charge-storage-type solid-state image sensor (hereinafter simply referred to as an image sensor) 12, which photoelectrically converts an optical image of an object formed by a lens 10 provided within the first interchangeable lens 200 to output an electrical signal. The camera body 100 further includes an A/D converter 13, which converts an analog electrical signal output from the image sensor 12 to a digital signal, and an image processor 14, which performs various types of image processing on the digital signal to generate an image signal. The image signal (still image or moving image) generated by the image processor 14 can be displayed on a display 15 and recorded to a recording medium 16.

The camera body 100 further includes a memory 17, which functions as a buffer used when an image signal is processed and which stores an operation program used by a camera controller 101 described below.

The camera body 100 further includes a camera operation input unit 18, which includes a power switch for turning on and off the power, an image capture switch (release switch) for starting recording of an image signal, and a selection/setting switch for setting in various menus. The camera body 100 further includes the camera controller 101, which includes a microprocessor (CPU) that centrally controls operations of the camera body 100 and camera accessories that can be mounted on the camera body 100. For example, the camera controller 101 performs various types of setting on the basis of signals input from the camera operation input unit 18 or controls communication with a first lens controller 201 included in the first interchangeable lens 200 via the mount portion 1.

The first interchangeable lens 200 includes the lens 10, which is constituted by optical members including a group of a plurality of lenses, such as a zoom lens, a shift lens, and a focus lens, and a light amount adjusting member, such as a diaphragm. The first interchangeable lens 200 further includes a lens drive unit 11. The lens drive unit 11 includes an actuator that moves the optical members, namely, the group of a plurality of lenses and the diaphragm, or makes the optical members operate, and drives the actuator. The first interchangeable lens 200 further includes the first lens controller 201, which includes a lens microprocessor (LCPU) that centrally controls operations of the first interchangeable lens 200. For example, the first lens controller 201 controls communication with the camera controller 101 via the mount portion 1 or controls the lens drive unit 11.

Basic Configuration of Electrical Terminals

Figure 3:
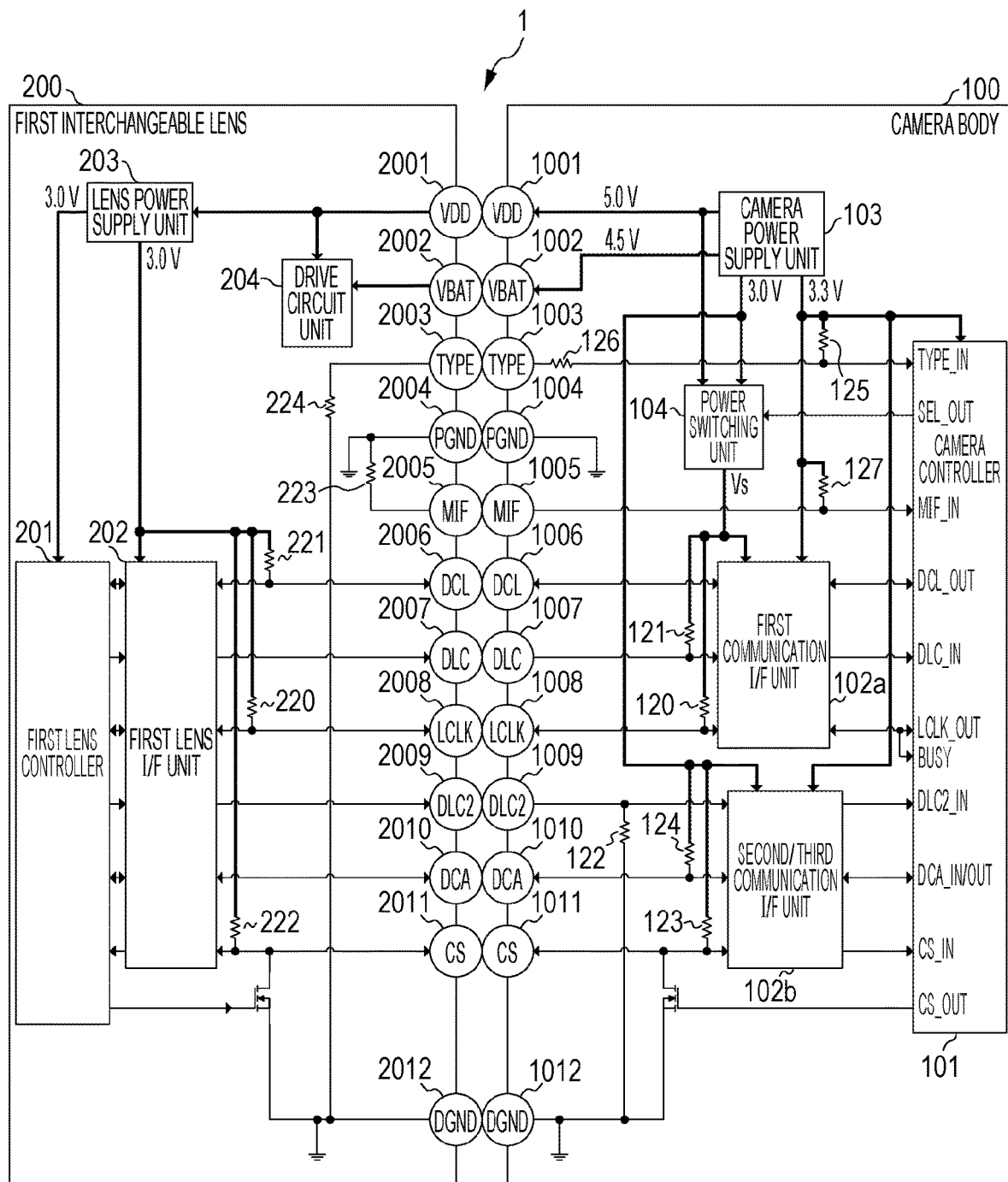
FIG. 3 is a block diagram illustrating the internal configuration of the first interchangeable lens and that of the camera body in a state where the first interchangeable lens is connected to the camera body.

Now, the internal configuration of the camera in a state where the camera body 100 and the first interchangeable lens 200 are connected to each other is described with reference to FIG. 3. FIG. 3 is a block diagram illustrating the internal configuration of the first interchangeable lens 200 and that of the camera body 100 in a state where the first interchangeable lens 200 is connected to the camera body 100. The camera mount and the lens mount each include a lock mechanism, a mount holding mechanism, and a plurality of electrical terminals. The details of these mounts will be described below.

Figure 4A:
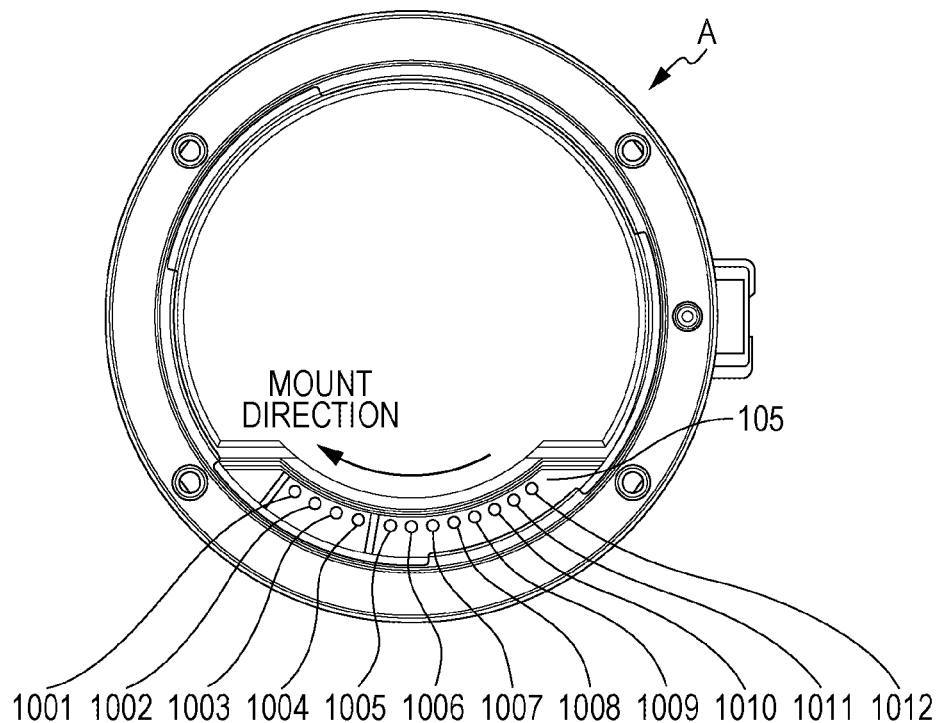
FIGS. 4A and 4B are diagrams illustrating the structure of a camera mount and that of a lens mount.
Figure 4B:
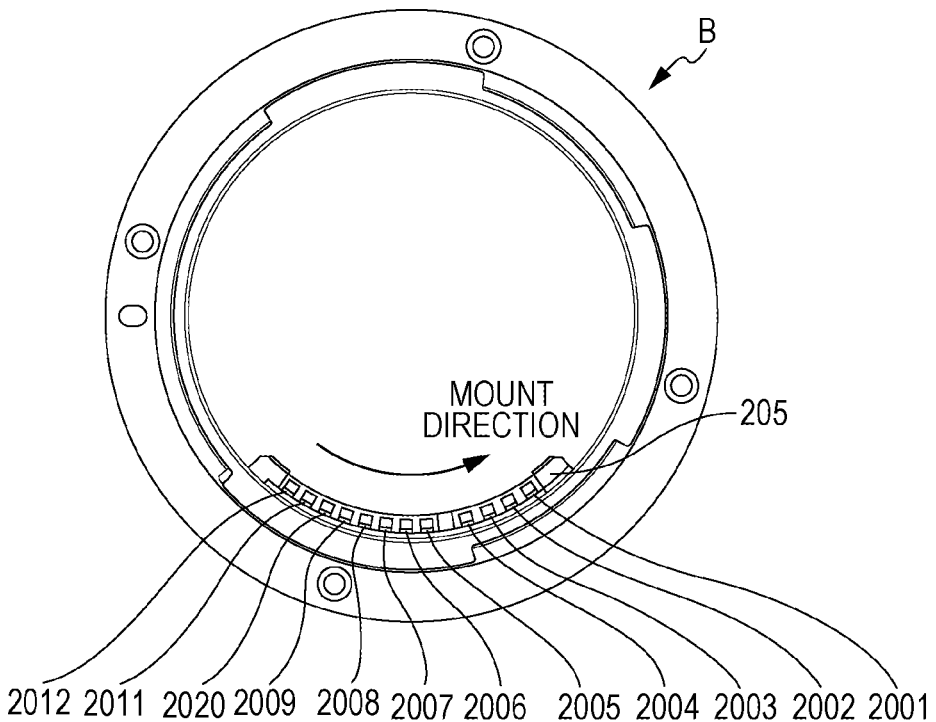

As illustrated in FIG. 3, the mount portion 1 includes a plurality of terminals that enable electrical connection between the camera body 100 and the first interchangeable lens 200. The plurality of terminals in the camera body 100 (camera-side terminals) are exposed outside the camera body 100 as a plurality of electrical contact pins provided on a contact holding member 105, which corresponds to a terminal holder of the camera mount A having a ring shape, as illustrated in FIG. 4A. The plurality of terminals in the first interchangeable lens 200 (accessory-side terminals) are exposed outside the first interchangeable lens 200 as a plurality of electrical contact faces provided on a contact face holding member 205, which corresponds to a terminal holder of the lens mount B having a ring shape, as illustrated in FIG. 4B. In a state where the first interchangeable lens 200 is mounted on the camera body 100, each contact among the electrical contact pins of the camera body 100 is electrically connected to a corresponding contact among the electrical contact faces of the first interchangeable lens 200.

The mounts each have a height level difference in the optical-axis (the center axis of the mount) direction so that the position at which corresponding terminals, among the plurality of terminals formed on each mount, come into contact with each other differs in the optical-axis direction of the mounts as described below. The plurality of terminals are formed into a unit as a single component, and the terminals in each mount is connected to a flexible printed board as a single wiring unit.

Figure 18:
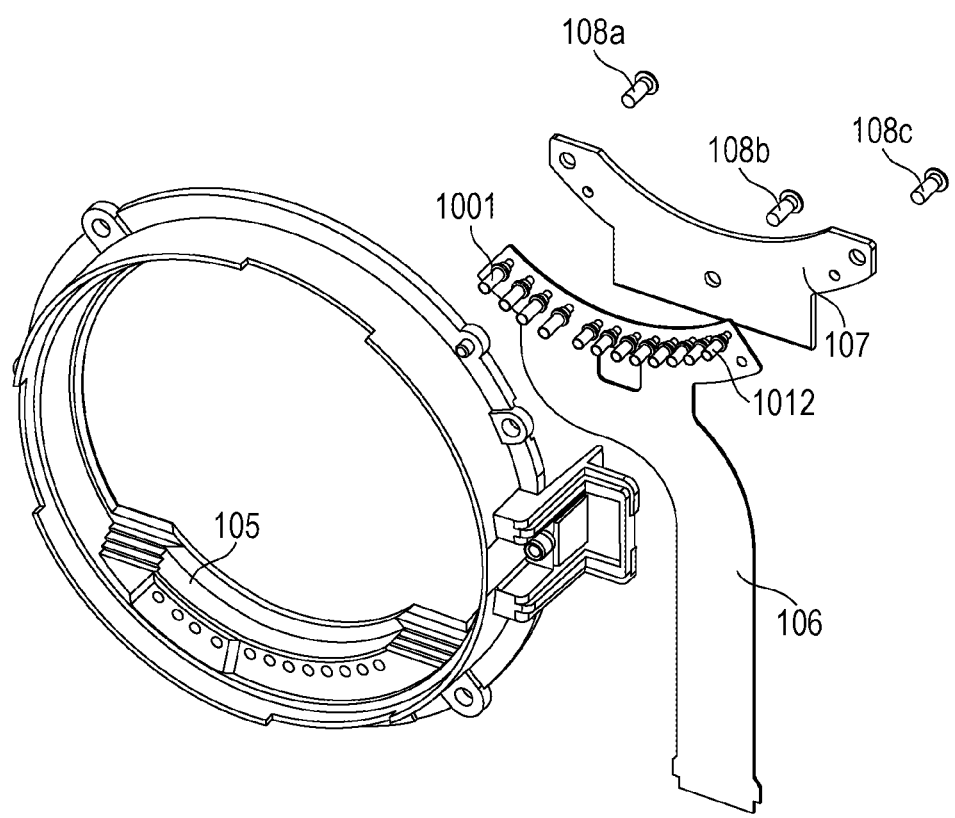
FIG. 18 is a diagram illustrating the internal structure of a camera mount of the camera body.

FIG. 18 is a diagram illustrating the internal structure of the camera mount A of the camera body 100. For example, the terminals are electrically connected to one another via a single flexible printed board 106, as illustrated in FIG. 18, and are connected to an internal board (not illustrated) provided within the camera body 100. At positions, in the contact holding member 105, where the terminals are held, a plurality of holes through which the terminals can be inserted are provided, and terminals 1001 to 1012, which are the camera-side terminals, are inserted into the plurality of holes respectively. In this state, a retaining plate 107 retains the terminals on an object side in the optical-axis direction (on a mount contact surface side), and screws 108a, 108b, and 108c, which pass through the through holes of the retaining plate 107, are tightened into the contact holding member 105.

In this embodiment, the single-unit structure of the camera mount A in the camera body 100 has been described. In the other mounts described below, at least the same structure in which a plurality of terminals are electrically connected to a single flexible printed board (wiring) is employed.

In this structure, the terminals can be collectively disposed at positions away from an aperture provided in front of the image sensor 12 unlike a case where a group of terminals of each mount is divided into a plurality of units and interspersed in the circumferential direction of the mount. Therefore, for example, in a case where unwanted light is incident on the camera mount in a state where a camera accessory is mounted on the camera body 100, an effect of the unwanted light reflected by the terminals formed of a metallic material on image capturing of an object can be reduced. Further, the terminals are formed into a single unit, and therefore, wiring within the image capturing apparatus and the camera accessories becomes less complicated, and the mounts can be easily assembled.

Now, the functions of terminals common to the camera mount A and the lens mount B are described. VDD terminals 1001 and 2001 are power supply terminals for supplying communication control power (VDD), which is communication power used mainly in communication control, from the camera body 100 to a camera accessory (for example, the first interchangeable lens 200). The voltage of the power to be supplied to the first interchangeable lens 200 is set to 5.0 V.

VBAT terminals 1002 and 2002 are power supply terminals for supplying driving power (VBAT), which is driving power used in operations of a mechanical drive unit of the actuator used to drive the diaphragm and the focus lens, from the camera to the camera accessory. In other words, the VBAT terminals 1002 and 2002 are terminals used to supply power other than the communication power. The voltage of the power to be supplied to the first interchangeable lens 200 is set to 4.5 V. The VDD terminals and the VBAT terminals described above are power-supply-system terminals for supplying power from the camera body 100 to a camera accessory. The voltage to be applied to the VBAT terminals may be changeable depending on the type of accessory mounted on the camera body 100, by changing the output setting of a power supply circuit.

DGND terminals 1012 and 2012 are ground terminals corresponding to the communication control power VDD. That is, the DGND terminals 1012 and 2012 are terminals that indicate (the voltage) of a ground level corresponding to the predetermined terminals. In this embodiment, grounding means to set the voltage level of a ground terminal to a level (ground level) substantially equal to the level of the negative pole of a power supply, such as a battery.

PGND terminals 1004 and 2004 are terminals that indicate a ground level corresponding to a terminal of the camera body 100 and that of a mechanical drive system including a motor (actuator) provided in a camera accessory (for example, the first interchangeable lens 200). That is, the PGND terminals are ground terminals corresponding to the driving power VBAT. The DGND terminals and the PGND terminals described above are ground terminals for grounding the power supply system of the camera body 100 and that of a camera accessory to the ground levels.

MIF terminals 1005 and 2005 are terminals for detecting mounting of a camera accessory (for example, the first interchangeable lens 200) on the camera body 100. The camera controller 101 detects a voltage level indicated by the MIF terminals to detect mounting or removal of a camera accessory on or from the camera body 100. After the camera controller 101 has detected, for example, mounting of a camera accessory as a result of the detection, the camera controller 101 performs control to start supplying power to the power-supply-system terminals and to start communication between the camera body 100 and the camera accessory.

TYPE terminals 1003 and 2003 are terminals for determining the type of camera accessory (for example, the first interchangeable lens 200) mounted on the camera body 100. The camera controller 101 detects the voltage value of a signal indicated by the TYPE terminals and determines the type of camera accessory mounted on the camera body 100 on the basis of the value. In the first interchangeable lens 200, the TYPE terminal is pull-down connected to the DGND terminal with a predetermined resistance described below. The resistance differs depending on the type of camera accessory.

Now, terminals for various types of communication between the camera body 100 and a camera accessory are described. A plurality of communication terminals provided in the mount portion 1 are divided into a plurality of communication systems (groups), and the communication systems can perform communication independently of each other. In this embodiment, LCLK terminals 1008 and 2008, DCL terminals 1006 and 2006, and DLC terminals 1007 and 2007 constitute a first communication unit performing first communication. DLC2 terminals 1009 and 2009 constitute a second communication unit performing second communication independent of the first communication unit. CS terminals 1011 and 2011 and DCA terminals 1010 and 2010 constitute a third communication unit performing third communication independent of the first and second communication units. In this embodiment, the camera controller 101 and the first lens controller 201 can perform the independent first to third communication via the plurality of communication terminals described above.

The LCLK terminals 1008 and 2008 are terminals of the first communication unit. The LCLK terminals 1008 and 2008 are terminals for a communication clock signal output from the camera body 100 to the camera accessory and are terminals for the camera body 100 to monitor the busy state of the accessory.

The DCL terminals 1006 and 2006 are terminals of the first communication unit and are communication data terminals for two-way communication between the camera body 100 and the camera accessory.

The DLC terminals 1007 and 2007 are terminals of the first communication unit and are terminals for communication data output from the camera accessory (for example, the first interchangeable lens 200) to the camera body 100.

The signal output system of the above-described LCLK terminals, DCL terminals, and DLC terminals corresponding to the first communication unit can be switched between a complementary metal oxide semiconductor (CMOS) output type and an open type. The CMOS output type in this embodiment is a type in which switch output is present for both H (High) and L (Low) indicated by a voltage. The open type is a type in which switch output is present on only the L side. The open type in this embodiment is an open drain type but may be an open collector type.

The DLC2 terminals 1009 and 2009 are terminals of the second communication unit and are terminals for communication data output from the camera accessory (for example, the first interchangeable lens 200) to the camera body 100.

The DCA terminals 1010 and 2010 are terminals of the third communication unit and are communication data terminals for two-way communication between the camera body 100 and the camera accessory (for example, the first interchangeable lens 200).

The CS terminals 1011 and 2011 are terminals of the third communication unit and are signal terminals for requesting communication between the camera body 100 and the camera accessory (for example, the first interchangeable lens 200). In this embodiment, in a case where the first interchangeable lens 200 is mounted on the camera body 100, the communication voltage at the terminals corresponding to the first to third communication units is set to 3.0 V.

Structure of Mount Portion 1

Figure 5A:
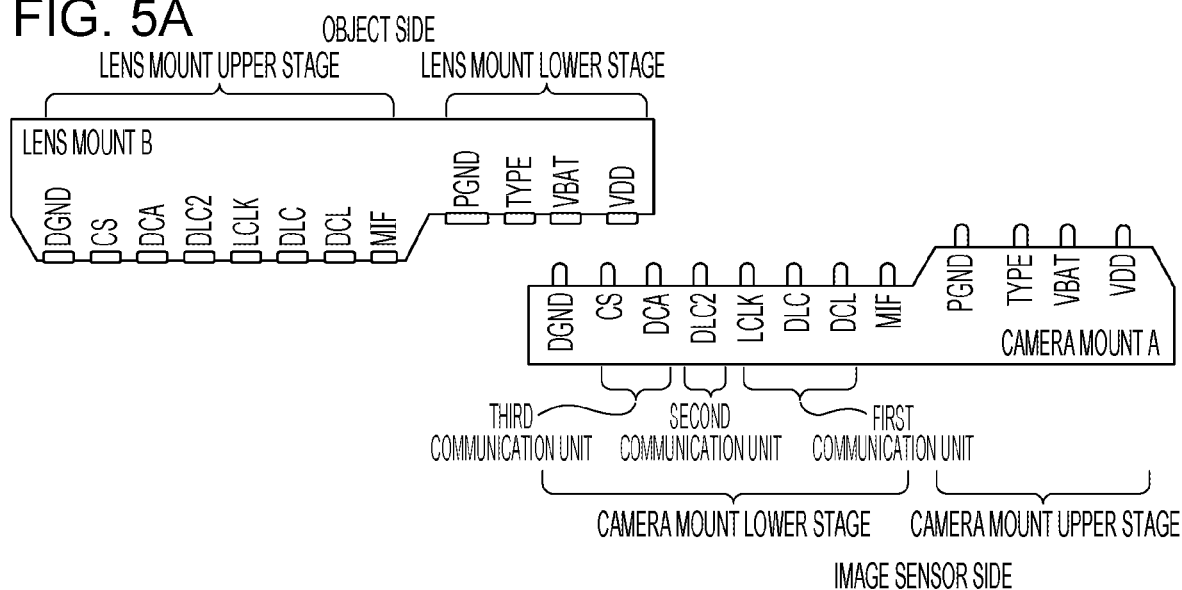
FIGS. 5A to 5C are diagrams each illustrating the state of connection between terminals in a case of rotating a camera mount and a lens mount relative to each other.
Figure 5B:
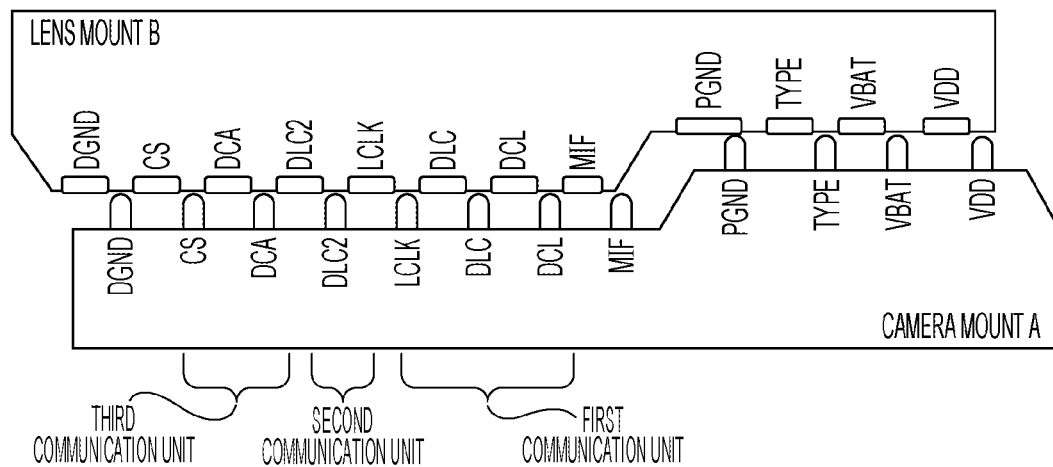
Figure 5C:
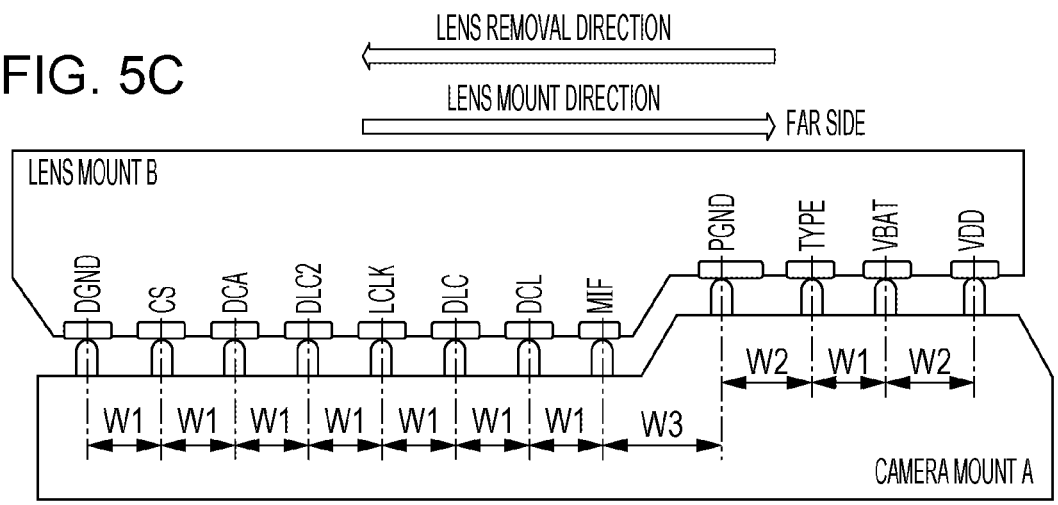

Now, the structure of the mount portion 1 including the camera mount A and the lens mount B is described with reference to FIGS. 4A and 4B and FIGS. 5A to 5C. FIGS. 4A and 4B are diagrams illustrating the structure of the camera mount A and that of the lens mount B. FIG. 4A is a front view of the camera mount A provided on the camera body 100, and FIG. 4B is a front view of the lens mount B provided on the first interchangeable lens 200. FIGS. 5A to 5C are diagrams each illustrating the state of connection between terminals in a case of rotating the camera mount A and the lens mount B relative to each other. FIG. 5A illustrates a mounting-start state of the camera mount A and the lens mount B, FIG. 5B illustrates a mounting-intermediate state of the camera mount A and the lens mount B, and FIG. 5C illustrates a mounting-completion state of the camera mount A and the lens mount B. FIGS. 5A to 5C illustrate states where the terminals provided on the mounts are viewed in a direction orthogonal to the optical axis of the camera mount A and the lens mount B. The optical axis described above is parallel to a center axis that passes through the center of the opening of the camera mount A and that of the lens mount B.

The state illustrated in FIG. 5A is a state where a plurality of tabs provided in the camera mount A are inserted into a plurality of recesses provided in the lens mount B, and a plurality of tabs provided in the lens mount B are inserted into a plurality of recesses provided in the camera mount A. In this state, the camera mount A and the lens mount B are rotated relative to each other in a lens mount direction (attachable direction). Note that the lens mount direction (mount direction) is orthogonal to the center axis of the camera mount A (or the lens mount B). Then, a transition to a state where the terminals provided on one of the mounts are respectively connected to the corresponding terminals provided on the other mount, as illustrated in FIG. 5C, occurs. In the state illustrated in FIG. 5C, relative rotation of the camera mount A and the lens mount B is stopped by a lock mechanism (not illustrated) that is a rotation stopping member provided in each mount.

Figure 19A:
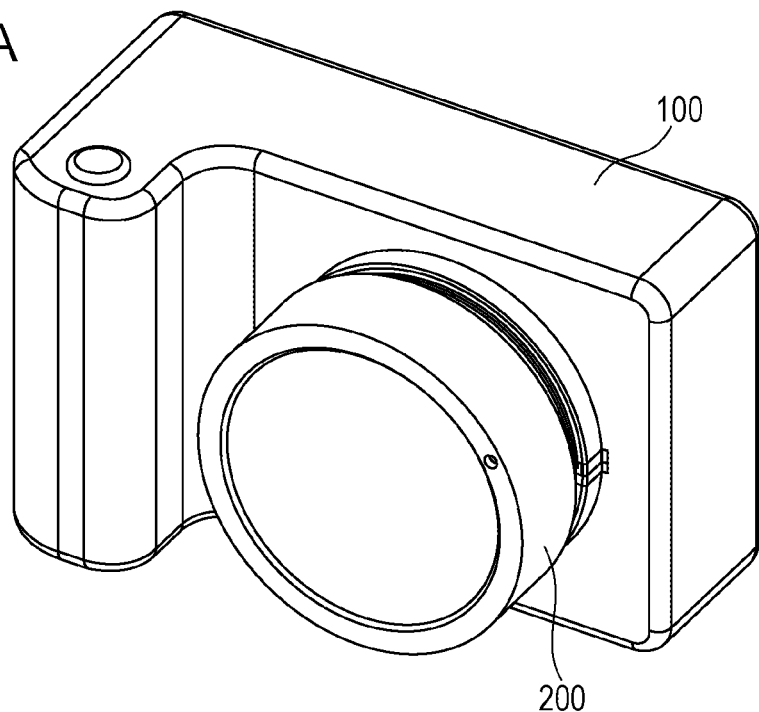
FIGS. 19A and 19B are perspective views and illustrate the external appearance of a camera body and a first interchangeable lens.
Figure 19B:
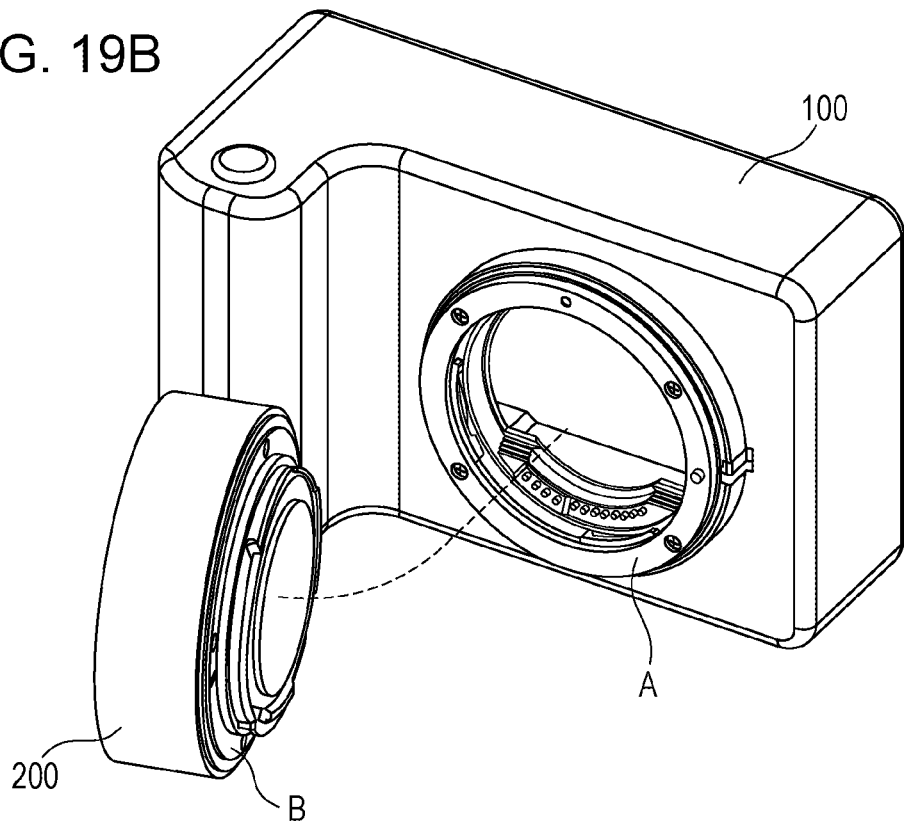

FIGS. 19A and 19B are perspective views and illustrate the external appearance of the camera body 100 and the first interchangeable lens 200. FIG. 19A illustrates a state where the first interchangeable lens 200 is mounted on the camera body 100, and FIG. 19B illustrates a state where the first interchangeable lens 200 is detached from the camera body 100.

As illustrated in FIGS. 19A and 19B, the camera body 100 and the first interchangeable lens 200 respectively include the camera mount A and the lens mount B each having a contact surface parallel to a direction orthogonal to the optical axis. In a state where the reference surface of the camera mount A and that of the lens mount B come into contact with each other, the camera body 100 and the first interchangeable lens 200 can be rotated relative to each other from the mounting-start position to the mounting-completion position described above.

The state illustrated in FIG. 5B is a state between the mounting-start state and the mounting-completion state of the camera mount A and the lens mount B described above, and is a state where only the PGND terminals start being connected to each other prior to connection of the other terminals corresponding to each other, which will be described in detail below.

In this embodiment, a description is given below where the electrical terminals provided on the camera mount are referred to as contact pins and the electrical terminals provided on the lens mount are referred to as contact faces (or contact pieces). Alternatively, the terminals provided on the camera mount may be contact faces, and the terminals provided on the lens mount may be contact pins.

The mount portion 1 according to this embodiment is a two-stage (two-step) mount having a height level difference in the optical-axis direction, as illustrated in FIGS. 4A and 4B and FIGS. 5A to 5C. As illustrated in FIG. 5A, in the camera mount A of the camera body 100, a stage that projects toward the object side is referred to as a camera mount upper stage (second stage), and a stage on the image sensor side is referred to as a camera mount lower stage (first stage). That is, the camera mount upper stage projects toward the object side (or the camera accessory side) in the optical-axis direction further than the camera mount lower stage.

As illustrated in FIG. 5B, in the lens mount B of the first interchangeable lens 200, a stage that is recessed toward the object side is referred to as a lens mount lower stage (second stage), and a stage that projects toward the image sensor side in a state where the lens mount is mounted on the camera mount is referred to as a lens mount upper stage (first stage). That is, in the state where the lens mount is mounted on the camera mount, the lens mount upper stage projects toward the image capturing apparatus side in the optical-axis direction further than the lens mount lower stage. In this structure, the terminals on the camera mount upper stage can come into contact with only the terminals on the lens mount lower stage, and the terminals on the camera mount lower stage can come into contact with only the terminals on the lens mount upper stage. In the camera mount A, the camera mount lower stage is located on the near side in the direction of rotation relative to the lens mount B (the accessory mount direction), and the camera mount upper stage is located on the far side. In the lens mount B, the lens mount upper stage is located on the near side in the direction of rotation relative to the camera mount A (the accessory mount direction), and the lens mount lower stage is located on the far side.

As illustrated in FIG. 5C, the lens mount B rotationally moves (in the right direction in FIG. 5C) relative to the camera mount A while the terminals provided on the lens mount B slide on and come into contact with the terminals provided on the camera mount A. Then, for example, in a state where the first interchangeable lens 200 is completely mounted on the camera body 100, each of the contact pins of the camera mount A and a paired (corresponding) one of the contact faces of the lens mount B are electrically connected to each other independently. To simplify a description given below, a state where a terminal of the camera mount A and an electrically paired (corresponding) terminal of the lens mount B are electrically continuous is referred to as connection, and a state where terminals that are not electrically paired (not corresponding to each other) are electrically continuous is referred to as contact.

In this embodiment, a group of a plurality of tabs provided in the camera mount A and those in the lens mount B are bayonet tabs, and the groups of tabs engage with each other in the optical-axis direction with a bayonet coupling mechanism, and mounting (coupling) of the mounts is completed accordingly.

Now, the order in which the terminals of the mount portion 1 are arranged according to this embodiment is described. As illustrated in FIG. 5A, on the camera mount upper stage, the VDD terminal 1001, the VBAT terminal 1002, the TYPE terminal 1003, and the PGND terminal 1004 are arranged sequentially from the far side (trailing end) in the lens mount direction. The far side in the lens mount direction is a side on which a terminal of the camera side that comes into contact with a terminal on the lens side last is located in a case of mounting the first interchangeable lens 200 on the camera body 100. Therefore, on the lens side, the far side in the lens mount direction is a side on which a terminal of the lens side that comes into contact with a terminal on the camera side first is located in a case of mounting the first interchangeable lens 200 on the camera body 100.

On the camera mount lower stage, the MIF terminal 1005, the DCL terminal 1006, the DLC terminal 1007, the LCLK terminal 1008, the DLC2 terminal 1009, the DCA terminal 1010, the CS terminal 1011, and the DGND terminal 1012 are arranged sequentially from the far side in the lens mount direction.

Similarly, on the lens mount lower stage, the VDD terminal 2001, the VBAT terminal 2002, the TYPE terminal 2003, and the PGND terminal 2004 are arranged sequentially from the far side in the lens mount direction. On the lens mount upper stage, the MIF terminal 2005, the DCL terminal 2006, the DLC terminal 2007, the LCLK terminal 2008, the DLC2 terminal 2009, the DCA terminal 2010, the CS terminal 2011, and the DGND terminal 2012 are arranged sequentially from the far side in the lens mount direction.

That is, four terminals are disposed on each of the camera mount upper stage and the lens mount lower stage, and eight terminals are disposed on each of the camera mount lower stage and the lens mount upper stage. The number of terminals (exposed contacts) on the camera mount upper stage and on the lens mount lower stage is smaller than the number of terminals on the camera mount lower stage and the lens mount upper stage.

In a case of rotating the camera mount and the lens mount relative to each other to mount or dismount the camera accessory on or from the image capturing apparatus, as in a bayonet coupling mechanism, terminals provided on one of the mounts slide on terminals provided on the other mount during mounting or dismounting. In general, on a single plane in the optical-axis direction, on the camera mount side, the contact pin present furthest in the lens mount direction does not slide on contact faces on the accessory side that do not correspond to the furthest contact pin when the camera accessory is mounted on or dismounted from the image capturing apparatus. On a single plane in the optical-axis direction, on the lens mount side, the contact face present nearest in the lens mount direction does not slide on contact pins on the camera side that do not correspond to the nearest contact face when the camera accessory is mounted on or dismounted from the image capturing apparatus. Therefore, a contact pin (first contact pin) of the camera mount which is positioned further in the lens mount direction than the other contact pins (e.g. a contact pin located in the furthest lens mount direction) does not contact other contact surfaces of the lens mount, except for a contact surface of the lens mount which contacts the first contact pin when the camera accessory is fully mounted to the image capturing apparatus.

Similarly, a contact surface (first contact surface) of the camera mount which is positioned nearer in the lens mount direction than the other contact surfaces (e.g. a contact surface located in the nearest lens mount direction) does not contact other contact pins of the camera mount, except for a contact pin of the camera mount which contacts the first contact surface when the camera accessory is fully mounted to the image capturing apparatus.

However, terminals other than the above-described terminals wear out as the number of times the lens mount is mounted on and dismounted from the camera mount increases. Specifically, the terminals (contact pins) of the camera mount are movable pins that can be advanced and retreated (projected and retracted) in a direction parallel to the optical-axis, and slide on the terminals (contact faces) of the lens mount at a tip point thereof. Therefore, the contact pins need to be made increasingly durable to sliding.

The above-described issue becomes more noticeable as the number of terminals disposed in a line on a single plane orthogonal to the optical axis increases, and the number of times the contact pins slide on the contact faces increases. As the contact pins and the contact faces wear out, the contact impedance of the terminals increases, and the voltage significantly drops to a level lower than the allowable operating voltage range of an electric circuit. As a result, for example, a malfunction of the interchangeable lens may occur.

Accordingly, in this embodiment, in order to decrease the number of times terminals slide on other terminals, the terminals are held at different positions in the optical-axis direction, namely, on the two stages including the upper stage and the lower stage, and the contact pins on the camera side come into contact with the contact faces on the interchangeable lens side at different heights depending on whether the stage is the upper stage or the lower stage. With this structure, for each stage that holds the terminals, wearing out of the terminals can be reduced.

Further, in this embodiment, for each mount, the number of terminals held on the upper stage is different from the number of terminals held on the lower stage. Therefore, for example, when terminals of high importance among the plurality of terminals are disposed on the stage having a smaller number of terminals, wearing out of the important terminals can be reduced. Specifically, on each of the camera mount upper stage and the lens mount lower stage having a smaller number of terminals, the power-supply-system terminals (the VDD terminal, the VBAT terminal, and the PGND terminal), which are signal terminals in which an increase in the contact impedance is to be suppressed to the largest extent possible, are arranged. On each of the camera mount lower stage and the lens mount upper stage, terminals that are used mainly in communication and are less likely to be affected by an increase in the impedance (than the power-supply-system terminals) are arranged. This structure enables stable power supply to the accessory and contributes to stable operations (for example, focus control) of the camera accessory.

The DGND terminal 1012 of the camera mount A is located on the camera mount lower stage and disposed nearest (leading end) in the lens mount direction, and therefore, is located at the most disadvantageous location in terms of durability to sliding of the contact pins on the camera side. However, in order to protect an electric circuit and an element provided in the camera accessory from, for example, static electricity, the DGND terminal needs to physically connect a metal portion formed in the camera mount to ground. In this embodiment, the DGND terminal is arranged nearest in the lens mount direction so as to facilitate processing performed for the above-described reason.

This embodiment assumes a system in which the level of the value of a current provided to the DGND terminal is lower than that for the PGND terminal. Therefore, in this embodiment, the PGND terminal, for which the level of the value of a current provided to the terminal is higher, is disposed on the camera mount upper stage (and on the lens mount lower stage) on which a smaller number of terminals are disposed and which is advantageous in terms of reducing an increase in the contact impedance.

In the camera mount A according to this embodiment, the two power-supply-system contact pins (the VDD terminal 1001 and the VBAT terminal 1002) are disposed on the camera mount upper stage as the first and second terminals when viewed from the far side in the lens mount direction, and the TYPE terminal 1003 is disposed adjacent to the power-supply-system terminals. In the lens mount B according to this embodiment, the two power-supply-system contact faces (the VDD terminal 2001 and the VBAT terminal 2002) are disposed on the lens mount lower stage as the first and second terminals when viewed from the far side in the lens mount direction, and the TYPE terminal 2003 is disposed adjacent to the power-supply-system terminals.

With the above-described structure, in the mount portion 1 according to this embodiment, the two power-supply-system terminals (the VDD terminal and the VBAT terminal) are not adjacent to the PGND terminal. Therefore, the possibility of an inter-terminal short circuit between the PGND terminal and the two power-supply-system terminals can be reduced, and a malfunction or a failure in a power supply circuit provided on the camera side due to the short circuit can be prevented.

When the TYPE terminal 1003 arranged between the VBAT terminal 1002 and the PGND terminal 1004 is provided with a protective element on the signal line of the TYPE terminal 1003, an electric circuit of the camera body 100 can be protected.

As in the TYPE terminal 1003, when a protective element is added to the signal line of a terminal other than the TYPE terminal, the measure taken for the TYPE terminal can be similarly taken. However, the DCL terminal, the DLC terminal, the LCLK terminal, the DLC2 terminal, the DCA terminal, and the CS terminal are terminals for communication as described above, and addition of a protective element leads to an increase in the wiring capacitance. In this case, an increase in the wiring capacitance may affect communication and, for example, the responsiveness of a rise or a fall of the communication waveform may be compromised. Therefore, it is desirable to provide no protective element in the communication terminals to the extent possible.

In the mount portion 1 according to this embodiment, the signal voltage of the TYPE terminal 1003 is constant, and the signal value does not change in a period during which, for example, the first interchangeable lens 200 is mounted on the camera body 100. Therefore, even if a protective element is added to the TYPE terminal 1003 as in the mount portion 1 according to this embodiment, operations performed by the camera body 100 and the first interchangeable lens 200 are less affected.

The signal voltage of the MIF terminal 1005 is constant similarly to the TYPE terminal 1003, and therefore, may include a protective element as in the TYPE terminal 1003. However, in the mount portion 1 according to this embodiment, the MIF terminal 1005 is not arranged adjacent to the power-supply-system terminals. The reasons for this will be described below.

As illustrated in FIG. 5C, in the camera mount A and in the lens mount B, the inter-terminal pitch W2 (distance) between the VDD terminal and the VBAT terminal is set to a pitch wider than the basic pitch W1 (W2>W1). In the camera mount A and in the lens mount B, the MIF terminal and the PGND terminal are held on different stages of the mount in the optical-axis direction, and the inter-terminal pitch W3 is set to a pitch wider than the basic pitch W1 and the pitch W2 (W3>W2>W1). An inter-terminal pitch is assumed to be the distance between the center points (center lines) of terminals (contact pins or contact faces) in the mount direction (rotation direction) of the lens mount B; however, an inter-terminal pitch may be the distance between conductive portions (between metal regions) provided in terminals. In a case where the lens mount B is mounted on the camera mount A, the distance between the location of contact of terminals, namely, a contact pin and a corresponding contact face (connection point) and the location of contact of the adjacent terminals may be assumed to be the inter-terminal pitch.

In this embodiment, the description has been given while assuming a case where the width of the contact face of the VDD terminal 2001 and the VBAT terminal 2002 in the circumferential direction of the lens mount B is a basic width described below; however, the width is not limited to this. For example, the width of the contact face of the VDD terminal 2001 and the VBAT terminal 2002 may be set to a width wider than the basic width or narrower than the basic width. In this case, the pitch between the VDD terminal and the VBAT terminal needs to be set by taking into consideration the difference between the basic width and the width of the VDD terminal 2001 and the VBAT terminal 2002. For example, in a case where the width of the VDD terminal 2001 and the VBAT terminal 2002 is wider than the basic width in the lens removal direction, the pitch between the VDD terminal and the VBAT terminal needs to be made wider by the difference from the basic width described above.

The basic pitch described above is the distance between terminals that is set by taking into consideration looseness and a tolerance relating to manufacturing and assembling of the camera body 100. One contact face of the lens mount B for which the basic width described below is set does not simultaneously come into contact with a plurality of contact pins of the camera mount A for which the basic pitch is set as long as a contact pin is not deformed, namely, for example, is not bent, or a conductive foreign object is not present between terminals. Therefore, a short circuit between adjacent terminals that occurs when a contact pin of the camera mount A comes into contact with a contact face of the lens mount B at two or more locations can be prevented. A description is given below under the assumption that the pitch between a contact pin not otherwise specified and an adjacent terminal is set to the basic pitch.

The basic width described above is the width of the contact faces of the lens mount B that is set by taking into consideration looseness and a tolerance relating to manufacturing and assembling of the camera accessory. The width of the contact faces is the width of the contact faces in the mount direction (rotation direction) of the lens mount B. As described above, a plurality of contact pins for which the basic pitch is set in the camera mount A do not simultaneously come into contact with one contact face for which the basic width is set. In a state where a camera accessory is mounted, a contact pin of the image capturing apparatus does not come off from a contact face of the camera accessory, namely, the lens mount B, for which the basic width is set as long as the contact pin on the camera side is deformed or, for example, a conductive foreign object is present between contact pins. A description is given below under the assumption that the width of a contact face not otherwise specified is set to the basic width.

The inter-terminal pitch between the VDD terminal 1001 and the VBAT terminal 1002 on the camera side according to this embodiment is set so as to be wider than the width of the VDD terminal 2001 and the VBAT terminal 2002 on the accessory side for which the basic width is set by approximately 3° by taking into consideration reduction in the size of the unit and safety of the power supply. With this structure, even in a case where the VDD terminal or the VBAT terminal on the camera side is deformed or a conductive foreign object is present between the terminals, the possibility of the VDD terminal on the accessory side coming into contact with the above-described two terminals simultaneously can be reduced, and therefore, the possibility of a short circuit between the adjacent terminals can be reduced.

In this embodiment, the description has been given while assuming a case where the inter-terminal pitch between the VDD terminal 1001 and the VBAT terminal 1002 in the circumferential direction of the camera mount A is set to a pitch wider than the basic pitch by 3°; however, the pitch is not limited to this. In this embodiment, the inter-terminal pitch needs to be at least made wider in the direction of relative rotation of the camera mount A and the lens mount B.

In the mount portion 1 according to this embodiment, the PGND terminal 1004 is disposed nearest in the lens mount direction on the camera mount upper stage, and the PGND terminal 2004 is disposed nearest in the lens mount direction on the lens mount lower stage.

The PGND terminal 2004 on the lens mount B is a contact face having a width wider than the basic width described above and is a terminal having a contact face having the widest width among the plurality of terminals provided on the lens mount B. In this embodiment, the width of a contact face described above is the width of the contact face in a direction (removal direction) in which the lens mount B is dismounted from the camera mount A while assuming a location (connection point) at which corresponding terminals are electrically connected to each other as a reference. The removal direction is synonymous with the near side in the mount direction of the lens mount B. The width of a contact face may be defined as the width of the contact face in the direction (removal direction) in which the lens mount B is dismounted from the camera mount A while the center of the contact face in the circumferential direction of the mount is simply assumed to be a reference.

In this structure, the PGND terminal 2004 is a terminal that is electrically connected to a corresponding terminal first among all of the terminals when the first interchangeable lens 200 is mounted on the camera body 100. The PGND terminal 2004 is a terminal that is electrically disconnected from the corresponding terminal last among all of the terminals when the first interchangeable lens 200 is dismounted (removed) from the camera body 100.

For example, a case is assumed where the PGND terminal is disposed further than the power-supply-system terminals (the VDD terminal and the VBAT terminal) in the lens mount direction. In this case, for example, when the first interchangeable lens 200 is removed from the camera body 100, the PGND terminal of the lens mount may slide on the power-supply-system terminals of the camera mount. In this case, the PGND terminal of the lens mount may instantaneously come into contact with the power-supply-system terminals of the camera mount depending on the speed at which the first interchangeable lens 200 is rotated in the removal direction. As a result, due to the above-described issue, the output of a camera power supply unit 103 described below of the camera body 100 connected to the power-supply-system terminals may be short-circuited, and a malfunction relating to power supply or a malfunction in power supply control may occur.

For example, a configuration is assumed where the PGND terminal is disconnected from the contact face on the lens mount side prior to disconnection of the other terminals. In this case, when the PGND terminals are disconnected from each other in a specific state where the power-supply-system terminals of the camera mount A are not disconnected from the power-supply-system terminals of the lens mount B and where power is kept supplied from the camera body 100, a malfunction or a failure may occur in both the devices.

For the above-described issue, in the mount portion 1 according to this embodiment, when the first interchangeable lens 200 is mounted on and dismounted from the camera body 100, the PGND terminal 2004 of the lens mount B does not slide on (does not come into contact with) any terminals other than the PGND terminal 1004 of the camera mount A. With this structure, the power-supply-system terminals (the VDD terminal and the VBAT terminal) of the camera mount A do not instantaneously come into contact with the PGND terminal 2004 of the lens mount B. Accordingly, the possibility of a short circuit between the terminals can be reduced.

In the mount portion 1 according to this embodiment, among all of the terminals described above, the PGND terminals of the respective mounts are connected to each other first when the camera accessory is mounted on the camera and disconnected from each other last when the camera accessory is removed from the camera. In other words, when the camera accessory is detached (removed) from the camera, in the mount portion 1, the PGND terminal of the camera mount is kept connected to the PGND terminal of the lens mount until corresponding terminals other than the PGND terminals are disconnected from each other. With this structure, in the camera mount A and in the lens mount B, ground floating in which the PGND terminals are disconnected from each other in a state where power is kept supplied can be avoided, and the possibility of a malfunction or a failure can be reduced in both the devices.

As illustrated in FIG. 5C, the inter-terminal pitch between the PGND terminal 1004 and the adjacent terminal, namely, the TYPE terminal 1003, in the camera mount A (and that in the lens mount B) is wider than the above-described basic pitch (W2>W1). Specifically, the inter-terminal pitch between the PGND terminal 1004 and the TYPE terminal 1003 is made wider than the basic pitch by an amount substantially equal to the amount by which the width of the contact face of the PGND terminal 2004 is made wider in the direction (removal direction) in which the lens mount B is dismounted. With this structure, the possibility of the PGND terminal 2004 coming into contact with the PGND terminal 1004 and the TYPE terminal 1003 simultaneously due to the PGND terminal 2004 of the lens mount B having a width wider than the basic width can be reduced, and the possibility of a short circuit between the adjacent terminals can be reduced.

As illustrated in FIGS. 5A to 5C, in the mount portion 1 according to this embodiment, the MIF terminal 1005 is disposed furthest in the lens mount direction on the camera mount lower stage, and the MIF terminal 2005 is disposed furthest in the lens mount direction on the lens mount upper stage. With this structure, wearing out of the MIF terminals, which are terminals for detecting the state of mounting of the lens mount B on the camera mount A and which are important terminals serving as a trigger for starting and ending communication between the camera and the camera accessory, can be reduced.

The MIF terminal 2005 of the lens mount B has a contact face having a width narrower than the contact faces having the basic width described above in the relative rotation direction of the lens mount B. Specifically, in the lens mount B according to this embodiment, the width of the MIF terminal 2005 is made narrower (shorter) than the basic width by approximately 1° so that the order in which the above-described terminals are connected to each other does not change even if looseness and a tolerance relating to manufacturing and assembling are taken into consideration. With this structure, the MIF terminals are connected to each other last among all of the above-described terminals included in the mount portion 1 when the camera accessory is mounted on the camera, and are disconnected from each other first when the camera accessory is removed from the camera.

Accordingly, in the mount portion 1 according to this embodiment, in a state where the lens mount B is not completely mounted on the camera mount A, the camera does not erroneously detect mounting of the camera accessory. With this structure, for example, in a state where the power-supply-system terminals are not connected to each other, erroneous detection of mounting of the camera accessory can be suppressed, and the possibility of a malfunction of the camera before power is supplied from the camera to the camera accessory can be reduced.

As illustrated in FIGS. 5A to 5C, in the camera mount A according to this embodiment, the DGND terminal 1012 is disposed nearest in the lens mount direction on the camera accessory lower stage, and the CS terminal 1011 is disposed adjacent to the DGND terminal 1012. In the lens mount B according to this embodiment, the DGND terminal 2012 is disposed nearest in the lens mount direction on the lens mount upper stage, and the CS terminal 2011 is disposed adjacent to the DGND terminal 2012. The details of the arrangement of the CS terminals will be described below. As described above, the DGND terminal is disposed nearest in the lens mount direction by taking into consideration easy processing for physically connecting a metal portion of the mount to ground.

As illustrated in FIGS. 5A to 5C, in the mount portion 1 according to this embodiment, the group of terminals (the LCLK terminal, the DCL terminal, and the DLC terminal) of the first communication unit is disposed adjacent to the MIF terminal. In the mount portion 1 according to this embodiment, the group of terminals corresponding to the first communication unit is disposed further in the lens mount direction than the group of terminals of the second and third communication units.

With this structure, on the camera mount lower stage and the lens mount upper stage, wearing out of the terminals corresponding to the first communication unit can be reduced to the largest degree next to the MIF terminal 1005. With the above-described structure, wearing out of the group of terminals corresponding to the first communication unit, which performs specifically important first communication among the types of communication performed between the camera and the lens, can be reduced to a larger degree than the other communication terminals.

As illustrated in FIGS. 5A to 5C, in the mount portion 1 according to this embodiment, the DLC2 terminal 1009 is disposed adjacent to the group of terminals corresponding to the first communication unit on the camera mount lower stage. In the mount portion 1 according to this embodiment, the DLC2 terminal 2009 is disposed adjacent to the group of terminals corresponding to the first communication unit on the lens mount upper stage. The details will be described below.

Configuration of Adaptor 400

Figure 6:
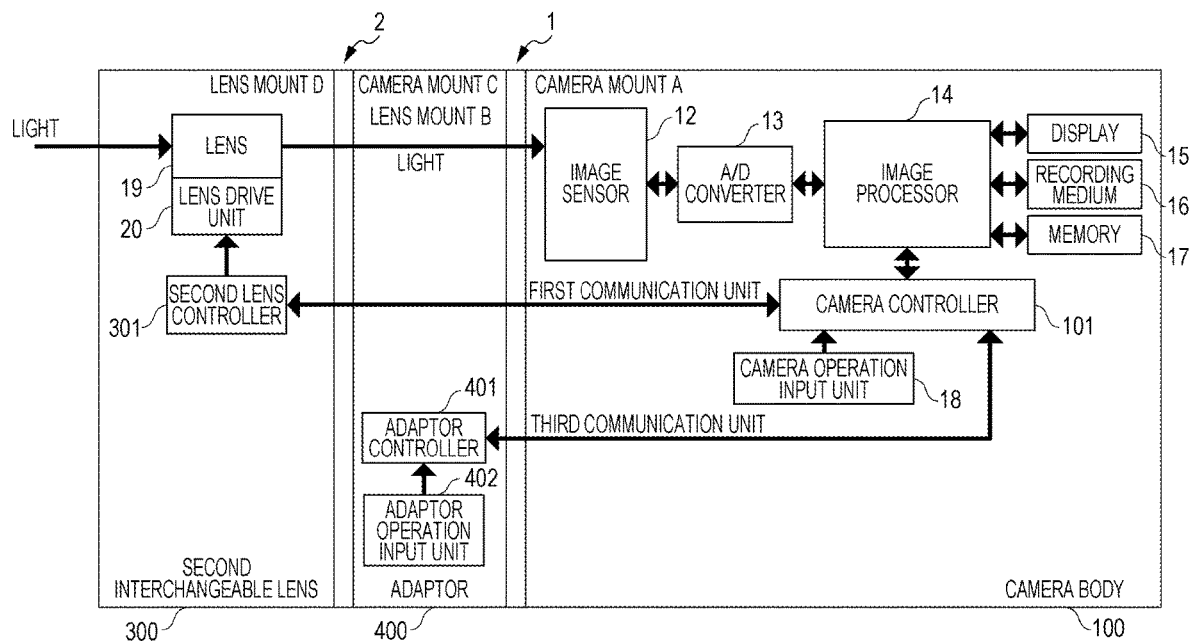
FIG. 6 is a block diagram illustrating a state where a second interchangeable lens is mounted on the camera body with an adaptor therebetween.

Now, a case where the second interchangeable lens 300 is mounted on the camera body 100 with the adaptor 400 therebetween is described with reference to FIG. 6. FIG. 6 is a block diagram illustrating a state where the second interchangeable lens 300 is mounted on the camera body 100 with the adaptor 400 therebetween. As illustrated in FIG. 6, a mount of the adaptor 400 and the mount of the second interchangeable lens 300 are collectively referred to as a mount portion 2.

Figure 7A:
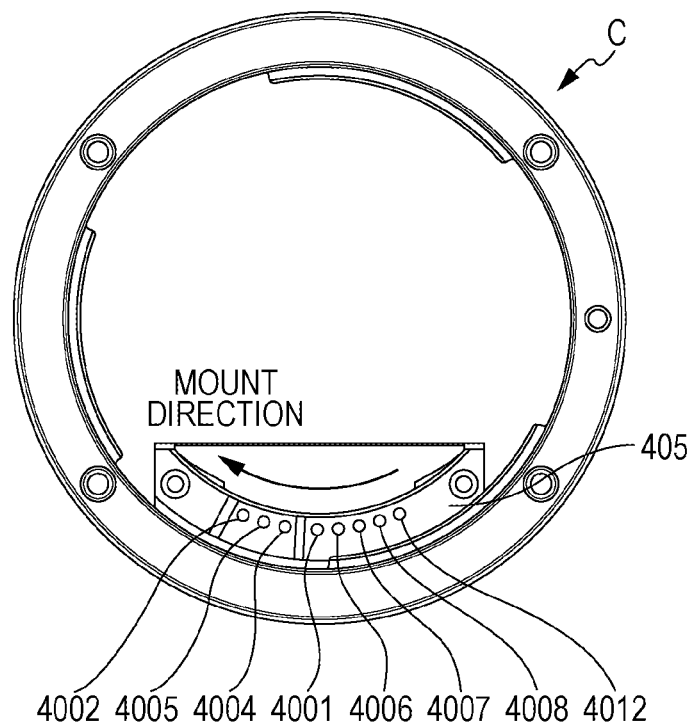
FIGS. 7A and 7B are diagrams illustrating a camera mount and a lens mount.
Figure 7B:
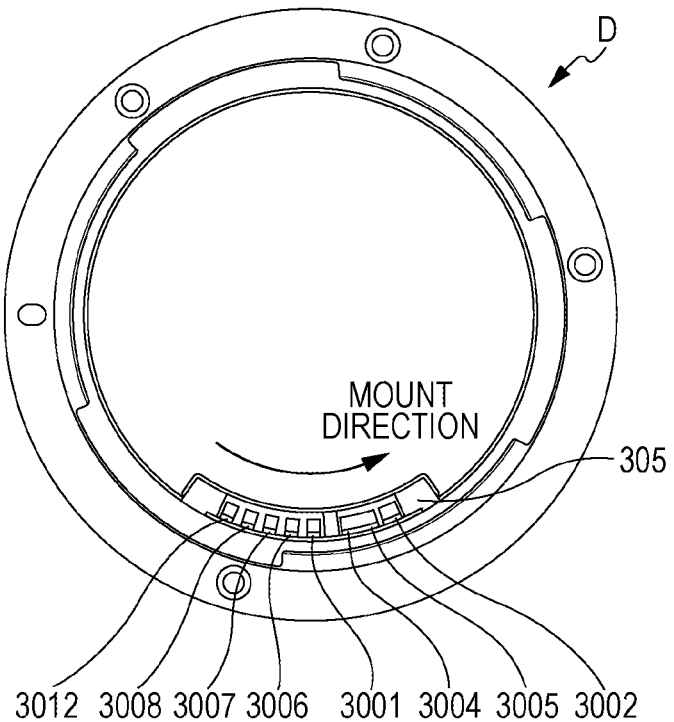

The adaptor 400 includes the lens mount B, which is the same as that of the first interchangeable lens 200 described above, on a side to which the camera body 100 is coupled. The adaptor 400 includes the camera mount C, which corresponds to the lens mount D provided in the second interchangeable lens 300, on a side opposite the lens mount B. FIGS. 7A and 7B are diagrams illustrating the camera mount C and the lens mount D. FIG. 7A is a front view of the camera mount C provided in the adaptor 400, and FIG. 7B is a front view of the lens mount D provided in the second interchangeable lens 300. The details of terminals included in the camera mount C and in the lens mount D will be described below.

The adaptor 400 is a camera accessory including an adaptor operation input unit 402, which receives user operations, an adaptor power supply unit 403 (see FIGS. 8A and 8B) for the adaptor 400, and an adaptor controller 401, which includes a central processing unit (CPU) that centrally controls operations of the adaptor 400. For example, the adaptor controller 401 controls communication between the adaptor controller 401 and the camera controller 101 via the mount portion 1 or accepts operation input to the adaptor operation input unit 402. In this embodiment, the adaptor 400 is used to mount, for example, the second interchangeable lens 300, which has a flange focal length not corresponding to the camera body 100, indirectly on the camera body 100.

The second interchangeable lens 300 includes a lens 19, which is constituted by optical members including a focus lens, a zoom lens, a diaphragm, and an image stabilizing lens not illustrated, and a lens drive unit 20, which drives an actuator that moves or operates the optical members of the lens 19. The second interchangeable lens 300 further includes a second lens controller 301, which includes a CPU that controls communication between the second lens controller 301 and the camera controller 101 via the mount portion 1 and via the mount portion 2 or performs control for driving the lens drive unit 20.

Figure 8A:
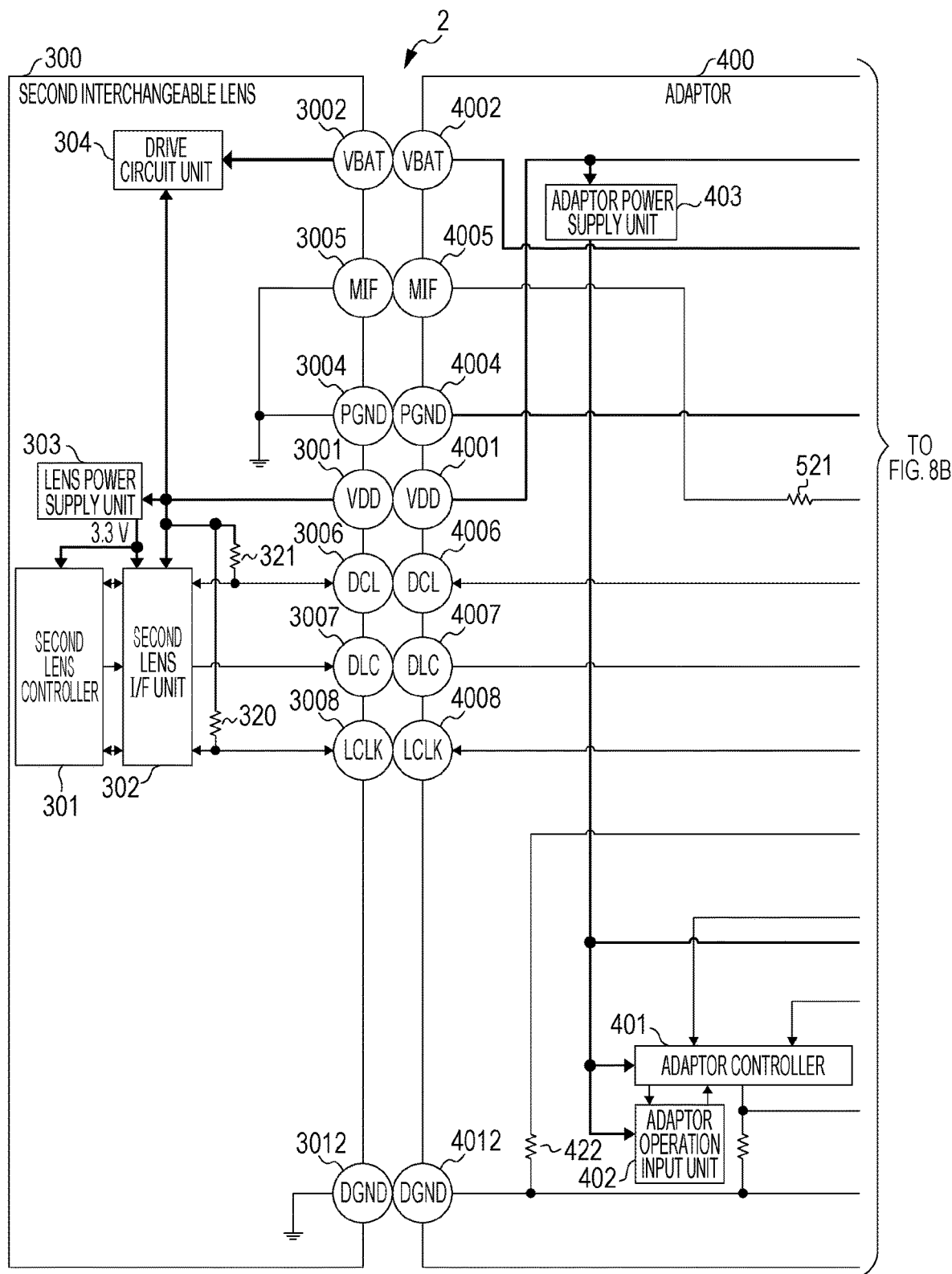
FIGS. 8A and 8B are diagrams illustrating the state of connection between mounts in a case of mounting the second interchangeable lens on the camera body with the adaptor therebetween.
Figure 8B:
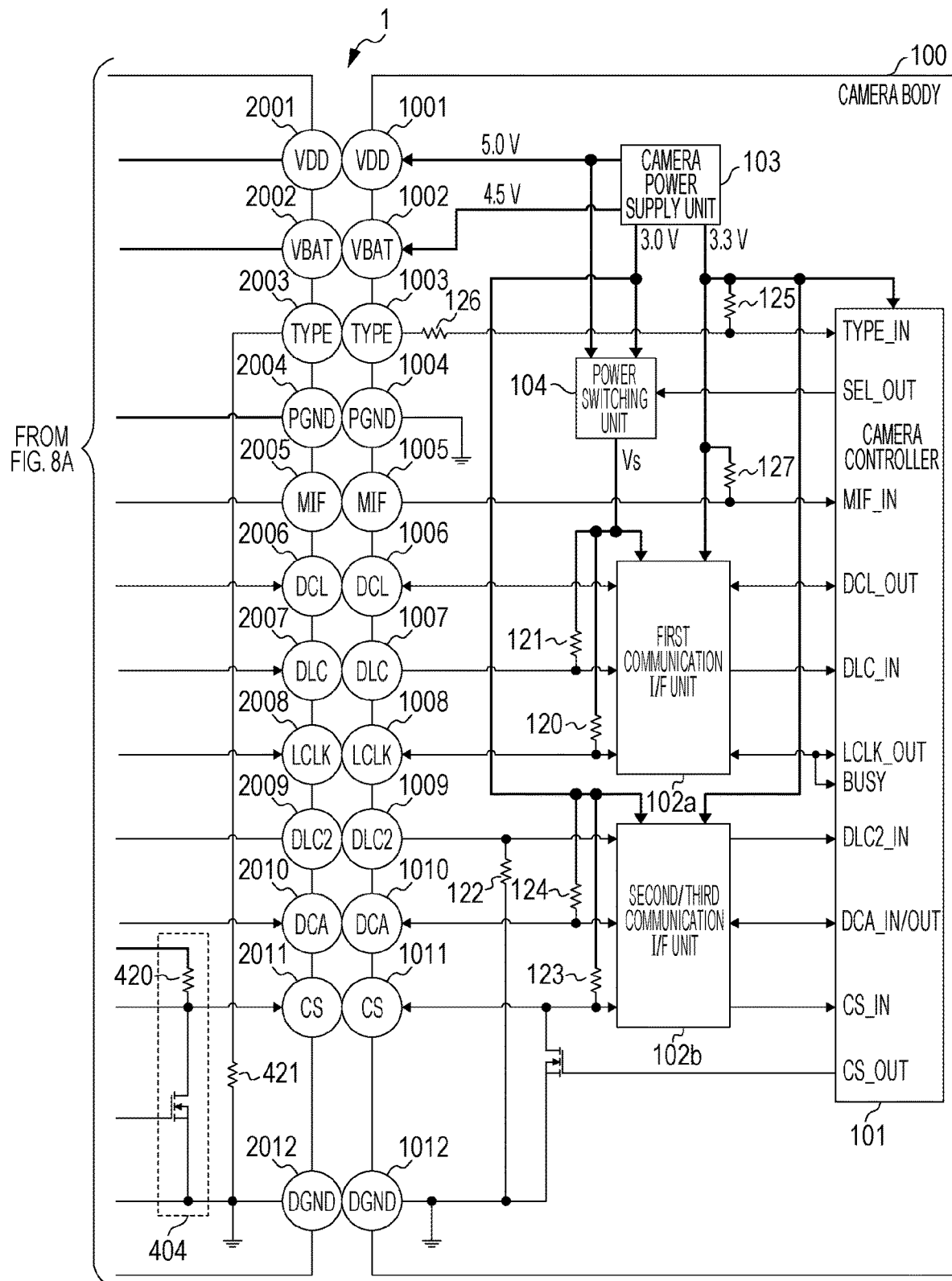

Now, connection between the camera body 100 and the second interchangeable lens 300 with the adaptor 400 therebetween is described with reference to FIGS. 8A and 8B. FIGS. 8A and 8B are diagrams illustrating the state of connection between mounts in a case of mounting the second interchangeable lens 300 on the camera body 100 with the adaptor 400 therebetween. The configuration of the terminals in the mount portion 1 is as described above, and therefore, a description thereof will be omitted. In this embodiment, the DLC2 terminal need not be provided on a side of the adaptor 400 close to the second interchangeable lens 300 (in the camera mount C).

As illustrated in FIGS. 8A and 8B, the mount portion 2 includes a plurality of terminals that enable electrical connection between the adaptor 400 and the second interchangeable lens 300. The plurality of terminals in the camera mount C are exposed outside the adaptor 400 as a plurality of electrical contact pins provided on a contact holding member 405 (see FIG. 7A), which corresponds to a terminal holder. The plurality of terminals in the lens mount D are exposed outside the second interchangeable lens 300 as a plurality of electrical contact faces provided on a contact face holding member 305 (see FIG. 7B), which corresponds to a terminal holder. In a state where the second interchangeable lens 300 is mounted on the adaptor 400, which is mounted on the camera body 100, each contact among the contact pins described above is electrically connected to a corresponding contact among the contact faces described above.

The functions of the terminals that are common to the camera mount C and the lens mount D are described below. VDD terminals 3001 and 4001 are power supply terminals for supplying communication control power (VDD), which is communication power used mainly in communication control, from the camera body 100 to the second interchangeable lens 300 via the adaptor 400. The voltage of the power to be supplied to each camera accessory from the camera body 100 is set to 5.0 V.

VBAT terminals 3002 and 4002 are power supply terminals for supplying driving power (VBAT), which is driving power used in operations of a mechanical drive unit mainly including an actuator, such as a motor, from the camera body 100 to the second interchangeable lens 300. The voltage of the power to be supplied to each camera accessory from the camera body 100 is set to 4.5 V. The VDD terminals and the VBAT terminals described above are power-supply-system terminals for supplying power from the camera body 100 to a camera accessory.

DGND terminal 3012 and 4012 are ground terminals (GND terminals) corresponding to the communication control power VDD. The DGND terminals 3012 and 4012 also connect a circuit provided within the adaptor 400 to ground.

PGND terminals 3004 and 4004 are ground terminals for connecting the camera body 100 and a mechanical drive system including a motor (actuator) provided in the second interchangeable lens 300 to ground. That is, the PGND terminals are ground terminals (GND terminals) corresponding to the driving power VBAT.

MIF terminals 3005 and 4005 are terminals for detecting mounting of the second interchangeable lens 300 on the camera body 100. The camera controller 101 detects a voltage level indicated by the MIF terminals to detect mounting or removal of a camera accessory on or from the camera body 100. After the camera controller 101 has detected, for example, mounting of a camera accessory as a result of the detection, the camera controller 101 performs control to start supplying power to the power-supply-system terminals and to start communication between the camera body 100 and the second interchangeable lens 300 via the adaptor 400.

Now, terminals for various types of communication between the adaptor 400 and the second interchangeable lens 300 are described. Unlike the first interchangeable lens 200 described above, the second interchangeable lens 300 includes only terminals corresponding to the first communication unit as an independent communication system.

LCLK terminals 3008 and 4008 are terminals of the first communication unit. The LCLK terminals 3008 and 4008 are terminals for a communication clock signal output from the camera body 100 to the second interchangeable lens 300 and are terminals for the camera body 100 to monitor the busy state of the second interchangeable lens 300.

DCL terminals 3006 and 4006 are terminals of the first communication unit and are communication data terminals for two-way communication between the camera body 100 and the second interchangeable lens 300. The DCL terminals 3006 and 4006 are CMOS-output-type interfaces. The CMOS output type in this embodiment is a type in which switch output is present for both H (High) and L (Low) indicated by a voltage. The open type described below is a type in which switch output is present on only the L side.

DLC terminals 3007 and 4007 are terminals of the first communication unit and are terminals for communication data output from the second interchangeable lens 300 to the camera body 100. The DLC terminals 3007 and 4007 are CMOS-type interfaces.

In the adaptor 400, the VDD terminal, the VBAT terminal, the DGND terminal, the PGND terminal, the MIF terminal, the LCLK terminal, the DCL terminal, and the DLC terminal in the mount portion 1 are electrically connected to those in the mount portion 2.

Connection, in the adaptor 400, of terminals not provided in the mount portion 2 is described below. The TYPE terminals 1003 and 2003 provided in the mount portion 1 are pull-down connected to the DGND terminal with a predetermined resistance described below in the adaptor 400.

The DLC2 terminals are terminals that correspond to the second communication unit as described above; however, the DLC2 terminals are not used as communication terminals in a case where the second interchangeable lens 300 is mounted on the camera body 100 with the adaptor 400 therebetween. Therefore, the DLC2 terminals 1009 and 2009 are pull-down connected to the DGND terminal with a predetermined resistance in the adaptor 400 as termination processing.

The DCA terminals are terminals that correspond to the third communication unit. In the mount portion 1, the DCA terminals are communication data terminals for two-way communication between the camera body 100 and the adaptor 400 and are CMOS-type interfaces. In the mounts of the adaptor 400, the DCA terminal in the mount portion 1 is not connected to a terminal in the mount portion 2.

The CS terminals are terminals that correspond to the third communication unit as described above and are signal terminals for requesting communication between the camera body 100 and the adaptor 400. The CS terminals are open-type interfaces. In the mounts of the adaptor 400, the CS terminal in the mount portion 1 is not connected to a terminal in the mount portion 2.

In a case where the second interchangeable lens 300 is mounted on the camera body 100 with the adaptor 400 therebetween, the communication voltage at the terminals corresponding to the first communication unit is set to a voltage equal to that of VDD, and the communication voltage at the terminals corresponding to the second and third communication units is set to approximately 3.0 V. That is, in the case where the second interchangeable lens 300 is mounted on the camera body 100 with the adaptor 400 therebetween, the communication voltage at the first communication unit is different from the communication voltage at the second and third communication units.

Configuration of Intermediate Accessory 500

Figure 9:
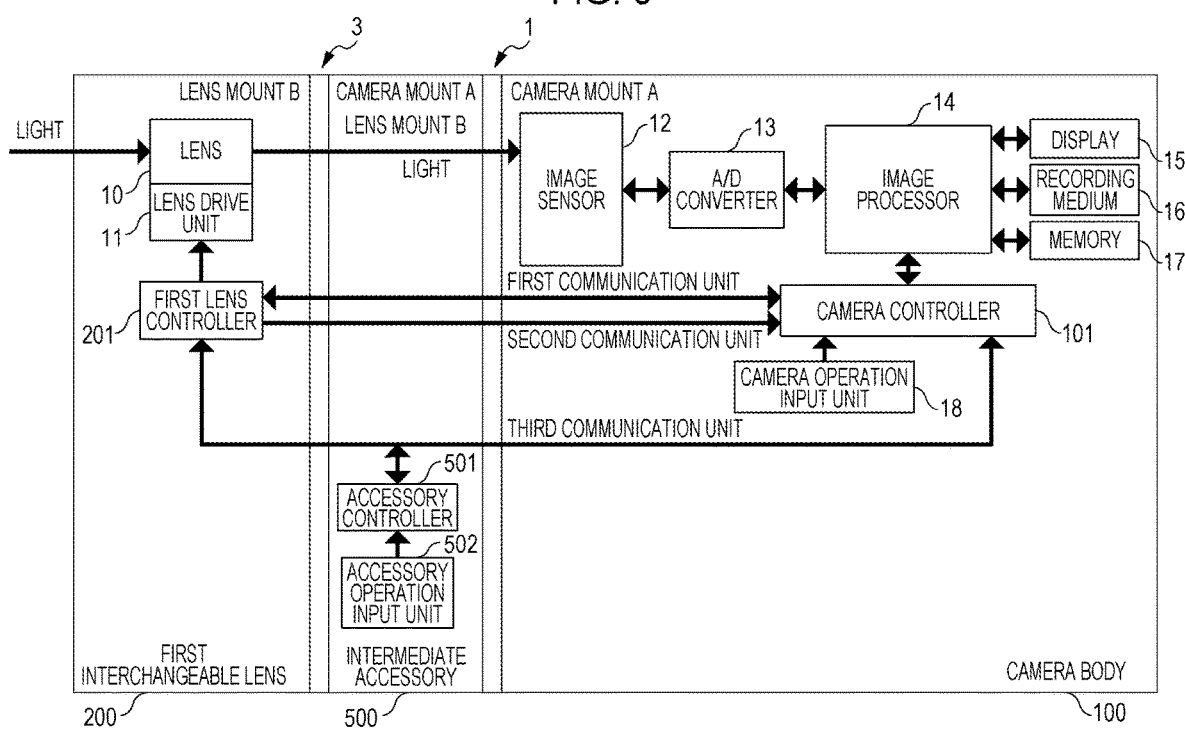
FIG. 9 is a block diagram illustrating a state where the first interchangeable lens is mounted on the camera body with an intermediate accessory therebetween.

Now, a case where the first interchangeable lens 200 is mounted on the camera body 100 with the intermediate accessory 500 therebetween is described with reference to FIG. 9 and FIGS. 10A and 10B. FIG. 9 is a block diagram illustrating a state where the first interchangeable lens 200 is mounted on the camera body 100 with the intermediate accessory 500 therebetween according to this embodiment. As illustrated in FIG. 9, a mount of the intermediate accessory 500 and the mount of the first interchangeable lens 200 are collectively referred to as a mount portion 3.

The intermediate accessory 500 includes the lens mount B, which is the same as that of the first interchangeable lens 200 described above, on a side to which the camera body 100 is coupled. The intermediate accessory 500 includes the camera mount A, which is the same as that of the camera body 100, on a side opposite the lens mount B. These mounts are the same as that of the camera body 100 and that of the first interchangeable lens 200, and therefore, detailed descriptions thereof will be omitted.

The intermediate accessory 500 is a camera accessory including an accessory operation input unit 502, which receives user operations, an accessory power supply unit 503 for the intermediate accessory 500, and an accessory controller 501, which includes a CPU that centrally controls operations of the intermediate accessory 500. For example, the accessory controller 501 controls communication between the accessory controller 501 and the camera controller 101 via the mount portion 1 or accepts operation input to the accessory operation input unit 502. In this embodiment, the intermediate accessory 500 is a camera accessory for adding functions of an extender that includes a group of lens (not illustrated) for enlargement or magnification variation or adding some camera functions as operations of both the camera body 100 and the first interchangeable lens 200.

Now, connection between the camera body 100 and the first interchangeable lens 200 with the intermediate accessory 500 therebetween is described with reference to FIGS. 10A and 10B. FIGS. 10A and 10B are diagrams illustrating the state of connection between mounts in a case of mounting the first interchangeable lens 200 on the camera body 100 with the intermediate accessory 500 therebetween. The configuration of the terminals in the mount portion 1 is as described above, and therefore, a description thereof will be omitted.

Figure 10A:
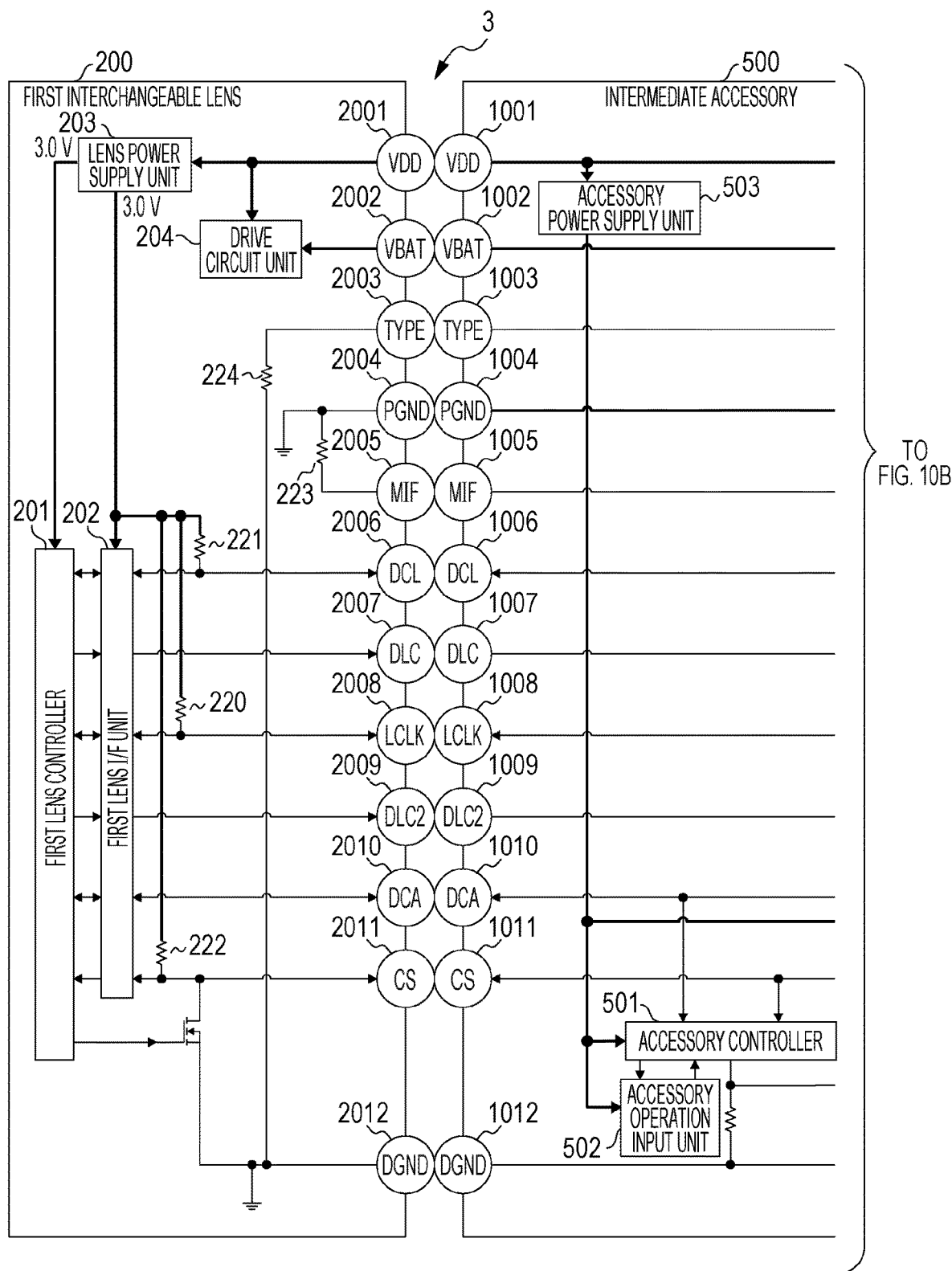
FIGS. 10A and 10B are diagrams illustrating the state of connection between mounts in a case of mounting the first interchangeable lens on the camera body with the intermediate accessory therebetween.
Figure 10B:
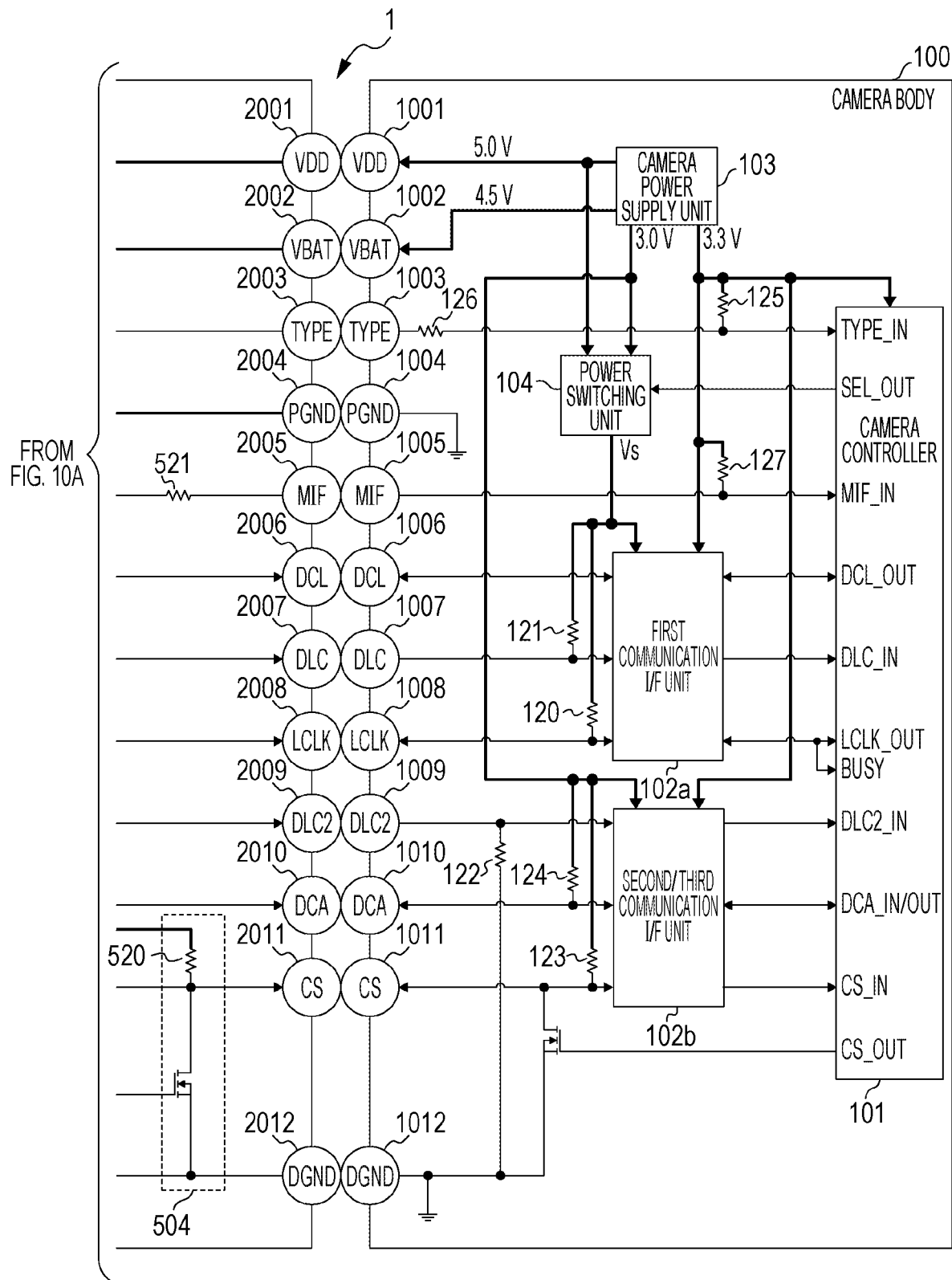

As illustrated in FIGS. 10A and 10B, the mount portion 3 includes a plurality of terminals that enable electrical connection between the intermediate accessory 500 and the first interchangeable lens 200. Contact pins that are exposed outside the intermediate accessory 500 as terminals are the same as the contact pins of the camera body 100 described above.

The features of the intermediate accessory 500 for the camera body 100 and the first interchangeable lens 200 described above are described below. As illustrated in FIGS. 10A and 10B, the intermediate accessory 500 can be connected to the camera body 100 and to the first interchangeable lens 200 via a terminal group provided in the camera body 100 and that provided in the first interchangeable lens 200.

Between the VDD terminal 1001 and the VDD terminal 2001 of the intermediate accessory 500, an inter-terminal through-wiring line is laid from the mount portion 1 to the mount portion 3. To an electric circuit in the intermediate accessory 500, VDD (communication control power) can be supplied.

Between the DGND terminal 1012 and the DGND terminal 2012 of the intermediate accessory 500, an inter-terminal through-wiring line is laid from the mount portion 1 to the mount portion 3. An electric circuit in the intermediate accessory 500 can be grounded to the DGND terminal.

The DCA terminals 1010 and 2010 of the intermediate accessory 500 are terminals that correspond to the third communication unit described above and are communication data terminals for two-way communication among the camera body 100, the first interchangeable lens 200, and the intermediate accessory 500. The CS terminals 1011 and 2011 of the intermediate accessory 500 are terminals that correspond to the third communication unit described above and are signal terminals for requesting communication among the camera body 100, the first interchangeable lens 200, and the intermediate accessory 500.

Although specific descriptions are not given of the VBAT terminals, the PGND terminals, the MIF terminals, the TYPE terminals, the LCLK terminals, the DCL terminals, the DLC terminals, and the DLC2 terminals of the intermediate accessory 500, between the terminals of each type described above, an inter-terminal through-wiring line is laid from the mount portion 1 to the mount portion 3.

Here, in a case where the first interchangeable lens 200 is mounted on the camera body 100 with the intermediate accessory 500 therebetween, the communication voltage at the terminals of the first, second, and third communication units are set to approximately 3.0 V as in the case of mounting the first interchangeable lens 200 directly on the camera body 100.

Terminal Processing for Signal Line of Each Communication Terminal

Now, terminal processing for the signal line of each communication terminal is described with reference to FIG. 3, FIGS. 8A and 8B, and FIGS. 10A and 10B. In the camera mount A, a signal line that corresponds to the LCLK terminal is pull-up connected to an electric potential identical to the communication voltage of the terminals corresponding to the first communication unit via a resistor R_LCLK_C 120, which indicates a predetermined resistance in the camera mount A. In the lens mount B, a signal line that corresponds to the LCLK terminal is pull-up connected to an electric potential identical to the communication voltage of the terminals corresponding to the first communication unit via a resistor R_LCLK_L 220, which indicates a predetermined resistance in the lens mount B.

In the lens mount B, a signal line that corresponds to the DCL terminal is pull-up connected to an electric potential identical to the communication voltage of the terminals of the first communication unit via a resistor R_DCL_L 221, which indicates a predetermined resistance in the lens mount B.

In the camera mount A, a signal line that corresponds to the DLC terminal is pull-up connected to an electric potential identical to the communication voltage of the terminals of the first communication unit via a resistor R_DLC_C 121, which indicates a predetermined resistance in the camera mount A.

In the camera mount A, a signal line that corresponds to the DLC2 terminal is pull-down connected to the signal line of the DGND terminal via a resistor R_DLC2_C 122, which indicates a predetermined resistance in the camera mount A. In the adaptor 400, a signal line that corresponds to the DLC2 terminal is pull-down connected to the signal line of the DGND terminal via a resistor R_DLC2_A 422, which indicates a predetermined resistance in the adaptor 400.

In the camera mount A, a signal line that corresponds to the CS terminal is pull-up connected to an electric potential identical to the communication voltage of the terminals of the third communication unit via a resistor R_CS_C 123, which indicates a predetermined resistance in the camera mount A. In the lens mount B, the signal line of the CS terminal is pull-up connected to an electric potential identical to the communication voltage of the terminals corresponding to the third communication unit via a resistor R_CS_L 222, which indicates a predetermined resistance in the lens mount B. The signal line of the CS terminal in the adaptor 400 and that in the intermediate accessory 500 are pull-up connected to an electric potential identical to the communication voltage of the terminals corresponding to the third communication unit via a resistor R_CS_A 420 and via a resistor R_CS_A 520 respectively, the resistor R_CS_A 420 and the resistor R_CS_A 520 each indicating a predetermined resistance in the corresponding device.

In the camera mount A, the signal line of the DCA terminal is pull-up connected to an electric potential identical to the communication voltage of the terminals corresponding to the third communication unit via a resistor R_DCA_C 124, which indicates a predetermined resistance in the camera mount A.

Configurations of Communication Interface Units in Camera Body 100

Now, the configuration of a first communication I/F unit 102a and that of a second/third communication I/F unit 102b, which function as interface circuits between the communication terminals provided in the camera body 100 and the camera controller 101, are described with reference to FIG. 3 and FIGS. 8A and 8B.

As illustrated in FIG. 3 and FIGS. 8A and 8B, the first communication I/F unit 102a is provided within the camera body 100. The first communication I/F unit 102a is connected to the DCL terminal, the DLC terminal, and the LCLK terminal and functions as an interface circuit for first communication performed between the camera body 100 and each interchangeable lens.

The second/third communication I/F unit 102b is provided within the camera body 100. The second/third communication I/F unit 102b is connected to the DLC2 terminal, the DCA terminal, and the CS terminal and functions as an interface circuit for second communication and third communication performed between the camera body 100 and each interchangeable lens. Hereinafter, the first communication I/F unit 102a and the second/third communication I/F unit 102b are collectively referred to as an I/F unit 102. In this embodiment, a description is given of an example case where the camera controller 101 is driven at a voltage level of 3.3 V and where the voltage level of the camera controller 101 is 3.3 V, as illustrated in FIG. 3 and FIGS. 8A and 8B; however, the voltage level may be set to another value.

The I/F unit 102 has a level shifter function for conversion between a voltage indicated by the terminals provided in the camera mount A and the voltage of the camera controller 101 as one of the main functions thereof. The level shifter function is as follows. For example, in a case where the first interchangeable lens 200 is mounted on the camera body 100, the interface voltage of the terminals corresponding to the first, second, and third communication units is 3.0 V, as described above. However, a voltage indicated by the camera controller 101 is 3.3 V, and therefore, the voltage indicated by the terminals differs from that indicated by the camera controller 101. The I/F unit 102 performs voltage conversion for the voltage indicated by the terminals to adjust the difference.

For example, in a case where the second interchangeable lens 300 is mounted on the camera body 100 with the adaptor 400 therebetween, the interface voltage of the terminals that correspond to the first communication unit is equal to the voltage of VDD (5.0 V). The interface voltage of the terminals that correspond to the second and third communication units is 3.0 V. Also in this case, the I/F unit 102 performs voltage conversion for the voltage indicated by the terminals to adjust the difference in voltage between the camera controller 101 and the terminals. That is, the I/F unit 102 performs voltage conversion for signals of the terminals by applying a power voltage (3.3 V) indicating a voltage level equal to the voltage of the camera controller 101 and a power voltage (5.0 V or 3.0 V) at a voltage level equal to the voltage indicated by the terminals.

Regarding the second/third communication I/F unit 102b, the voltage level indicated by the terminals provided in the mount has a fixed value at all times. Therefore, if the fixed value is at a voltage level equal to the voltage of the camera controller 101, the second/third communication I/F unit 102b need not have the level shifter function described above.

The I/F unit 102 has a function of switching the LCLK terminal 1008 and the DCL terminal 1006 between open-drain-type output and CMOS-output-type output in the camera mount A as one of the main functions thereof, which is specifically described in detail below.

For example, in an initial state immediately after the first interchangeable lens 200 has been mounted on the camera body 100, the LCLK terminal 1008 and the DCL terminal 1006 of the camera body 100 perform open-drain-type output. The camera controller 101 monitors the voltage level of the LCLK terminal 1008 via a BUSY input terminal of the camera controller 101, as illustrated in, for example, FIG. 3. For example, in a case where communication with the first interchangeable lens 200 is not possible, the camera controller 101 outputs a Low-level voltage to the LCLK terminal 2008 in the lens mount B. In a case where communication is possible, the camera controller 101 switches the LCLK terminal 2008 to the input side. At this time, to the LCLK terminal line in each mount, a High-level voltage is output from the resistor R_LCLK_C 120 and from the resistor R_LCLK_L 220, which are pull-up resistors.

When the camera controller 101 detects, for example, switching of the voltage level of the LCLK terminal 1008 to the High level, the camera controller 101 recognizes that communication with the first interchangeable lens 200 becomes possible. Thereafter, the camera controller 101 selects the open drain type or the CMOS output type to be applied to the LCLK terminal 1008 and the DCL terminal 1006, and makes a change to the selected output type via the I/F unit 102. Here, communication in a case of using the I/F unit 102 in accordance with the open drain type is referred to as open drain communication, and communication in a case of using the I/F unit 102 in accordance with the CMOS output type is referred to as CMOS communication.

In a case where a High-level voltage is detected from the LCLK terminal 1008 when the first interchangeable lens 200 is mounted, the camera controller 101 switches the LCLK terminal 1008 and the DCL terminal 1006 to the CMOS output type and performs CMOS communication with the first interchangeable lens 200. When the second interchangeable lens 300 is mounted, the camera controller 101 keeps the LCLK terminal 1008 and the DCL terminal 1006 to be of the open drain type and performs open drain communication with the second interchangeable lens 300. Thereafter, when the camera controller 101 determines that the second interchangeable lens 300 is an interchangeable lens supporting CMOS communication, the camera controller 101 uses the I/F unit 102 to switch the LCLK terminal 1008 and the DCL terminal 1006 to the CMOS output type and performs CMOS communication with the lens.

The open-type output system described above need not be an open drain output system and may be an open collector output system. Output of the High-level voltage may be implemented by providing the pull-up resistors as described above. The switching method of the output system need not be limited to the method described above. When an interchangeable lens is mounted on the camera body 100, the LCLK terminal 1008 and the DCL terminal 1006 at least need to perform open-type communication.

The I/F unit 102 has an input/output direction switch function for switching the input/output direction for the DCL terminal 1006 and the DCA terminal 1010 in the camera mount A as one of the main functions thereof. As described above, two-way communication of communication data is performed via the DCL terminals and via the DCA terminals, and therefore, the input/output direction of signals is switched by the I/F unit 102.

In this embodiment, a voltage indicated by the communication terminals that correspond to the first communication unit is switched between a voltage equal to that of VDD and 3.0 V in accordance with the type of camera accessory mounted on the camera body 100. A voltage indicated by the communication terminals that correspond to the second and third communication units does not change regardless of the type of camera accessory mounted on the camera body 100 and has a constant value (3.0 V) at all times.

To the first communication I/F unit 102a, a power voltage (Vs), which is a voltage equal to that of VDD or 3.0 V, and a power voltage (3.3 V) having an electric potential identical to a voltage indicated by the camera controller 101 are applied from the camera power supply unit 103 described below. To the second/third communication I/F unit 102b, a power voltage of 3.0 V and a power voltage (3.3 V) having an electric potential identical to a voltage indicated by the camera controller 101 are applied from the camera power supply unit 103 described below.

Configurations of Camera Power Supply Unit and Power Switching Unit in Camera Body 100

Now, the configuration of the camera power supply unit 103, which generates each power in the camera body 100, is described with reference to FIG. 3 and FIGS. 8A and 8B. The camera power supply unit 103 generates communication control power (VDD) as power to be supplied to a mounted camera accessory via the VDD terminal or as power to be supplied to the first communication I/F unit 102a via a power switching unit 104 described below. The camera power supply unit 103 generates driving power (VBAT) as power to be supplied to a mounted camera accessory via the VBAT terminal. As described above, in this embodiment, the power voltage of VDD is set to 5.0 V, and the power voltage of VBAT is set to 4.5 V.

The camera power supply unit 103 generates power of 3.3 V as power to be supplied to the camera controller 101 and to the I/F unit 102. The camera power supply unit 103 generates power of 3.0 V as power to be supplied to the I/F unit 102 via the power switching unit 104 described below.

Now, the power switching unit 104 for switching (the voltage) of power to be supplied to the first communication I/F unit 102a is described in detail. The power switching unit 104 is connected to the camera power supply unit 103. The power switching unit 104 supplies only VDD generated by the camera power supply unit 103 or power of 3.0 V to the first communication I/F unit 102a as communication interface power Vs. The power voltage is switched in accordance with an instruction from the camera controller 101.

In a case where the camera controller 101 uses the TYPE terminal 1003 to determine that the type of camera accessory mounted on the camera body 100 is the first interchangeable lens 200, the camera controller 101 controls the power switching unit 104 so that the power Vs becomes power of 3.0 V. In a case where the camera controller 101 determines that the second interchangeable lens 300 is mounted on the camera body 100 with the adaptor 400 therebetween, the camera controller 101 controls the power switching unit 104 so that the communication interface power Vs has a voltage equal to that of VDD. During a period in which mounting of a camera accessory is not detected in the camera body 100 and during a period until the type of mounted camera accessory is determined, the camera controller 101 controls the power switching unit 104 so that the power Vs is power of 3.0 V. With this configuration, for example, in a case where the first interchangeable lens 200 is mounted directly on the camera body 100, application of a voltage of 3.0 V or higher to an electric circuit of the first interchangeable lens 200 having a rated voltage of 3.0 V can be prevented.

In a state where mounting of a camera accessory is not detected in the camera body 100 and during a period until the type of mounted camera accessory is determined, the communication interface power Vs need not be supplied. Similarly, regarding power (3.0 V) to be supplied to the second/third communication I/F unit 102b, the power Vs need not be supplied. With this configuration, application of a predetermined voltage to each terminal in a state where power is not supplied from the camera to the camera accessory can be prevented. As a result, the possibility of a current of an unintended voltage flowing through terminals not corresponding to each other when a camera accessory is not mounted can be reduced.

As described above, in the camera body 100, the camera controller 101 controls the I/F unit 102 and the power switching unit 104 to enable each type of communication at an appropriate voltage corresponding to the type of camera accessory mounted on the camera body 100.

Configuration of Communication Interface Unit in First Interchangeable Lens 200

Now, the configuration of a first lens I/F unit 202, which functions as an interface circuit between the communication terminals provided in the first interchangeable lens 200 and the first lens controller 201, is described with reference to FIG. 3.

As illustrated in FIG. 3, the first lens I/F unit 202 is provided within the first interchangeable lens 200 as a communication interface unit in the first interchangeable lens 200. The first lens I/F unit 202 functions as an interface circuit for the camera body 100 and the first interchangeable lens 200 to perform communication via the terminals corresponding to the first, second, and third communication units.

The first lens I/F unit 202 has a level shifter function for conversion between a voltage indicated by the terminals provided in the lens mount B and a voltage indicated by the first lens controller 201 as one of the main functions thereof. The level shifter function is as follows. For example, in a case where a voltage level indicated by the first lens controller 201 is different from a voltage level indicated by the terminals, the first lens I/F unit 202 performs voltage conversion for the voltage indicated by the terminals in accordance with the difference between the first lens controller 201 and the terminals to adjust the difference. In a case where the level of a voltage indicated by the first lens controller 201 and the level of a voltage indicated by the terminals are equal to each other (3.0 V), as illustrated in FIG. 3, the level shifter function described above need not be provided.

The first lens I/F unit 202 has a function of switching the LCLK terminal 2008 between input and open-drain-type output in the lens mount B as one of the main functions thereof. The first lens I/F unit 202 further has a function of switching the DLC terminal 2007 between open-drain-type output and CMOS-output-type output in the lens mount B as one of the main functions thereof.

Control of the LCLK terminal 2008 and the DLC terminal 2007 in a case where the first interchangeable lens 200 is mounted on the camera body 100 is performed as described in the above description of the communication interface in the camera body 100. That is, the first lens controller 201 controls the first lens I/F unit 202 to switch the output type of the LCLK terminal 2008 and the DLC terminal 2007 in accordance with the level of a voltage output from the LCLK terminal 2008.

The first lens I/F unit 202 has an input/output direction switch function for switching the input/output direction for the DCL terminal 2006 and the DCA terminal 2010 in the lens mount B as one of the main functions thereof. As described above, two-way communication of communication data is performed via the DCL terminals and via the DCA terminals, and therefore, the input/output direction of signals is switched by the first lens I/F unit 202.

Configuration of Lens Power Supply Unit in First Interchangeable Lens 200

Now, the configuration of a lens power supply unit 203, which generates each power in the first interchangeable lens 200, is described with reference to FIG. 3. In a state where the first interchangeable lens 200 is mounted on the camera body 100, communication control power (VDD) is supplied to the lens power supply unit 203 of the first interchangeable lens 200 from the camera power supply unit 103 described above via the VDD terminals. In this state, the lens power supply unit 203 generates power of 3.0 V on the basis of VDD supplied from the camera body 100 as a power voltage to be applied to the first lens controller 201 and to the first lens I/F unit 202.

In the state where the first interchangeable lens 200 is mounted on the camera body 100, driving power (VBAT) is supplied to a drive circuit unit 204 of the first interchangeable lens 200 from the camera power supply unit 103 described above via the VBAT terminals.

In this embodiment, the level of the power voltage of the first lens controller 201 and that of the first lens I/F unit 202 are set to the same level (3.0 V); however, the voltage level indicated by the first lens controller 201 may be set to 3.3 V. In this case, power of a voltage level of 3.0 V and power of a voltage level of 3.3 V need to be supplied to the first lens I/F unit 202, and therefore, the lens power supply unit 203 generates power of 3.0 V and power of 3.3 V.

Configuration of Communication Interface Unit in Second Interchangeable Lens 300

Now, the configuration of a second lens I/F unit 302, which functions as an interface circuit between the communication terminals provided in the second interchangeable lens 300 and the second lens controller 301, is described with reference to FIGS. 8A and 8B.

As illustrated in FIGS. 8A and 8B, the second lens I/F unit 302 is provided within the second interchangeable lens 300. To the second lens I/F unit 302, the DCL terminal 3006, the DLC terminal 3007, and the LCLK terminal 3008 are connected, and the second lens I/F unit 302 functions as an interface circuit for first communication performed between the camera body 100 and the second interchangeable lens 300.

The second lens I/F unit 302 has a level shifter function for converting a voltage indicated by the terminals provided in the lens mount D and a voltage indicated by the second lens controller 301 as one of the main functions thereof.

The level shifter function is as follows. For example, a case is assumed where a voltage level indicated by the terminals is equal to the voltage of VDD and a voltage indicated by the second lens controller 301 is set to 3.3 V. In this case, the second lens I/F unit 302 performs voltage conversion for the voltage indicated by the terminals to adjust the difference in voltage between the second lens controller 301 and the terminals. In a case where the level of a voltage indicated by the second lens controller 301 is equal to the level of a voltage indicated by the terminals, the level shifter function described above need not be provided.

The second lens I/F unit 302 has a function of switching the LCLK terminal 3008 between input and open-drain-type output in the lens mount D as one of the main functions thereof. The second lens I/F unit 302 further has a function of switching the DLC terminal 3007 between open-drain-type output and CMOS-output-type output in the lens mount D as one of the main functions thereof.

Control of the LCLK terminal 3008 and the DLC terminal 3007 in a case where the second interchangeable lens 300 is mounted on the camera body 100 with the adaptor 400 therebetween is performed as described in the above description of the communication interface in the first interchangeable lens 200. That is, the second lens controller 301 controls the second lens I/F unit 302 to switch the output type of the LCLK terminal 3008 and the DLC terminal 3007 in accordance with the level of a voltage output from the LCLK terminal 3008.

Configuration of Lens Power Supply Unit in Second Interchangeable Lens 300

Now, the configuration of a lens power supply unit 303, which generates each power in the second interchangeable lens 300, is described with reference to FIGS. 8A and 8B. In a state where the second interchangeable lens 300 is mounted on the camera body 100 with the adaptor 400 therebetween, communication control power (VDD) is supplied to the lens power supply unit 303 of the second interchangeable lens 300 from the camera power supply unit 103 described above via the VDD terminals. In this state, the lens power supply unit 303 generates power of 3.3 V on the basis of VDD supplied from the camera body 100 as a power voltage to be applied to the second lens controller 301 and to the second lens I/F unit 302.

In the state where the second interchangeable lens 300 is mounted on the camera body 100 with the adaptor 400 therebetween, driving power (VBAT) is supplied to a drive circuit unit 304 of the second interchangeable lens 300 from the camera power supply unit 103 described above via the VBAT terminals.

Internal Configuration of Adaptor 400

Now, the internal configurations and operations of circuits included in the adaptor 400 are described with reference to FIGS. 8A and 8B. In a state where the adaptor 400 is mounted on the camera body 100, communication control power (VDD) is supplied to the adaptor power supply unit 403 of the adaptor 400 from the camera power supply unit 103 described above via the VDD terminals. In this state, the adaptor power supply unit 403 generates power to be supplied to the adaptor controller 401 including an adaptor CPU and to the adaptor operation input unit 402 on the basis of VDD supplied from the camera body 100.

The adaptor operation input unit 402 can be used to input, for example, a setting relating to manual focus and a setting relating to the aperture diameter of the diaphragm through a user operation and includes, for example, a ring member rotatable in the circumferential direction of the adaptor 400 as an operation member that can be manually operated by the user.

The adaptor controller 401 asserts or negates a communication request from the CS terminal 2011 provided in the lens mount B of the adaptor 400 in accordance with control by an open interface unit 404 formed of an N-channel transistor. To the adaptor controller 401, the voltage level of the CS terminal 2011 is input to monitor the voltage level of the CS terminal 2011.

Operation information input to the adaptor operation input unit 402 is reflected to various settings of the camera body 100 via third communication between the adaptor controller 401 and the camera controller 101 via the terminals that correspond to the third communication unit. Specifically, when the adaptor controller 401 detects operation information input to the adaptor operation input unit 402, the adaptor controller 401 controls the open interface unit 404 and transmits a communication request to the camera controller 101 via the CS terminal 2011 corresponding to the third communication unit. In this case, the adaptor controller 401 transmits the detected operation information to the camera controller 101 via the DCA terminal 2010 corresponding to the third communication unit.

Internal Configuration of Intermediate Accessory 500

Now, the internal configurations and operations of circuits included in the intermediate accessory 500 are described with reference to FIGS. 10A and 10B. In a state where the intermediate accessory 500 is mounted on the camera body 100, communication control power (VDD) is supplied to the accessory power supply unit 503 of the intermediate accessory 500 from the camera power supply unit 103 described above via the VDD terminals. In this state, the accessory power supply unit 503 generates power to be supplied to the accessory controller 501 including an accessory CPU and to the accessory operation input unit 502 on the basis of VDD supplied from the camera body 100.

The accessory operation input unit 502 can be used to input, for example, a setting relating to manual focus and a setting relating to the aperture diameter of the diaphragm through a user operation and includes, for example, a ring member rotatable in the circumferential direction of the intermediate accessory 500 as an operation member that can be manually operated by the user.

The intermediate accessory 500 also includes an open interface unit 504 formed of an N-channel transistor as in the adaptor 400 described above. Although a control target differs, the operations of the open interface unit 504 are substantially the same as those of the open interface unit 404 described above, and therefore, a description thereof will be omitted.

Operation information input to the accessory operation input unit 502 is reflected to various settings of the camera body 100 via third communication between the accessory controller 501 and the camera controller 101 or the first lens controller 201 via the terminals that correspond to the third communication unit. Specifically, when the accessory controller 501 detects operation information input to the accessory operation input unit 502, the accessory controller 501 controls the open interface unit 504 and transmits a communication request to the camera controller 101 via the CS terminal 2011 corresponding to the third communication unit. In this case, the accessory controller 501 transmits the detected operation information to the camera controller 101 via the DCA terminal 2010 corresponding to the third communication unit.

Method for Determining Camera Accessory

Now, a method for the camera body 100 to determine the type of camera accessory mounted on the camera body 100 is described with reference to FIG. 11 and Table 1 below. More specifically, a method for the camera controller 101 in the camera body 100 to determine the type of camera accessory mounted on the camera body 100 on the basis of the level of a voltage indicated by the TYPE terminal 1003 is described.

TABLE 1

| Mounted accessory | Error 1 | First interchangeable lens 200 | Reserved | Adaptor 400 | Error 2 |
|---|---|---|---|---|---|
| TYPE_IN terminal | 0x0000 to 0x007F | 0x0080 to 0x017F | 0x0180 to 0x027F | 0x0280 to 0x037F | 0x0380 to 0x03FF |
| Communication voltage | No communication | 3.0 V | No communication | VDD (5.0 V) | No communication |

As described above, Table 1 is a table that indicates a relationship between an input signal of the TYPE terminal and the communication voltage in a case where each camera accessory is mounted on the camera body 100 (including errors and so on). In this embodiment, information (table data) that indicates a relationship between a voltage level indicated by the TYPE_IN terminal and a mounted accessory as indicated by Table 1 is stored in a memory (not illustrated) provided in the camera controller 101. The table data may be recorded to any memory area in a recording unit provided within the camera body 100.

In a case where the first interchangeable lens 200 is mounted on the camera body 100, the TYPE terminal 1003 is pull-up connected to power indicating a voltage level of 3.3 V via a resistor R_TYPE_C 126. In this case, the TYPE terminal is pull-down connected to the DGND terminal via a resistor R_TYPE_L 224. Here, in the TYPE terminal 1003, 3.3 V power is divided into voltages on the basis of the resistance of the resistor R_TYPE_C 126 and that of the resistor R_TYPE_L 224, and the resulting voltage is applied to the camera controller 101. In this embodiment, the resistance indicated by each of the resistors described above is set in accordance with the ratio to a resistance indicated by another resistor connected to a terminal that may be short-circuited by taking into consideration a case of an inter-terminal short circuit.

In a case where the adaptor 400 is mounted on the camera body 100, the TYPE terminal is pull-up connected to power indicating a voltage level of 3.3 V via the resistor R_TYPE_C 126 and pull-down connected to the DGND terminal via a resistor R_TYPE A 421. In this case, 3.3 V power is divided into voltages on the basis of the resistance of the resistor R_TYPE_C 126 and that of the resistor R_TYPE A 421, and the resulting voltage is applied to the camera controller 101.

Here, the camera controller 101 includes an AD converter for converting an analog data signal to a digital signal and a TYPE_IN terminal, which is an input port of the AD converter. To the TYPE_IN terminal, the TYPE terminal 1003 is connected. For description purposes, the resolution of the AD converter is assumed to be 10 bits (1024 divisions: 0x0000 to 0x03FF). Between the TYPE terminal 1003 and the TYPE_IN terminal, a resistor indicating a predetermined resistance (in this embodiment, 1 kΩ) for protecting the TYPE_IN terminal is connected.

For description purposes, a predetermined resistance indicated by each resistor is assumed as follows. The resistance of the resistor R_TYPE_C 126 indicating a pull-up resistance in the camera body 100 is 100 kΩ. The resistance of the resistor R_TYPE_L 224 indicating a pull-down resistance in the first interchangeable lens 200 is 33 kΩ. The resistance of the resistor R_TYPE A 421 indicating a pull-down resistance in the adaptor 400 is 300 kΩ.

The camera controller 101 determines the type of camera accessory mounted on the camera body 100 in accordance with the level of a voltage input to the TYPE_IN terminal. Specifically, the camera controller 101 performs AD conversion of a voltage level input to the TYPE_IN terminal. The camera controller 101 compares a voltage value after AD conversion with a threshold (reference value) corresponding to each lens type, the threshold being held in advance in a memory (not illustrated) of the camera controller 101, to determine the type of camera accessory.

Figure 11A:
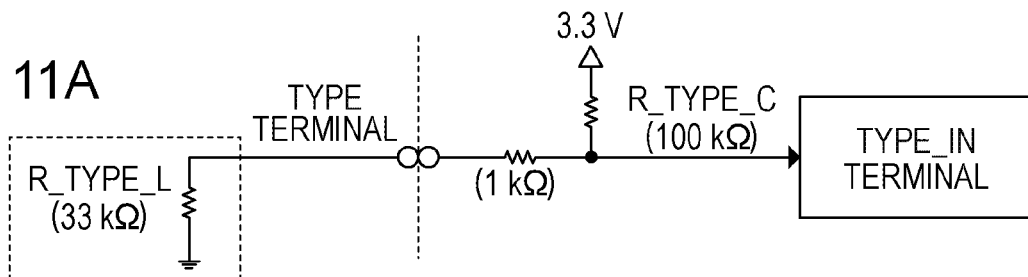
FIGS. 11A to 11E are diagrams each illustrating the state of connection between a TYPE_IN terminal of the camera body and a camera accessory.
Figure 11B:
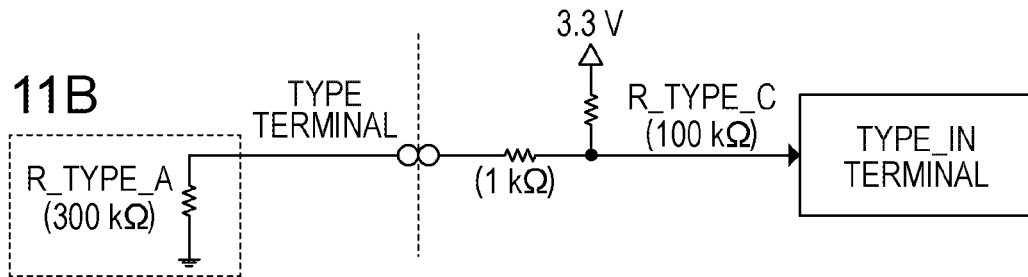
Figure 11C:
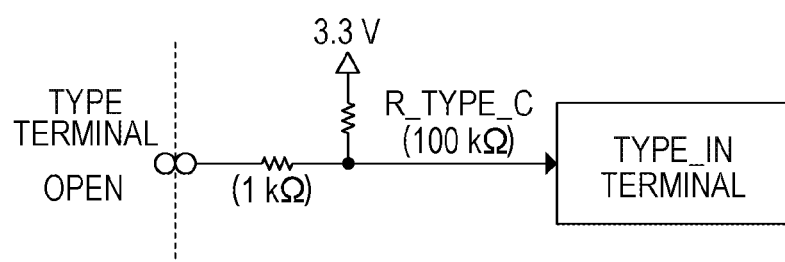
Figure 11D:
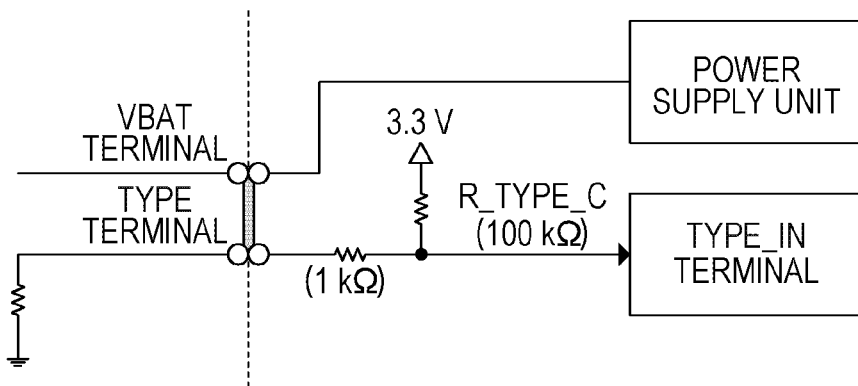
Figure 11E:
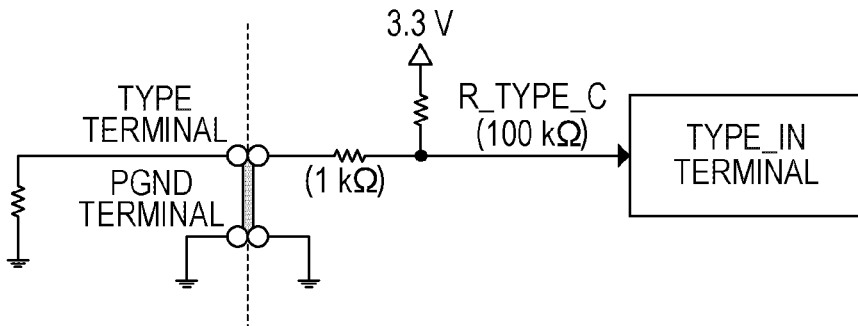

Hereinafter, a specific method for determining each camera accessory is described. FIGS. 11A to 11E are diagrams each illustrating the state of connection between the TYPE_IN terminal of the camera body 100 and a camera accessory. FIG. 11A illustrates a case where the first interchangeable lens 200 is mounted on the camera body 100. FIG. 11B illustrates a case where the adaptor 400 is mounted on the camera body 100. FIG. 11C illustrates a case where the TYPE terminal provided in the camera body 100 does not properly come into contact with the TYPE terminal provided in a camera accessory due to imperfect contact. FIG. 11D illustrates a case where a short circuit occurs between the TYPE terminal and the adjacent VBAT terminal because, for example, a conductive foreign object is adhered between the terminals. FIG. 11E illustrates a case where a short circuit occurs between the TYPE terminal and the adjacent PGND terminal because, for example, a conductive foreign object is adhered between the terminals.

As illustrated in FIG. 11A, in the case where the first interchangeable lens 200 is mounted on the camera body 100, the level of a voltage input to the TYPE_IN terminal of the camera controller 101 (after AD conversion) is approximately "0X0103". In the case illustrated in FIG. 11A, the level of the voltage input to the TYPE_IN terminal is determined on the basis of the ratio (division ratio) between the pull-up resistance of 100 kΩ and the protective resistance of 1 kΩ within the camera body 100 and the pull-down resistance of 33 kΩ within the first interchangeable lens 200.

The camera controller 101 compares the table data (indicated by Table 1) stored in a memory with the level of the voltage input to the TYPE_IN terminal. For example, in the case where the level of the voltage input to the TYPE_IN terminal (after AD conversion) is "0x0103", the level falls within a voltage level range "0x0080 to 0x017F", which indicates that the first interchangeable lens 200 is mounted, as indicated by Table 1. In this case, the camera controller 101 determines that the first interchangeable lens 200 is mounted on the camera body 100.

As illustrated in FIG. 11B, in the case where the adaptor 400 is mounted on the camera body 100, the level of a voltage input to the TYPE_IN terminal of the camera controller 101 (after AD conversion) is approximately "0X0300". In the case illustrated in FIG. 11B, the level of the voltage input to the TYPE_IN terminal is determined on the basis of the ratio (division ratio) between the pull-up resistance of 100 kΩ and the protective resistance of 1 kΩ within the camera body 100 and the pull-down resistance of 300 kΩ within the adaptor 400.

In this case, the level of the voltage input to the TYPE_IN terminal (after AD conversion) is "0x0300" and falls within a voltage level range "0x0280 to 0x037F", which indicates that the adaptor 400 is mounted, as indicated by Table 1. Therefore, the camera controller 101 determines that the adaptor 400 is mounted on the camera body 100.

As illustrated in FIG. 11C, in the case where the TYPE terminal provided in the camera body 100 imperfectly comes into contact with the TYPE terminal provided in a camera accessory, the level of a voltage input to the TYPE_IN terminal of the camera controller 101 is approximately "0x03FF". In this case, the level of the voltage input to the TYPE_IN terminal is determined on the basis of only the pull-up resistance of 100 kΩ within the camera body 100.

In the above-described case, the level of the voltage input to the TYPE_IN terminal is a voltage that does not correspond to any of the first interchangeable lens 200 and the adaptor 400. In this case, the level of the voltage input to the TYPE_IN terminal corresponds to error 1 indicated by Table 1, and therefore, the camera controller 101 fails to determine a camera accessory mounted on the camera body 100. The state illustrated in FIG. 11C corresponds to a case where, for example, the MIF terminal of the camera body 100 and that of the camera accessory are properly connected to each other but the TYPE terminals do not come into contact with each other.

As illustrated in FIG. 11D, in the case where, for example, a conductive foreign object is adhered between the TYPE terminal and the adjacent VBAT terminal and a short circuit occurs between the TYPE terminal and the adjacent terminal, the signal line of the VBAT terminal is connected to the TYPE terminal. At this time, in a case where the type of camera accessory mounted on the camera body 100 is determined before power is supplied to the VBAT terminal, the result of determination of the type of camera accessory may differ depending on the state of the VBAT power.

For example, in a case where the VBAT power is turned off and the signal line of the VBAT power has an electric potential equal to that of the signal line of the PGND terminal, the signal line of the TYPE terminal has an electric potential equal to that of the signal line of the PGND terminal. In this case, the level of a voltage input to the TYPE_IN terminal is determined on the basis of the ratio (division ratio) between the pull-up resistance of 100 kΩ and the protective resistance of 1 kΩ within the camera body 100 and has a value of approximately "0x000A". In this case, the level of the voltage input to the TYPE_IN terminal corresponds to error 1 indicated by Table 1, and therefore, the camera controller 101 fails to determine a camera accessory mounted on the camera body 100.

For example, in a case where the VBAT power is turned off and the signal line of the VBAT power is floating, the short circuit between the TYPE terminal and the VBAT terminal has no effect, and the camera controller 101 can determine the type of camera accessory as described above. Thereafter, at the time when the VBAT power is supplied to the VBAT terminals in a state where the VBAT terminals are connected to each other, a power voltage equivalent to the VBAT power voltage is applied to the TYPE terminal. In this case, the VBAT terminals indicate a voltage of a level higher than the power voltage of the TYPE_IN terminal, and therefore, a current of an unintended voltage level may flow into the TYPE_IN terminal via a diode (not illustrated) present within the TYPE_IN terminal.

Accordingly, in the camera body 100 according to this embodiment, the protective resistor of 1 kΩ is provided in series to the signal line of the TYPE terminal. With this configuration, the possibility of a current of an unintended voltage level flowing into (the power of) the TYPE_IN terminal can be reduced, and the occurrence of a failure in each unit connected to the TYPE_IN terminal can be suppressed. A protective diode may be connected to the signal line between the protective resistor of 1 kΩ and the TYPE_IN terminal.

At the time when the VBAT power is supplied to the VBAT terminal, the camera controller 101 may detect again the level of a voltage input to the TYPE_IN terminal to determine the type of camera accessory again. In this case, in the state as illustrated in FIG. 11D, a voltage equivalent to the power voltage of the VBAT terminal is applied to the TYPE terminal, and the level of the voltage input to the TYPE_IN terminal is approximately "0x03FF". In this case, although the camera controller 101 fails to determine the camera accessory mounted on the camera body 100, a current of an unintended voltage level can be prevented from flowing into the TYPE_IN terminal.

In a case where power is supplied to the VBAT terminal before the type of camera accessory is determined, AD conversion of the level of a voltage input to the TYPE_IN terminal is performed in a state where a power voltage indicated by the VBAT terminal is applied to the TYPE terminal. In this case, the level of the voltage input to the TYPE_IN terminal (after AD conversion) is approximately "0x03FF". In this case, the level of the voltage input to the TYPE_IN terminal corresponds to error 1 indicated by Table 1, and therefore, the camera controller 101 fails to determine the camera accessory mounted on the camera body 100.

As illustrated in FIG. 11E, in the case where a short circuit occurs between the TYPE terminal and the adjacent PGND terminal because, for example, a conductive foreign object is adhered between the TYPE terminal and the adjacent terminal, the TYPE terminal is connected to the single line of the PGND terminal. In this case, the PGND terminal is a ground terminal, and therefore, a voltage input to the TYPE_IN terminal is determined on the basis of the ratio (division ratio) between the pull-up resistance 100 kΩ and the protective resistance 1 kΩ within the camera body 100 and has a value of approximately "0x000A". Accordingly, also in this case, the camera controller 101 fails to determine the camera accessory mounted on the camera body 100.

As described above, in the case where a short circuit occurs between the TYPE terminal and an adjacent terminal, the level of a voltage input to the TYPE_IN terminal has a value close to a voltage level indicated by the PGND terminal or a value close to the level of a power voltage indicated by the VBAT terminal. In such a case, the camera controller 101 fails to determine the type of camera accessory mounted on the camera body 100 and is unable to perform operations or give an instruction for operations suitable to the camera accessory.

Accordingly, in a case where a voltage having a value close to a voltage level indicated by the PGND terminal is input to the TYPE_IN terminal of the camera controller 101, the camera controller 101 of the camera body 100 according to this embodiment performs control so as not to perform communication with the camera accessory. In this embodiment, in a case where the level of a voltage input to the TYPE_IN terminal falls within a range "0x0000 to 0x007F", the camera controller 101 determines the connection state of the TYPE terminal to be an abnormal state, namely, an error state, and does not perform communication with the camera accessory.

In a case where a voltage having a value equal to a power voltage level indicated by the VBAT terminal is input to the TYPE_IN terminal, the camera controller 101 performs control so as not to perform communication with the camera accessory. In a case where the level of a voltage input to the TYPE_IN terminal falls within a range "0x0380 to 0x03FF", the camera controller 101 according to this embodiment determines the connection state of the TYPE terminal to be an abnormal state, namely, an error state, and does not perform communication with the camera accessory.

With this configuration, in the camera body 100 according to this embodiment, a voltage having a level that exceeds the rated voltage can be prevented from being applied to the camera accessory in a state where the type of camera accessory mounted on the camera body 100 is erroneously determined.

Operation when Camera Accessory is Mounted on Camera Body 100

Figure 12:
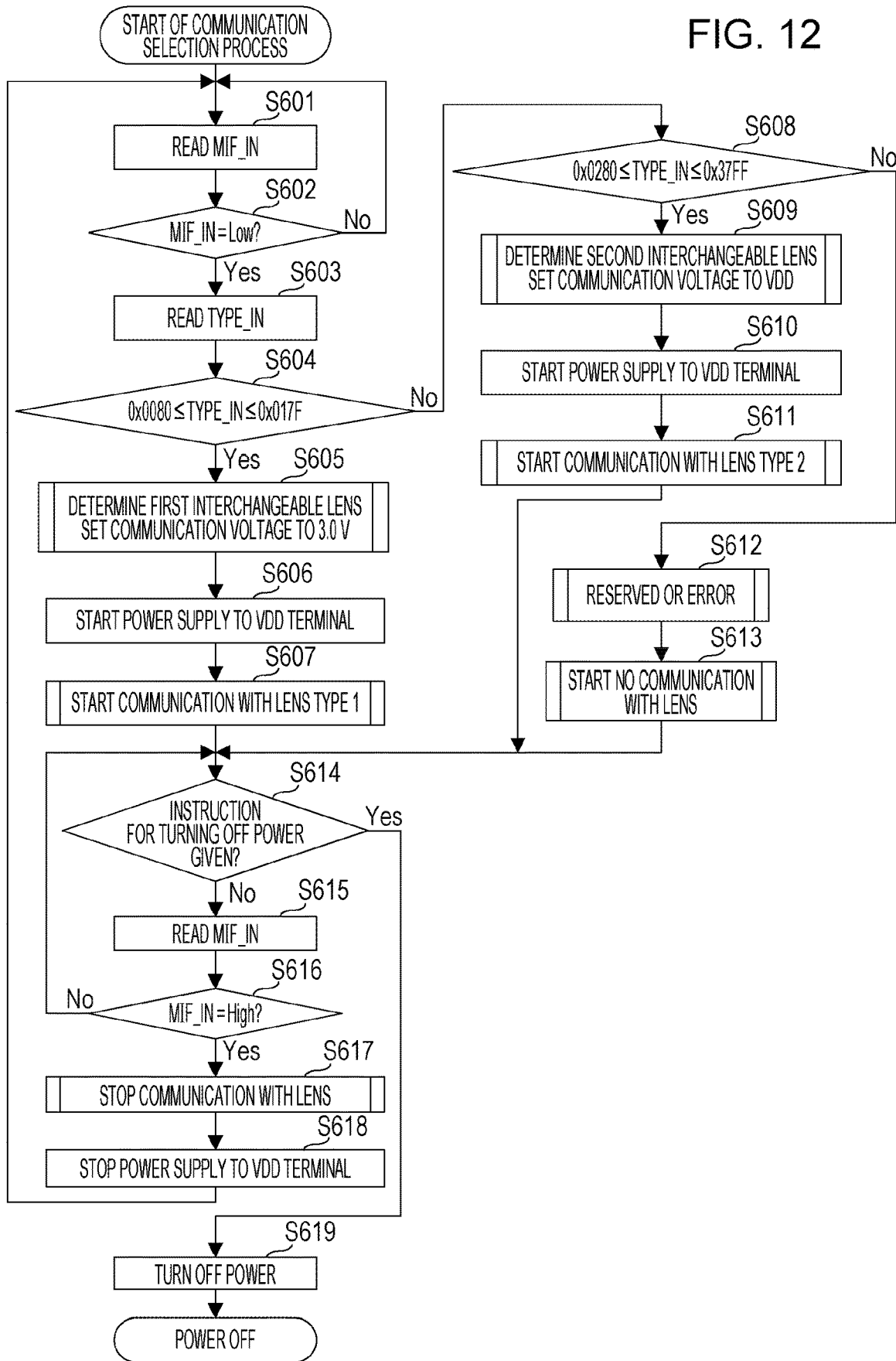
FIG. 12 is a flowchart illustrating an operation up to the start of first communication when a camera accessory is mounted on the camera body.

Now, as an operation when a camera accessory is mounted on the camera body 100, a communication selection process that is a process up to the start of first communication described above is described with reference to FIG. 12. FIG. 12 is a flowchart illustrating an operation up to the start of first communication when a camera accessory is mounted on the camera body 100. In this embodiment, a program corresponding to the flowchart illustrated in FIG. 12 is stored in a memory (not illustrated) provided in the camera controller 101, and the camera controller 101 reads the program from the memory and executes the program. Therefore, it is assumed that an operation in each step described below is performed by the camera controller 101. The operation need not be an operation following the predetermined program, and each unit of the camera body 100 and the camera accessory may give an instruction to perform an operation in a corresponding step. The camera controller 101 according to this embodiment functions as a detector that detects the level of a voltage indicated by each terminal and a controller that controls communication via each communication terminal.

First, in response to an instruction for turning on the power of the camera body 100 given by an operation of, for example, a power switch (not illustrated) provided in the camera body 100, a communication selection process is started. In step S601, the camera controller 101 reads the voltage level of a MIF_IN terminal and stores information regarding the state of the MIF_IN terminal based on the read voltage level in a random access memory (RAM) area (not illustrated) in the above-described memory.

Next, in step S602, on the basis of the information regarding the state of the MIF_IN terminal stored in the RAM area, if the MIF_IN terminal indicates High, the camera controller 101 determines that no camera accessory is mounted on the camera body 100, and the flow returns to step S601. If the MIF_IN terminal indicates Low, the camera controller 101 determines that a camera accessory is mounted on the camera body 100.

Next, in step S603, the camera controller 101 reads the level of a voltage input to the TYPE_IN terminal after AD conversion and stores information regarding the state of the TYPE_IN terminal based on the read voltage level in the RAM area described above.

Next, in step S604, as the state of the TYPE_IN terminal read from the RAM area, the camera controller 101 determines whether the level of the voltage input to the TYPE_IN terminal is equal to or larger than "0x0080" and equal to or smaller than "0x017F". If the camera controller 101 determines that the level of the voltage input to the TYPE_IN terminal is equal to or larger than "0x0080" and equal to or smaller than "0x017F", the flow proceeds to step S605. If the above-described condition is not satisfied, the flow proceeds to step S608.

Next, in step S605, the camera controller 101 determines that the camera accessory mounted on the camera body 100 is the first interchangeable lens 200 (lens type 1) and controls the power switching unit 104 to set the communication interface power Vs to 3.0 V.

Next, in step S606, the camera controller 101 starts power supply from the camera power supply unit 103 to the VDD terminal.

Next, in step S607, the camera controller 101 sets a communication voltage of 3.0 V and starts first communication using the terminals corresponding to the first communication unit, and the flow proceeds to step S614.

In step S608, as the state of the TYPE_IN terminal read from the RAM area, the camera controller 101 determines whether the level of the voltage input to the TYPE_IN terminal is equal to or larger than "0x0280" and equal to or smaller than "0x037F". If the camera controller 101 determines that the level of the voltage input to the TYPE_IN terminal is equal to or larger than "0x0280" and equal to or smaller than "0x037F", the flow proceeds to step S609. If the above-described condition is not satisfied, the flow proceeds to step S612.

Next, in step S609, the camera controller 101 determines that the camera accessory mounted on the camera body 100 is the second interchangeable lens 300 (lens type 2) with the adaptor 400 therebetween and controls the power switching unit 104 to set the power Vs to VDD (5.0 V).

Next, in step S610, the camera controller 101 starts power supply from the camera power supply unit 103 to the VDD terminal.

Next, in step S611, the camera controller 101 sets a communication voltage of 5.0 V and starts first communication using the terminals corresponding to the first communication unit, and the flow proceeds to step S614.

In step S612, the camera controller 101 determines that the camera accessory mounted on the camera body 100 is a camera accessory not corresponding to the camera body 100 (Reserved) or determines that a predetermined terminal is in an abnormal (error) state.

Then, in step S613, the camera controller 101 does not start communication with the camera accessory and controls each unit of the camera body 100 to perform a process for warning display regarding, for example, the error on the display 15, and the flow proceeds to step S614.

In step S614, the camera controller 101 determines whether an instruction for turning off the power of the camera body 100 is given by an operation of, for example, the power switch (not illustrated). If the camera controller 101 determines in step S614 that an instruction for turning off the power is given, the flow proceeds to step S619, the camera controller 101 turns off the power of the camera body 100, and the communication selection process ends. If the camera controller 101 determines in step S614 that an instruction for turning off the power is not given, the flow proceeds to step S615.

Next, in step S615, the camera controller 101 reads the level of a voltage of the MIF_IN terminal again and stores information regarding the state of the MIF_IN terminal based on the read voltage level in the RAM area described above. In the process in step S615, the camera controller 101 may update (overwrite) the information regarding the state of the MIF_IN terminal read in the process in step S601 described above or may store the information separately in another memory area.

Next, in step S616, on the basis of the information regarding the state of the MIF_IN terminal stored in the RAM area, the camera controller 101 determines whether the MIF_IN terminal indicates High. If the camera controller 101 determines in step S616 that the MIF_IN terminal indicates High, the camera controller 101 determines that the camera accessory is dismounted from the camera body 100, and the flow proceeds to step S617. If the camera controller 101 determines in step S616 that the MIF_IN terminal does not indicate High (that is, indicates Low), the camera controller 101 determines that the camera accessory remains mounted on the camera body 100, and the flow returns to step S614.

In step S617, the camera controller 101 stops communication with the camera accessory. In step S618, the camera controller 101 stops power supply from the camera power supply unit 103 to the VDD terminal, and the flow returns to step S601. Thereafter, the camera controller 101 repeatedly performs the processes described above.

Although not illustrated in FIG. 12, at a predetermined timing, the camera controller 101 determines whether driving power (VBAT) is supplied from the camera body 100 to the camera accessory using the VBAT terminal and supplies VBAT in accordance with the result of determination.

Details of First, Second, and Third Communication

Now, various types of communication performed between the camera body 100 and a camera accessory mounted on the camera body 100 are described. First, a description of first communication is given. As described above, first communication is one type of communication performed between the camera body 100 and a camera accessory mounted on the camera body 100. The first communication unit is a clock synchronous communication system or a start-stop synchronous communication system using the LCLK terminal, the DCL terminal, and the DLC terminal, which correspond to the first communication unit.

In this embodiment, both the first interchangeable lens 200 and the second interchangeable lens 300 support first communication. However, the communication voltage relating to first communication differs between the first interchangeable lens 200 and the second interchangeable lens 300 as described above.

First communication is used to transmit a drive instruction for, for example, driving a focus lens, driving a zoom lens, or driving a diaphragm to the camera accessory. In the camera accessory that receives such a drive instruction, an operation corresponding to the drive instruction is performed. First communication is also used to transmit information (state information) regarding the state of the camera accessory, such as the position of a focus lens, the focal length, and the aperture diameter (f-number) of the diaphragm, from the camera accessory to the camera body 100.

Next, a description of second communication is given. As described above, second communication is one type of communication performed between the camera body 100 and the first interchangeable lens 200 and is asynchronous communication using the DLC2 terminal, which corresponds to the second communication unit. The second interchangeable lens 300 does not include the terminal, such as the DLC2 terminal, corresponding to the second communication unit, and therefore, second communication is not performed between the camera body 100 and the second interchangeable lens 300.

In second communication, the first interchangeable lens 200 serves as a master unit (master) and transmits a predetermined amount of optical data including the position of a focus lens, the position of a zoom lens, an f-number, and the state of an image stabilizing lens in the first interchangeable lens 200 to the camera body 100. In second communication, the camera body 100 serves as a slave unit (slave). Regarding the types of pieces of data transmitted from the first interchangeable lens 200 to the camera body 100 and the order in which the pieces of data are transmitted, the camera body 100 gives an instruction to the first interchangeable lens 200 in first communication described above.

Figure 13:
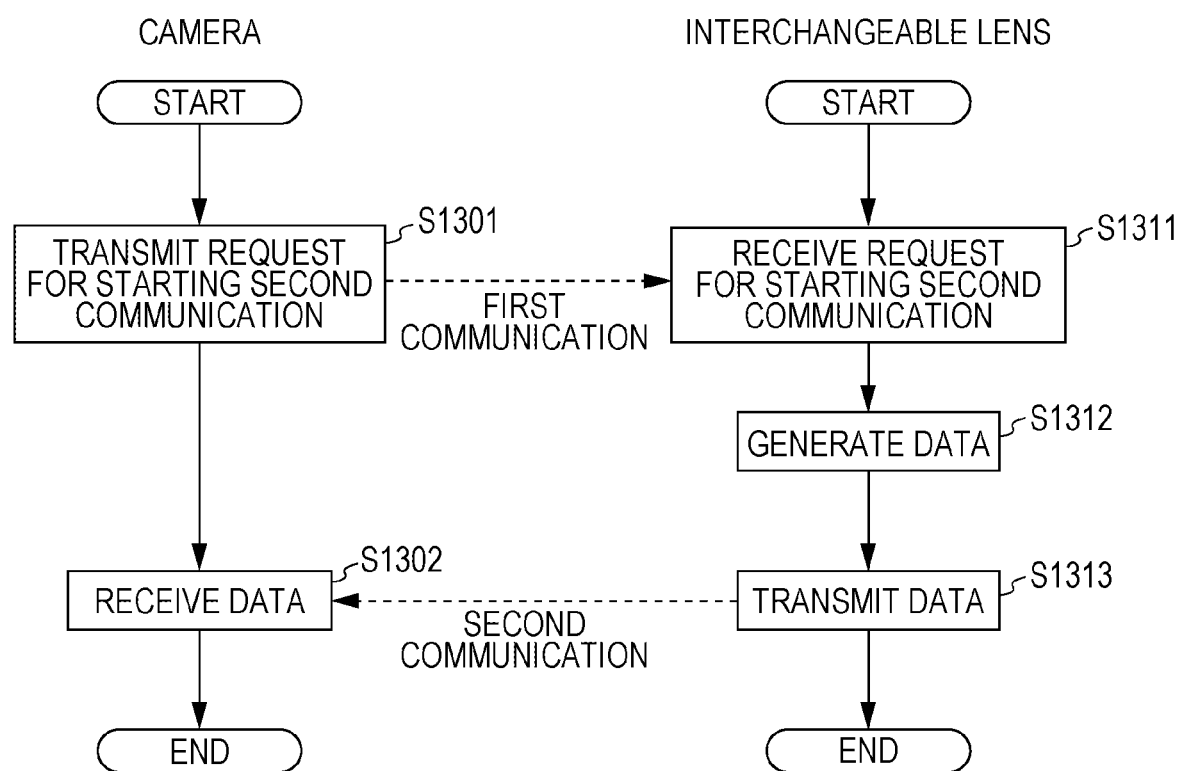
FIG. 13 is a flowchart illustrating operations relating to second communication.

Now, operations in the camera and in the camera accessory in a case of performing second communication are described with reference to FIG. 13. FIG. 13 is a flowchart illustrating operations relating to second communication. In this embodiment, a program corresponding to the flowchart illustrated in FIG. 13 is stored in a memory (not illustrated), and the camera controller 101 and the first lens controller 201 read the program from the memory and execute the program. Therefore, it is assumed that an operation in each step described below is performed by the camera controller 101 or the first lens controller 201. The operation need not be an operation following the predetermined program, and each unit of the camera body 100 and the first interchangeable lens 200 may give an instruction to perform an operation in a corresponding step.

Second communication illustrated in FIG. 13 starts at the timing when control of image capturing of an object is started in the camera body 100. First, in step S1301, in the camera body 100, the camera controller 101 transmits a request for starting second communication to the first interchangeable lens 200 via first communication. The start request transmitted in step S1301 includes a register communication command in which the types of pieces of data intended to be obtained from the first interchangeable lens 200 via second communication and the order in which these pieces of data are received are set in advance.

Next, in step S1311, in the first interchangeable lens 200, the first lens controller 201 receives the start request transmitted from the camera body 100, and the flow proceeds to step S1312. In step S1312, in the first interchangeable lens 200, the first lens controller 201 generates various pieces of data based on the register communication command included in the start request in the specified order.

Next, in step S1313, the first lens controller 201 transmits the pieces of data generated in the first interchangeable lens 200 to the camera body 100 via second communication. That is, in step S1313, the first lens controller 201 transmits the pieces of data generated in the first interchangeable lens 200 to the camera body 100 using the DLC2 terminal 2009 of the first interchangeable lens 200 and the DLC2 terminal 1009 of the camera body 100.

Next, in the camera body 100, in the process in step S1302, the camera controller 101 sequentially receives the pieces of data transmitted from the first interchangeable lens 200 via second communication and ends second communication when reception of the specified pieces of data is completed. In this embodiment, each time control of image capturing of an object is started, the flow illustrated in FIG. 13 is performed.

As described above, in a case of performing second communication, a start request is transmitted via first communication; however, communication using an independent communication system different from the communication system of first communication described above can be performed using the terminal corresponding to the second communication unit different from the terminals corresponding to the first communication unit. With this configuration, communication of various pieces of data (for example, optical data) can be performed between the camera body 100 and the first interchangeable lens 200 as second communication without interfering with communication (for example, a control request to an actuator) performed in first communication. As described above, a request for starting second communication is transmitted from the camera body 100 to the first interchangeable lens 200 via first communication, and therefore, first communication needs to be established before second communication is performed.

Now, a description of third communication is given. As described above, third communication is one type of communication performed between the camera body 100 and the first interchangeable lens 200, between the camera body 100 and the adaptor 400, and between the camera body 100 and the intermediate accessory 500. Third communication is asynchronous communication using the DCA terminal and the CS terminal, which correspond to the third communication unit. As described above, the second interchangeable lens 300 does not include the terminals that correspond to the third communication unit, and therefore, third communication is not performed between the camera body 100 and the second interchangeable lens 300.

In third communication, the camera body 100 serves as a master unit (master) in communication, and the first interchangeable lens 200, the adaptor 400, or the intermediate accessory 500 that is directly or indirectly mounted on the camera body 100 serves as a slave unit (slave) in communication.

In the examples described above, the case has been described where one adaptor 400 or one intermediate accessory 500 is interposed between the camera body 100 and a predetermined interchangeable lens, as illustrated in FIG. 6 or FIG. 9; however, the examples are not restrictive. For example, one or more adaptors 400 and/or one or more intermediate accessories 500, namely, two or more camera accessories in total, may be interposed between the camera body 100 and a predetermined interchangeable lens. Therefore, in third communication, a plurality of slaves may be connected in series to one master involved in communication. Accordingly, third communication allows switching between a broadcast communication mode in which a signal is transmitted from the camera body 100 to a plurality of camera accessories (slaves) simultaneously and a P2P (peer-to-peer) mode in which a specific camera accessory is specified and communication is performed for the specified camera accessory.

Figure 14:
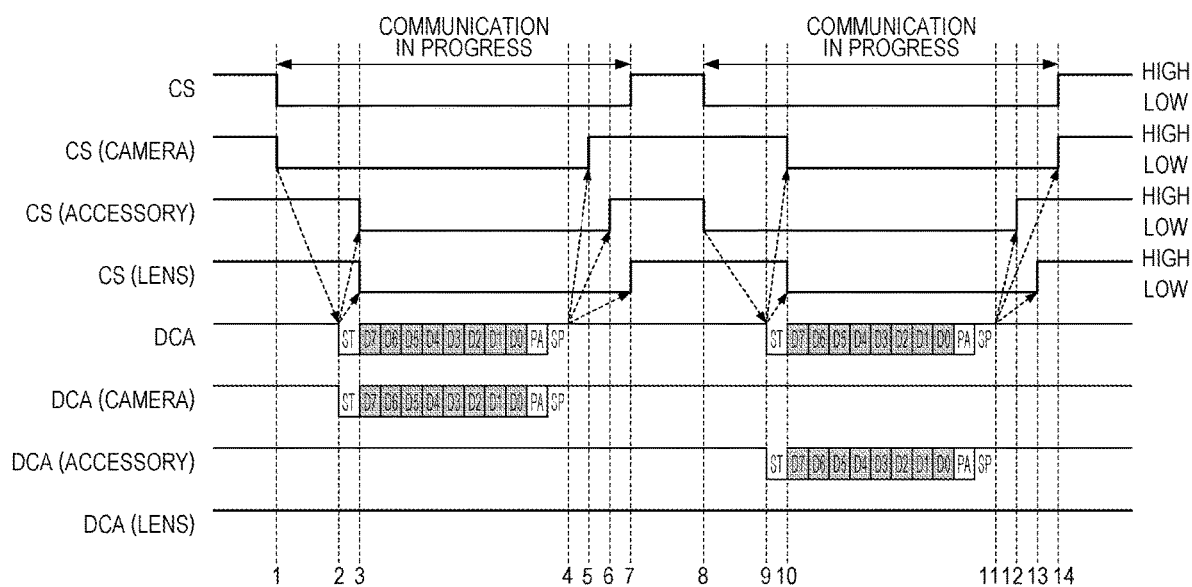
FIG. 14 is a timing chart illustrating broadcast communication in third communication.

In the broadcast communication mode and in the P2P mode in third communication, the DCA terminal functions as a communication data terminal that allows two-way communication. The CS terminal functions differently in the broadcast communication mode and in the P2P mode. Regarding the details, broadcast communication is first described with reference to FIG. 14. FIG. 14 is a timing chart illustrating broadcast communication in third communication. FIG. 14 illustrates a case where the first interchangeable lens 200 is mounted on the camera body 100 with the intermediate accessory 500 therebetween.

In FIG. 14, in broadcast communication in third communication, communication signals via the CS terminals are illustrated as "CS (camera)", "CS (lens)", and "CS (accessory)". Communication signals via the DCA terminals are illustrated as "DCA (camera)", "DCA (lens)", and "DCA (accessory)". In FIG. 14, "CS" and "DCA" represent signal waveforms respectively indicated by the CS terminals and the DCA terminals in the camera body 100, in the intermediate accessory 500, and in the first interchangeable lens 200 at predetermined communication control timings. Hereinafter, a case is described where, in response to broadcast communication from the camera controller 101 to the first lens controller 201 and to the accessory controller 501, broadcast communication is performed from the accessory controller 501 to the camera controller 101 and to the first lens controller 201.

In a description given below, a signal line connected to the CS terminal is referred to as a signal line CS, and a signal line connected to the DCA terminal is referred to as a signal line DCA. At the timing <1> illustrated in FIG. 14, the camera controller 101 starts Low output to the signal line CS. This operation is an operation for sending a notification of the start of broadcast communication from the camera controller 101, which is a communication master, to the first lens controller 201 and to the accessory controller 501, which are communication slaves.

Next, at the timing <2> illustrated in FIG. 14, the camera controller 101 outputs transmission target data to the signal line DCA. At the timing <3> illustrated in FIG. 14, the first lens controller 201 and the accessory controller 501 detect the start bit ST input to the signal line DCA and start Low output to the signal line CS. The camera controller 101 started Low output to the signal line CS at the timing <1>, and therefore, the signal level of the signal line CS in the camera does not change at the timing <3>.

Next, when output up to the stop bit SP in the transmission data is completed at the timing <4> illustrated in FIG. 14, the camera controller 101 stops Low output to the signal line CS at the timing <5>. When the first lens controller 201 and the accessory controller 501 have received the data up to the stop bit SP, the first lens controller 201 and the accessory controller 501 analyze the received data and perform internal processing for the received data. When the first lens controller 201 and the accessory controller 501 have completed the internal processing and are ready to receive next data, the first lens controller 201 and the accessory controller 501 respectively stop Low output to the signal line CS at the timings <7> and <6> illustrated in FIG. 14.

The time taken to perform an analysis of the received data and internal processing of the received data differs depending on the processing capacity of the CPU provided in each controller. Therefore, for continuous communication, each controller needs to know the timing at which the other controller completes internal processing of the received data.

In this embodiment, the CS terminal performs open-drain-type output as described above. Therefore, the signal level of the signal line CS becomes High output when all of the camera controller 101, the first lens controller 201, and the accessory controller 501 stop Low output to the signal line CS. That is, each controller (CPU) involved in broadcast communication checks to see that the signal level of the signal line CS becomes High output and determines that the other controllers (CPUs) are ready to perform next communication. With this configuration, the camera body 100 and a predetermined camera accessory according to this embodiment can continuously perform appropriate communication.

Next, at the timing <8> illustrated in FIG. 14, the accessory controller 501 checks to see that High output of the signal line CS is stopped. Then, the accessory controller 501 starts Low output to the signal line CS to send a notification of the start of broadcast communication to the camera controller 101 and to the first lens controller 201.

Next, at the timing <9> illustrated in FIG. 14, the accessory controller 501 outputs transmission target data to the signal line DCA.

The camera controller 101 and the first lens controller 201 detect the start bit ST input from the signal line DCA and start Low output to the signal line CS at the timing <10> illustrated in FIG. 14. The accessory controller 501 started Low output to the signal line CS at the timing <8>, and therefore, the signal level of the signal line CS in the accessory does not change at the timing <10>.

Next, at the timing <11> illustrated in FIG. 14, the accessory controller 501 completes output up to the stop bit SP, and thereafter, the accessory controller 501 stops Low output to the signal line CS at the timing <12>. The camera controller 101 and the first lens controller 201 receive the data up to the stop bit SP input from the signal line DCA. Thereafter, the camera controller 101 and the first lens controller 201 analyze the received data and perform internal processing associated with the received data, and stop Low output to the signal line CS at the timings <14> and <13> respectively at which the camera controller 101 and the first lens controller 201 are ready to receive next data.

As described above, in the broadcast communication mode of third communication according to this embodiment, the signal line CS functions as a signal line for transmitting a signal indicating that broadcast communication starts and is in progress (ongoing).

Now, the functions of the CS terminal in the P2P mode in third communication are described with reference to FIG. 15. FIG. 15 is a timing chart illustrating P2P communication in third communication. FIG. 15 illustrates a case where the first interchangeable lens 200 is mounted on the camera body 100 with the intermediate accessory 500 therebetween. The signal lines and the signal waveforms illustrated in FIG. 15 are substantially the same as those in the broadcast communication mode described with reference to FIG. 14, and therefore, descriptions thereof will be omitted.

Hereinafter, a case is described where the camera controller 101 transmits one-byte data to the first lens controller 201, and the first lens controller 201 transmits two-byte data to the camera controller 101 in response to the one-byte data.

In a description given below, a signal line connected to the CS terminal is referred to as a signal line CS, and a signal line connected to the DCA terminal is referred to as a signal line DCA. At the timing <15> illustrated in FIG. 15, the camera controller 101 sends to the first lens controller 201 an instruction for making specific data be transmitted via the signal line DCA.

Next, at the timing <16> illustrated in FIG. 15, output up to the stop bit SP is completed on the signal line DCA of the camera, and thereafter, the camera controller 101 starts Low output to the signal line CS at the timing <17>. Then, the camera controller 101 makes itself ready for receiving data while outputting Low to the signal line CS and stops Low output to the signal line CS at the timing <18> at which the camera controller 101 is ready for reception.

After the first lens controller 201 has detected the Low signal on the signal line CS output by the camera controller 101, the first lens controller 201 analyzes the instruction received from the camera controller 101 and performs internal processing relating to the instruction. Subsequently, the first lens controller 201 checks to see that Low output of the signal line CS in the camera was stopped, and thereafter, the first lens controller 201 transmits data corresponding to the instruction received from the camera controller 101, by using the signal line DCA at the timing <19> illustrated in FIG. 15.

Next, at the timing <20> illustrated in FIG. 15, the first lens controller 201 completes output up to the stop bit SP of the second byte, and thereafter, the first lens controller 201 starts Low output to the signal line CS of the lens at the timing <21>. Subsequently, the first lens controller 201 is ready for receiving next data, and thereafter, the first lens controller 201 stops Low output to the signal line CS at the timing <22> illustrated in FIG. 15. In the description of FIG. 15, the accessory controller 501, which is not selected as a communication partner in P2P communication, is not involved in various operations on the signal line CS and the signal line DCA.

As described above, in the P2P mode of third communication according to this embodiment, the signal line CS functions as a signal line for sending a notification of the end of transmission of data on the transmission side and for sending a standby request relating to data transmission.

As described above, in third communication according to this embodiment, the CS terminal functions differently in the broadcast communication mode and in the P2P mode. With this configuration, the signal line CS and the signal line DCA respectively relating to the CS terminal and the DCA terminal, namely, only two signal lines in total, are used to enable communication in both the broadcast communication mode and in the P2P mode.

Transmission and reception of various types of data using third communication are performed using the DCA terminal in which the output type is the CMOS output type. With this configuration, even if the output type of the CS terminal is the open drain type, high-speed communication is enabled.

Order in which Terminals are Arranged

On the basis of the circuit configurations and the operations of the camera body 100 and each camera accessory described above, the arrangement of the terminals disposed in the camera mount A and in the lens mount B according to this embodiment is described in detail below.

First, the arrangement of the MIF terminals is described. Here, a case is assumed where the MIF terminal 1005 in the camera mount is disposed at a position so that the MIF terminal 1005 slides on terminals (contact faces) other than the MIF terminal 2005 disposed in the lens mount B, or connection of the MIF terminals is completed prior to connection of the DGND terminals and the PGND terminals. In this case, in a state where the lens mount B is not completely mounted on the camera mount A, power is not supplied from the camera body 100 to the camera accessory. Therefore, when the terminals provided in the lens mount B slide on the terminals in the camera mount A, and the MIF terminal 1005 comes into contact with a terminal other than the MIF terminal 2005, a voltage level indicated by the MIF terminal 1005 may instantaneously become Low.

In this case, although the terminals of one of the mounts and the corresponding terminals of the other mount are not completely connected to each other, the camera body 100 erroneously detects mounting of the camera accessory. Therefore, power supply may be started in a state where the camera accessory is not completely mounted on the camera body 100, power supply and ground connection might not be electrically stable, and a malfunction or a failure may occur in the camera body 100 and in the camera accessory. This issue may similarly arise in a case where the MIF terminals are connected to each other prior to connection of the ground terminals.

For the issues described above, in this embodiment, in the camera mount A and in the lens mount B, the MIF terminals 1005 and 2005 are disposed on the far side in the lens mount direction on the camera mount lower stage and on the lens mount upper stage respectively. That is, in this embodiment, the terminals are disposed at positions so that the MIF terminal 1005 of the camera mount A does not slide on any terminals other than the MIF terminal 2005 of the lens mount B when the lens mount is mounted on or dismounted from the camera mount. With this structure, erroneous detection of mounting of a camera accessory by the camera body 100 can be prevented. Further, with this structure, power is supplied from the camera body 100 to the camera accessory in a state where the corresponding power-supply-system terminals are connected to each other and the corresponding ground terminals are connected to each other with certainty. Therefore, in the camera body 100 and each camera accessory according to this embodiment, the possibility of a malfunction or a failure in the camera body 100 and in the camera accessory can be reduced.

Next, the arrangement of the DLC terminal, the DCL terminal, and the LCLK terminal, which correspond to the first communication unit, is described. As described above, drive control information and state information are obtained using first communication between the camera body 100 and the first interchangeable lens 200 and between the camera body 100 and the second interchangeable lens 300, for example. In other words, main data used in an operation of image capturing of an object using the camera body 100 is transmitted and received via first communication. Even if terminals slide on other terminals, and the terminals corresponding to the second and third communication units wear out, resulting in unstable electrical connections between the terminals corresponding to the second and third communication units, main drive control for the camera accessory involved in the image capturing operation can be performed as long as first communication is properly performed. Therefore, the terminals corresponding to the first communication unit are more important terminals for performing an image capturing operation than the terminals corresponding to the second and third communication units.

Accordingly, in the camera mount A according to this embodiment, the terminals corresponding to the first communication unit are disposed at positions so that the number of times the terminals slide on other terminals (the number of times the terminals come into contact with other terminals) is smaller than the number of times the terminals corresponding to the second and third communication units slide on other terminals. Specifically, in the camera mount A according to this embodiment, the DLC terminal, the DCL terminal, and the LCLK terminal, which correspond to the first communication unit, are disposed further in the lens mount direction than the DLC2 terminal, the CS terminal, and the DCA terminal. The DLC terminal, the DCL terminal, and the LCLK terminal, in the camera mount A, which correspond to the first communication unit, are disposed at positions so that the number of times the terminals slide on other terminals (the number times the terminals come into contact with other terminals) is smallest next to the MIF terminal. Therefore, in the lens mount B, the terminals of the lens mount B are disposed according to the disposition of the terminals of the camera mount A.

With this structure, durability to sliding (contact) of terminals corresponding to the number of times a camera accessory is mounted on and dismounted from the camera body 100 can be increased for the group of terminals corresponding to the first communication unit to a larger degree than for the terminals corresponding to the second and third communication units. Therefore, in the camera body 100 and in the camera accessories according to this embodiment, the possibility of a communication failure due to wearing out of the contact pins and contact faces corresponding to the DCL terminals, the DLC terminals, and the LCLK terminals, which correspond to the first communication unit, can be reduced, and communication reliability of the camera body 100 and the camera accessories can be increased.

Figure 16A:
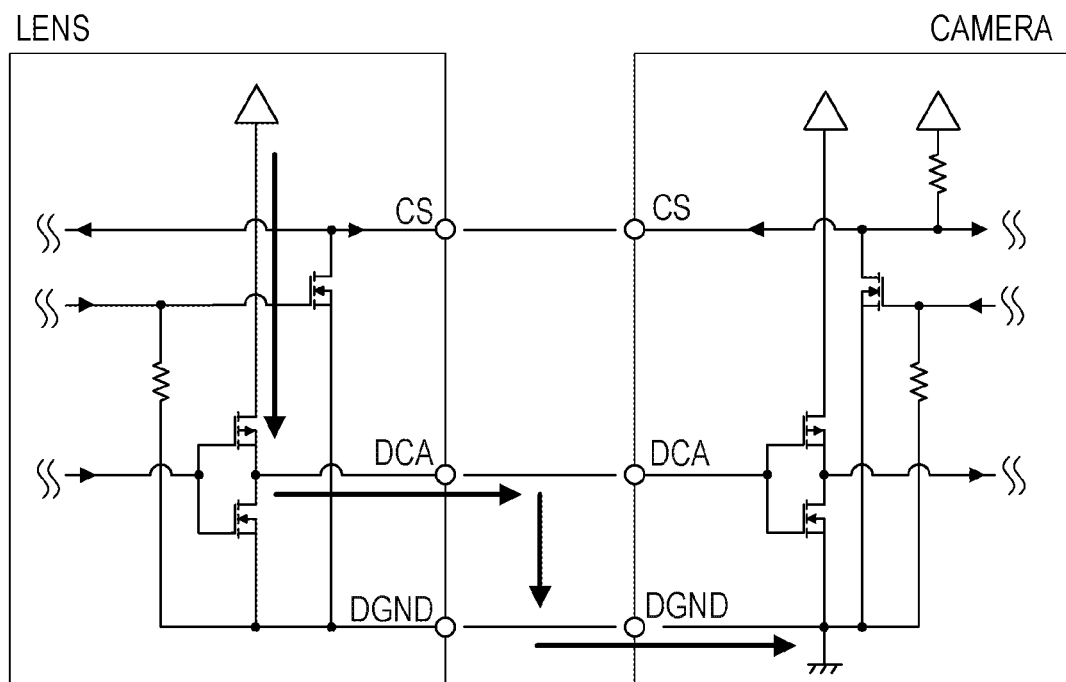
FIGS. 16A and 16B are diagrams illustrating the internal configuration of a CS terminal, a DCA terminal, and a DGND terminal in a camera mount and in a lens mount.
Figure 16B:
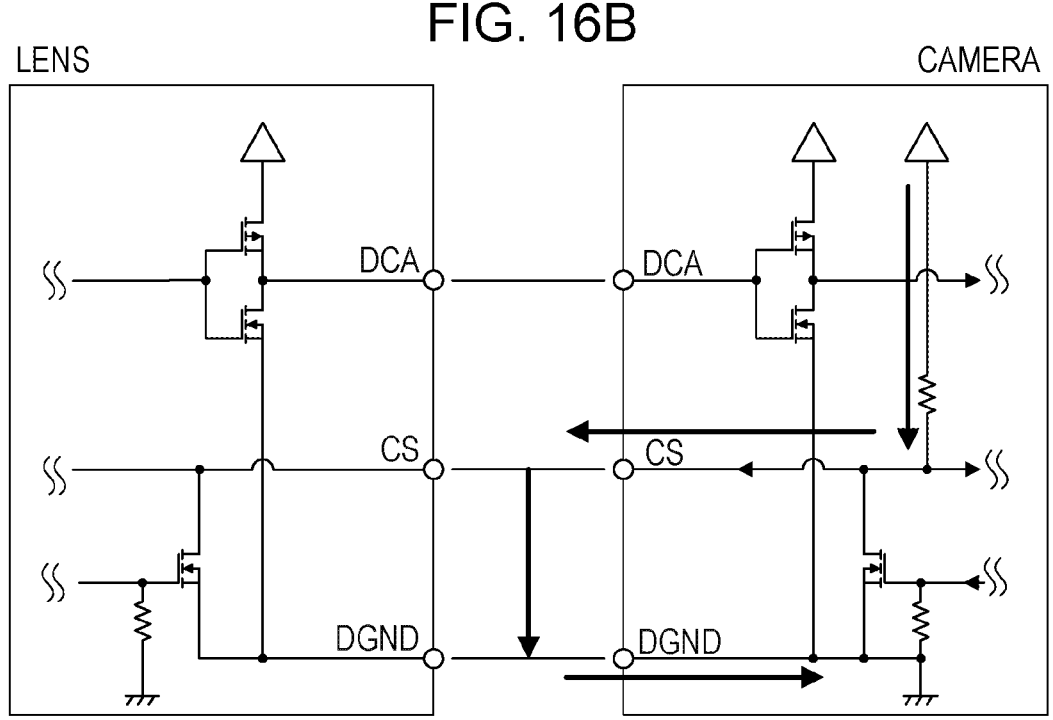

Next, the arrangement of the DGND terminal and the CS terminal is described with reference to FIGS. 16A and 16B. FIGS. 16A and 16B are diagrams illustrating the internal configuration of the CS terminal, the DCA terminal, and the DGND terminal in the camera mount A and in the lens mount B. FIG. 16A illustrates an example where the DCA terminal is disposed adjacent to the DGND terminal, which is different from the order in which the terminals are disposed as described in this embodiment. FIG. 16B illustrates the order in which the terminals are disposed according to this embodiment.

As described above, the DCA terminal is a CMOS-output-type terminal. Therefore, when an inter-terminal short circuit occurs between the DCA terminal and the DGND terminal, as illustrated in FIG. 16A, a relatively large current flows in the direction indicated by the arrows in FIG. 16A. Specifically, when a voltage level indicated by the DCA terminal is set to High output in a state where, for example, a conductive foreign object is adhered between the DCA terminal and the DGND terminal, a short circuit occurs between the DCA terminal, which is a CMOS-output-type terminal, and the DGND terminal. In this case, an unintended large current may flow into the DGND terminal of the camera along the path indicated by the arrows illustrated in FIG. 16A. Then, a failure may occur in an electric circuit in the camera body 100.

On the other hand, in this embodiment, the DGND terminal is adjacent to the CS terminal, as illustrated in FIG. 16B. As described above, the CS terminal is a terminal that performs open-type output. Therefore, even in a case where, for example, a conductive foreign object is adhered between the DGND terminal and the CS terminal, and a short circuit occurs between the DGND terminal and the CS terminal, only a small current flows into the DGND terminal along the path indicated by the arrows illustrated in FIG. 16B. Specifically, the CS terminal is a terminal that indicates open-type output, and therefore, even in a case where a short circuit occurs between the DGND terminal and the CS terminal, only a small current of a low voltage level flows into the DGND terminal of the camera from the power supply of the camera via a pull-up resistor. Therefore, in the camera body 100 and the camera accessories according to this embodiment, which employ the above-described configuration, a failure that may occur in an electric circuit in the camera body 100 due to a large current flowing into the ground via the DGND terminal of the camera can be prevented.

Figure 17A:
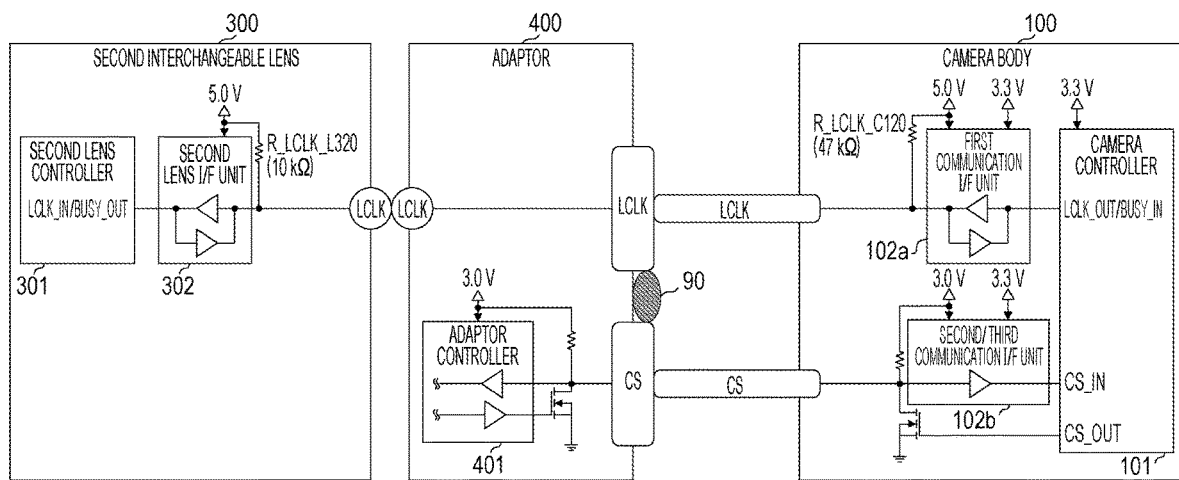
FIGS. 17A to 17D are diagrams each illustrating an effect, produced in an electric circuit, that differs depending on a terminal that is disposed adjacent to an LCLK terminal.
Figure 17B:
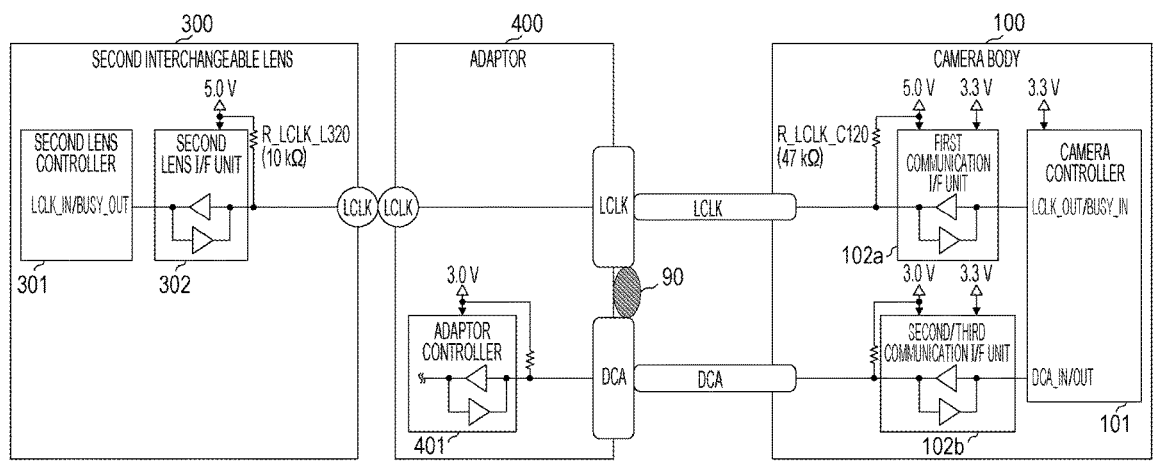
Figure 17C:
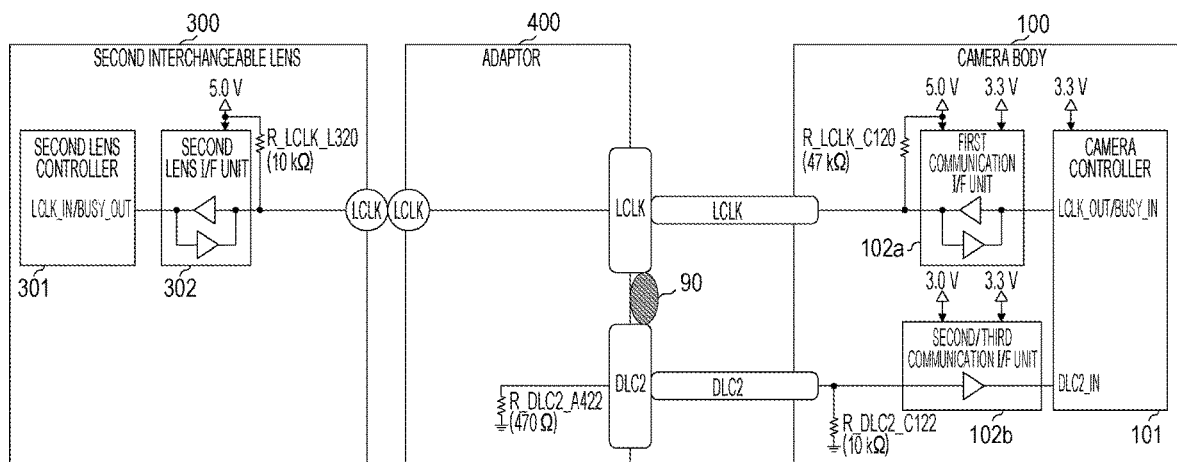
Figure 17D:
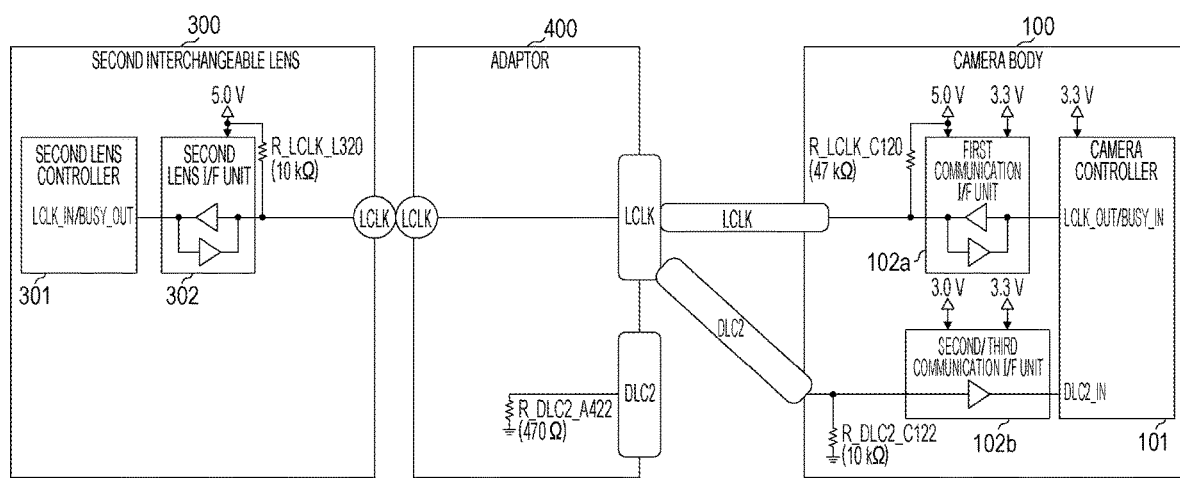

Now, the arrangement of the DLC2 terminal and the LCLK terminal is described with reference to FIGS. 17A to 17D. FIGS. 17A to 17D are diagrams each illustrating an effect, produced in an electric circuit, that differs depending on a terminal that is disposed adjacent to the LCLK terminal. FIG. 17A illustrates a case where the CS terminal is disposed adjacent to the LCLK terminal. FIG. 17B illustrates a case where the DCA terminal is disposed adjacent to the LCLK terminal. FIG. 17C illustrates a case where the DLC2 terminal is disposed adjacent to the LCLK terminal and a foreign object is present between the terminals. FIG. 17D illustrates a case where the DLC2 terminal is disposed adjacent to the LCLK terminal and a bent terminal comes into contact with an adjacent terminal. FIGS. 17A to 17D illustrate a case where the second interchangeable lens 300 is mounted on the camera body 100 with the adaptor 400 therebetween.

As illustrated in FIG. 17A, the example case is assumed where the CS terminal is disposed adjacent to the LCLK terminal in the camera body 100 and in the adaptor 400. FIG. 17A illustrates the case where a conductive foreign object 90 is present between the LCLK terminal and the CS terminal of the adaptor 400, and the terminals are electrically continuous, resulting in a short circuit between the terminals.

The case is assumed where the second interchangeable lens 300 is mounted on the camera body 100 with the adaptor 400 therebetween. In this case, the signal lines of the LCLK terminals are pull-up connected to VDD (5.0 V) via the resistor R_LCLK_C 120 in the camera body 100 and via a resistor R_LCLK_L 320 in the second interchangeable lens 300 respectively, as illustrated. The CS terminals are pull-up connected to a voltage level of 3.0 V via a resistance (resistor) provided within the camera body 100 and via a resistance (resistor) provided within the adaptor 400 respectively.

In this case, when a short circuit occurs between the LCLK terminal and the CS terminal, a voltage of 3.0 V or more is applied to the signal lines of the CS terminals from the signal lines of the LCLK terminals via the resistor R_LCLK_C 120 and via the resistor R_LCLK_L 320 respectively. Both the second/third communication I/F unit 102b and the adaptor controller 401 usually operate with power of a power voltage of 3.0 V. However, if a short circuit occurs between the terminals as described above, a voltage equal to or higher than an upper-limit voltage is applied to elements, such as the second/third communication I/F unit 102b and the adaptor controller 401. As a result, a failure may occur in an electric circuit in the adaptor 400 and in the camera body 100.

The upper-limit voltage is a rated voltage and is a voltage at which a failure does not occur in an electric circuit connected to each terminal. Alternatively, the upper-limit voltage is an operating voltage and is a voltage at which an electric circuit connected to each terminal can normally operate.

As illustrated in FIG. 17B, the example case is assumed where the DCA terminal is disposed adjacent to the LCLK terminal in the camera body 100 and in the adaptor 400. FIG. 17B illustrates the case where the conductive foreign object 90 is present between the LCLK terminal and the DCA terminal of the adaptor 400, and the terminals are electrically continuous, resulting in a short circuit between the terminals.

The case is assumed where the second interchangeable lens 300 is mounted on the camera body 100 with the adaptor 400 therebetween. In this case, the signal lines of the LCLK terminals are pull-up connected to VDD (5.0 V) via the resistor R_LCLK_C 120 in the camera body 100 and via the resistor R_LCLK_L 320 in the second interchangeable lens 300 respectively, as illustrated. The DCA terminals are pull-up connected to a voltage level of 3.0 V via a resistance (resistor) provided within the camera body 100 and via a resistance (resistor) provided within the adaptor 400 respectively.

In this case, when a short circuit occurs between the LCLK terminal and the DCA terminal, a voltage of 3.0 V or more is applied to the signal lines of the DCA terminals from the signal lines of the LCLK terminals via the resistor R_LCLK_C 120 and via the resistor R_LCLK_L 320 respectively. Both the second/third communication I/F unit 102b and the adaptor controller 401 usually operate with power of a power voltage of 3.0 V. However, if a short circuit occurs between the terminals as described above, a voltage equal to or higher than the upper-limit voltage is applied to elements, such as the second/third communication I/F unit 102b and the adaptor controller 401. As a result, a failure may occur in an electric circuit in the adaptor 400 and in the camera body 100.

For the above-described reasons, it is not desirable to set the CS terminal or the DCA terminal as a terminal, corresponding to the second and third communication units, that is adjacent to the LCLK terminal, which corresponds to the first communication unit, on the near side in the lens mount direction.

Hereinafter, the case where the DLC2 terminal is disposed adjacent to the LCLK terminal as the configuration according to this embodiment is described. As illustrated in FIG. 17C, the case is assumed where the LCLK terminal and the DLC2 terminal are arranged adjacent to each other, and a short circuit occurs between the terminals due to the presence of the conductive foreign object 90. In this case, the second interchangeable lens 300 does not include the terminal (DLC2 terminal) that corresponds to the second communication unit as described above. Therefore, even if the second interchangeable lens 300 is mounted on the camera body 100 with the adaptor 400 therebetween, second communication is not performed. That is, in the case where the second interchangeable lens 300 is mounted on the camera body 100 with the adaptor 400 therebetween, the DLC2 terminal, which corresponds to the second communication unit, is not used between the camera body 100 and the second interchangeable lens 300.

Therefore, in the case where the second interchangeable lens 300 is mounted on the camera body 100 with the adaptor 400 therebetween, even if a short circuit occurs between the LCLK terminal and the DLC2 terminal, a failure does not occur in an electric circuit, such as the adaptor controller 401, in the adaptor 400. Even if a short circuit occurs between the LCLK terminal and the DLC2 terminal, the resistance is divided on the basis of the resistors provided in the second interchangeable lens 300, the adaptor 400, and the camera body 100, and a voltage to be applied to each of the terminals can be suppressed to the upper-limit voltage of the terminal or lower, which will be described in detail below. That is, it is desirable to arrange the terminal (DLC2 terminal) that corresponds to the second communication unit adjacent to the terminal that corresponds to the first communication unit. With this configuration, in the camera body 100 and in the adaptor 400 according to this embodiment, a failure in an electric circuit included in the adaptor 400 and a failure in an electric circuit included in the camera body 100 can be prevented.

In a case where the first interchangeable lens 200 is mounted on the camera body 100, the communication voltage of the first communication unit and that of the second communication unit are the same (3.0 V). In this case, even in a case where a short circuit occurs between the LCLK terminal and the DLC2 terminal, a voltage equal to or higher than the upper-limit voltage is not applied to an element, such as the I/F unit 102, of the camera body 100 as described above.

In the case where the first interchangeable lens 200 is mounted on the camera body 100, second communication and third communication may be simultaneously used independently of each other. In this case, even if a short circuit occurs between the DLC2 terminal corresponding to the second communication unit and the DCA terminal corresponding to the third communication unit, the communication voltage of the second communication unit and that of the third communication unit are the same (3.0 V), and therefore, a voltage equal to or higher than the operating voltage is not applied to the second/third communication I/F unit 102*b*.

As described above, it is desirable to dispose the terminal (DLC2 terminal) corresponding to the second communication unit next to the terminal corresponding to the first communication unit and to dispose the terminal (CS terminal or DCA terminal) corresponding to the third communication unit next to the terminal corresponding to the second communication unit on the side opposite the terminal corresponding to the first communication unit. That is, it is desirable to dispose the terminal corresponding to the third communication unit adjacent to the DLC2 terminal corresponding to the second communication unit on one side of the DLC2 terminal opposite the LCLK terminal corresponding to the first communication unit, the LCLK terminal being disposed adjacent to the DLC2 terminal on the other side, so that the DLC2 terminal is disposed between the LCLK terminal and the terminal corresponding to the third communication unit. With this configuration, even in a case where an interchangeable lens is mounted directly or indirectly on the camera body 100, a failure that may occur in an electric circuit in the camera body 100 and in an electric circuit in the adaptor 400 can be prevented.

Now, a voltage applied to each interface unit within the camera body 100 is described in detail. Here, a case is assumed where the second interchangeable lens 300 is mounted on the camera body 100 with the adaptor 400 therebetween. In this case, the signal lines of the LCLK terminals are pull-up connected to VDD (5.0 V) via the resistor R_LCLK_C 120 in the camera body 100 and via the resistor R_LCLK_L 320 in the second interchangeable lens 300 respectively. The DLC2 terminals are pull-down connected to the signal lines of the DGND terminals via the resistor R_DLC2_C 122 provided within the camera body 100 and via the resistor R_DLC2_A 422 provided within the adaptor 400 respectively.

Here, the combined resistance of R_LCLK_C 120 and R_LCLK_L 320 is denoted as R_LCLK, and the combined resistance of R_DLC2_C 122 and R_DLC2_A 422 is denoted as R_DLC2. A voltage that is applied to the signal line of the LCLK terminal and that of the DLC2 terminal in a case of a short circuit between the terminals as described above is denoted as V_ST1. Then, the combined resistance R_LCLK, the combined resistance R_DLC2, and the applied voltage V_ST1 are respectively calculated by using expressions (1), (2), and (3) below.

$$R\_LCLK=1/((1/R\_LCLK\_C\ 120)+(1/R\_LCLK\_L\ 320)) \quad (1)$$

$$R\_DLC2=1/((1/R\_DLC2\_C\ 122)+(1/R\_DLC2\_A\ 422)) \quad (2)$$

$$V\_ST1=5.0\times(R\_DLC2/(R\_LCLK+R\_DLC2)) \quad (3)$$

For example, in a case where R_LCLK is set to 10 kΩ, and R_DLC2 is set to 100 kΩ, expressions (1), (2), and (3) are used to obtain the applied voltage V_ST1≅4.5 V. As a result, a voltage that exceeds the upper-limit voltage (3.0 V) of the second/third communication I/F unit 102*b* is applied.

Accordingly, in this embodiment, for example, R_LCLK is set to 10 kΩ and R_DLC2 is set to 10 kΩ to adjust the applied voltage so that the applied voltage, which is V_ST1=2.5 V, is equal to or lower than the upper-limit voltage (3.0 V) of the second/third communication I/F unit 102*b*. To set the applied voltage to a value equal to or lower than the upper-limit voltage of the second/third communication I/F unit 102*b*, expression (4) below needs to be satisfied.

$$(R\_DLC2/(R\_LCLK+R\_DLC2))(3.0/VDD) \quad (4)$$

When the resistance of R_LCLK_C 120, that of R_LCLK_L 320, that of R_DLC2_C 122, and that of R_DLC2_A 422 are set so as to satisfy expression (4) above, the second/third communication I/F unit 102*b* can be protected from overvoltage.

In this embodiment, the camera controller 101 detects the LCLK terminal switching from the Low level to the High level immediately after a predetermined interchangeable lens is mounted, as described above. In a case where the interchangeable lens is the second interchangeable lens 300, the camera controller 101 performs open-drain-output-type communication with the second interchangeable lens 300 to determine, via the communication, whether the second interchangeable lens 300 supports CMOS-output-type communication. If the second interchangeable lens 300 is determined to support CMOS-output-type communication, the camera controller 101 switches the output system of the LCLK terminal and the DCL terminal to the CMOS output type. In the case where the camera controller 101 switches the output type of the LCLK terminal and the DCL terminal to the CMOS output type, a voltage indicated by the LCLK terminal 1008 is equal to a power voltage (5.0 V) output from the first communication I/F unit 102*a* without passing through R_LCLK_C 120.

It is assumed that the Low-level input threshold (VIL_LCLK) for the input terminal of the first communication I/F unit 102*a* for the LCLK signal is 0.5 V and that R_LCLK=10 kΩ, R_DLC2_A 422=470Ω, and R_DLC2_C 122=10 kΩ are satisfied. In this case, the applied voltage V_ST1≅0.2 V obtained on the basis of expressions (2) and (3) is smaller than the Low-level input threshold for the first communication I/F unit 102*a*. Therefore, the camera controller 101 determines that communication with the interchangeable lens is not possible, and performs control so as not to start communication with the lens.

With this configuration, in the camera body 100, the output type of the LCLK terminal does not switch to the CMOS output type. Accordingly, a voltage equal to or higher than the upper-limit voltage can be prevented from being applied to an element, such as the second/third communication I/F unit 102*b*. To prevent the output type of the LCLK terminal from switching to the CMOS output type in the camera body 100, expression (5) below needs to be satisfied.

$$(R\_DLC2/(R\_LCLK+R\_DLC2))<VIL\_LCLK \quad (5)$$

When the resistance of R_LCLK_C 120, that of R_LCLK_L 320, that of R_DLC2_C 122, and that of R_DLC2_A 422 are set so as to satisfy expression (5) above, the second/third communication I/F unit 102*b* can be protected from overvoltage.

However, even in a case where expression (5) above is satisfied, if the resistance of R_DLC2_C 122 is small, the terminal current of the first lens I/F unit 202 needs to be set to have a large value in a case of second communication using the DLC2 terminal. This corresponds to a case where, for example, R_DLC2_A 422 is set to 10 kΩ and R_DLC2_C 122 is set to 470Ω. In this embodiment, the resistances are set so that R_DLC2_A 422=470Ω is smaller than R_DLC2_C 122=10 kΩ by taking into consideration second communication.

As illustrated in FIG. 17D, the case is assumed where the LCLK terminal and the DLC2 terminal are arranged adjacent to each other and where the contact pin of the DLC2 terminal 1009 provided in the camera body 100 is bent and a short circuit occurs between the DLC2 terminal 1009 and the adjacent LCLK terminal. Terminal processing for the LCLK terminal and the DLC2 terminal is performed as described above, and therefore, a description thereof will be omitted.

In the case as illustrated in FIG. 17D, a voltage applied to the LCLK terminal and to the DLC2 terminal 1009 of the camera body 100 is denoted as V_ST2. In this case, the applied voltage V_ST2 is calculated by using expression (6).

$$V\_ST2 = 5.0 \times R\_DLC2\_C\ 122/(R\_LCLK+R\_DLC2\_C\ 122) \qquad (6)$$

It is assumed that, for example, R_LCLK is equal to 10 kΩ and R_DLC2_C 122 is equal to 100 kΩ. Then, expressions (1) and (6) are used to obtain V_ST2=4.5 V. As a result, a voltage that exceeds the upper-limit voltage (3.0 V) of the second/third communication I/F unit 102*b* is applied. In this case, a failure may occur in an electric circuit, such as the second/third communication I/F unit 102*b*, in the camera body 100 as described above.

Accordingly, in this embodiment, for example, R_LCLK is set to 10 kΩ and R_DLC2_C 122 is set to 10 kΩ to adjust the applied voltage so that the applied voltage, which is V_ST2=2.5 V, is equal to or lower than the upper-limit voltage (3.0 V) of the second/third communication I/F unit 102*b*. To make the applied voltage be equal to or lower than the upper-limit voltage of the second/third communication I/F unit 102*b*, expression (7) below needs to be satisfied. The High-level input threshold for the input terminal of the second/third communication I/F unit 102*b* for the DLC2 signal is denoted as VIH_DLC2.

$$VIH\_DLC2 \leq R\_DLC2/(R\_LCLK+R\_DLC2) \leq (3.0/VDD) \qquad (7)$$

When the resistance of R_LCLK_C 120, that of R_LCLK_L 320, and that of R_DLC2_C 122 are set so as to satisfy expression (7) above, the second/third communication I/F unit 102*b* can be protected from overvoltage.

Here, in a case where the second interchangeable lens 300 is mounted on the camera body 100 with the adaptor 400 therebetween, the DLC2 terminal is pull-down connected to the DGND signal line via the resistance (resistor) R_DLC2_A 422 provided within the adaptor 400. In this case, it is anticipated that a Low-level voltage is input to the DLC2 input terminal (DLC2_IN) provided in the camera controller 101.

It is assumed that the High-level input threshold VIH_DLC2 for the input terminal for the DLC2 signal is 2.3 V, R_LCLK is 10 kΩ, and R_DLC2_C 122 is 10 kΩ. In this case, the applied voltage V_ST2 calculated using expression (6) is 2.5 V and exceeds the voltage level of the threshold VIH_DLC2, and therefore, the camera controller 101 determines that the DLC2 terminal outputs the High-level voltage. Therefore, the High-level voltage is input to the DLC2 input terminal (DLC2_IN) instead of the Low-level voltage, which is anticipated to be input. Accordingly, the abnormal state of the terminal can be detected in this case (error detection). Then, the LCLK terminal 1008 keeps the output state of the open drain type, and a warning is displayed to encourage the user to check the state of the terminals provided in each mount (error processing).

With this configuration, even in the case where a short circuit occurs between the LCLK terminal and the DLC2 terminal due to terminal bending, the LCLK terminal 1008 of the camera body 100 does not switch to a CMOS-output-type terminal, and the second/third communication I/F unit 102*b* can be protected from overvoltage.

When such switching is performed in accordance with the mounted interchangeable lens so as to make the communication voltage of the second and third communication units equal to a voltage of the first communication unit, a failure in an electric circuit that may occur in a case of a short circuit between terminals can be prevented. However, to reduce power consumption relating to communication and to make communication faster, the communication voltage of the second and third communication units are set so as to be equal to the lowest voltage among the communication voltages of the first communication unit.

An embodiment of the present invention has been describe above; however, the present invention is not limited to this, and various modifications and changes can be made. For example, in the above-described embodiment, the case has been described where a digital camera is employed as an example of the camera body 100, which is an image capturing apparatus; however, an image capturing apparatus, such as a digital video camera or a security camera, other than a digital camera may be employed.

In the above-described embodiment, the case has been described where an interchangeable lens, an adapter, and an intermediate accessory are employed as examples of the camera accessories of the present invention; however, the camera accessories are not limited to these. As the camera accessories, any device other than those described above may be employed as long as the device can be directly or indirectly coupled to (mounted on) the camera mount A of the camera body 100.

In the above-described embodiment, as illustrated in FIGS. 4A and 4B, the direction in which the lens mount B is rotated relative to the camera mount A clockwise when the camera body 100 is viewed from the side that faces an object in a case of image capturing is defined as the mount direction; however, the mount direction is not limited to this. For example, the direction in which the lens mount B is rotated relative to the camera mount A counterclockwise when the camera body 100 is viewed from the side that faces an object in a case of image capturing may be defined as the mount direction. In this case, at least the terminals disposed on each mount described above need to be arranged in the reverse order.

The terms "furthest" and "nearest" in the mount direction of the lens mount described above indicate the positions within a range in which, when a camera accessory is mounted on the camera body 100, the terminals corresponding to both the camera mount and the lens mount are present. Therefore, in a case where, for example, a terminal that is not included in the camera body 100 is present in a mount of a camera accessory that can be mounted on the camera body 100, the position at which the terminal is disposed is not limited. Also for an image capturing apparatus on which each camera accessory described in the above-described embodiment can be mounted, in a case where a terminal not included in the camera accessory is present, the position at which the terminal is disposed is not limited.

In the above-described embodiment, the case has been described where the terminals provided in the mount of the image capturing apparatus are contact pins, and the terminals provided in a mount of the accessory are contact faces; however, the terminals are not limited to these. For example, a configuration may be employed in which contact faces are provided in the mount of the image capturing apparatus, contact pins corresponding to the contact faces are provided in a mount of the accessory, and each of the contact faces and a corresponding one of the contact pins can be electrically connected to each other. In this case, the features of the camera mount and those of the accessory mount described in the above-described embodiment can be realized in the corresponding accessory mount and lens mount.

Regarding the image capturing apparatus and the accessories according to the above-described embodiment, in a case where, for example, the terminals provided in the camera mount are assumed to be contact faces, the width of each contact face provided in the camera mount in the circumferential direction may be adjusted as appropriate. In a case where the terminals provided in the accessory mount are assumed to be contact pins, the inter-pin pitch for each contact pin provided in the accessory mount may be adjusted as appropriate.

In the above-described embodiment, the case has been described where the computer program that follows the flows illustrated in FIG. 12 and FIG. 13 is stored in advance in a memory (not illustrated) and the camera controller 101 executes the program; however, the present invention is not limited to this. For example, the program may be in any form, such as an object code, a program executed by an interpreter, or script data supplied to the operating system (OS), as long as the program has the functions thereof. A recording medium that corresponds to the memory from which the program is supplied may be, for example, a magnetic recording medium, such as a hard disk or a magnetic tape, or an optical/magneto-optical recording medium.

Although a configuration has been described in the above embodiment where a device having one of a camera mount and an accessory mount is actually rotated as to a device having the other mount, thereby bayonet-coupling the devices to each other, this is not restrictive. For example, a configuration may be employed where a camera mount and accessory mount are relatively rotated, and the camera mount and accessory mount are bayonet-coupled. Specifics of this will be described in detail below.

Figure 20:
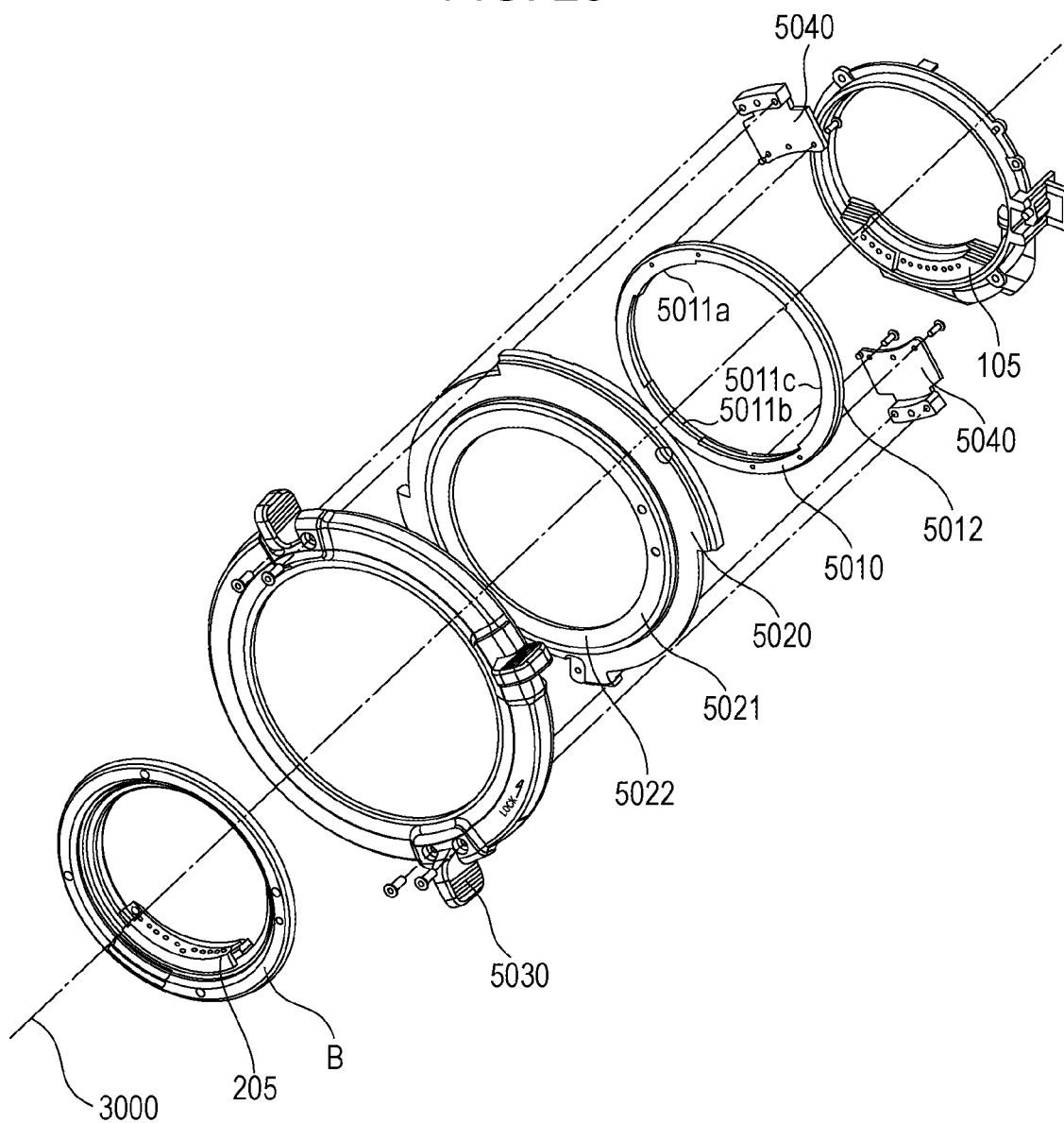
FIG. 20 is a disassembled perspective view of a mount mechanism according to a modification of the present invention.
Figure 21A:
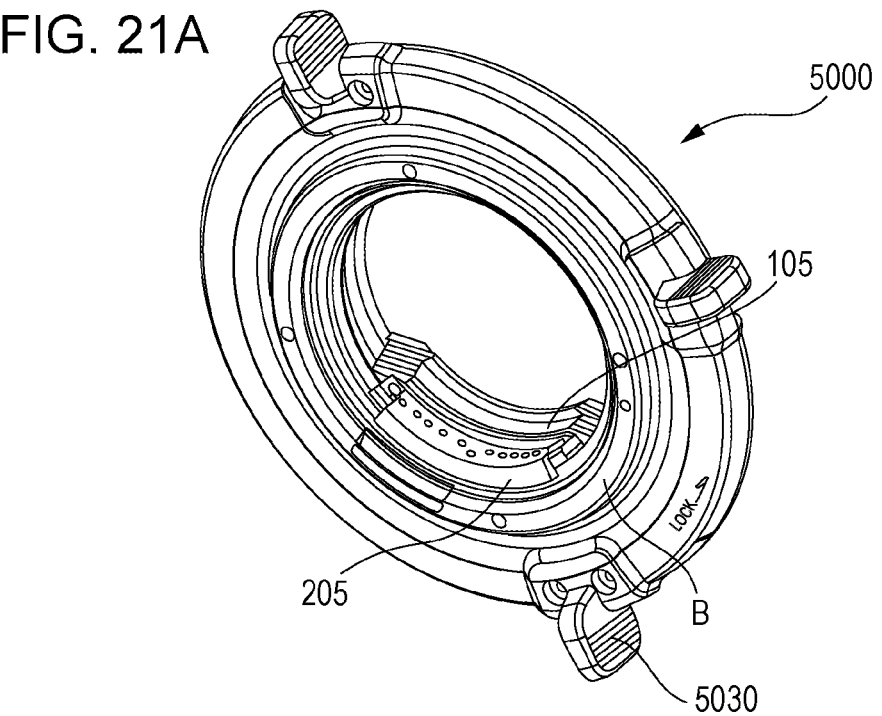
FIGS. 21A through 21C are diagrams for exemplarily describing a non-coupled state of the mount mechanism according to the modification of the present invention.
Figure 21B:
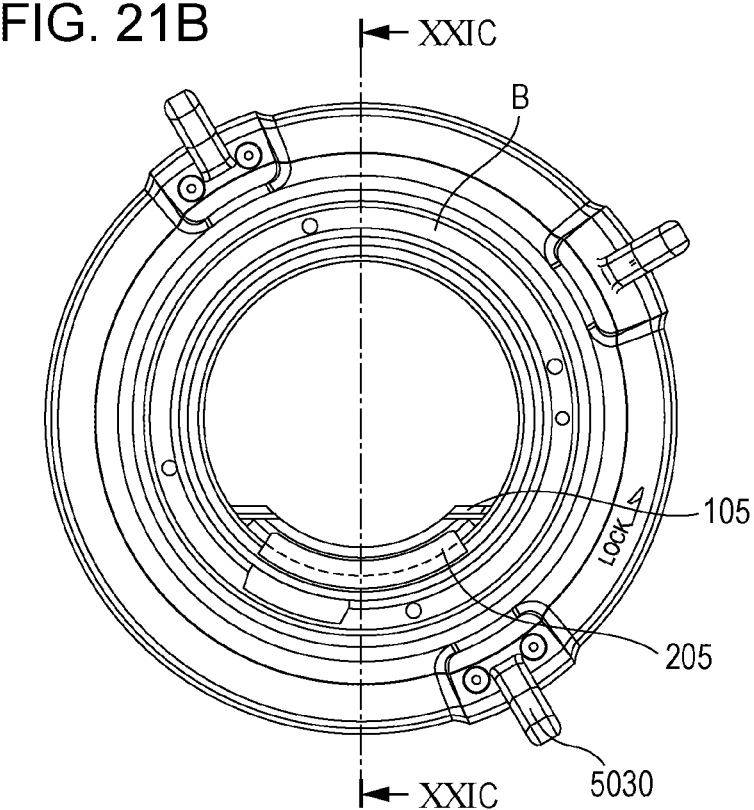
Figure 21C:
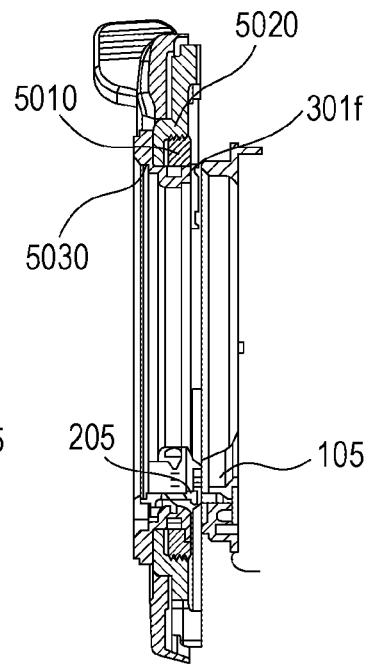
Figure 22A:
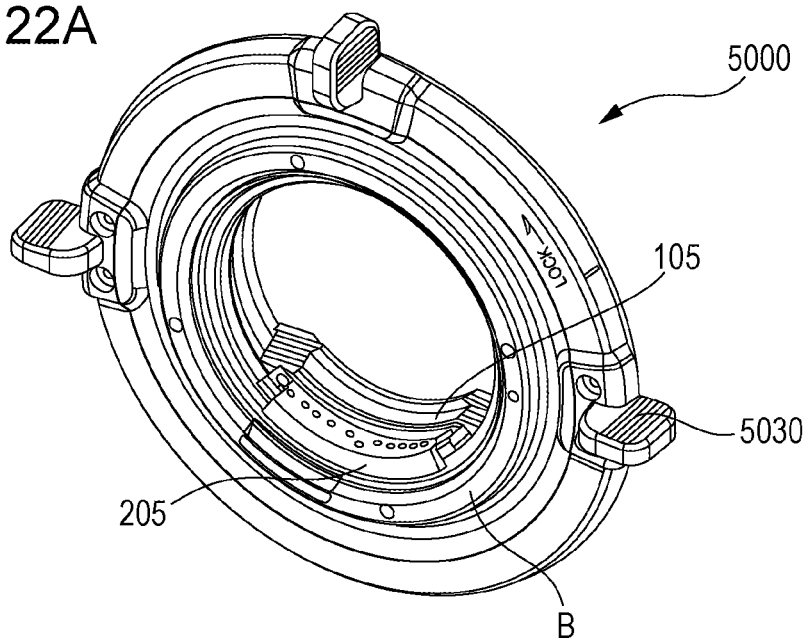
FIGS. 22A through 22C are diagrams for exemplarily describing a coupled state of the mount mechanism according to the modification of the present invention.
Figure 22B:
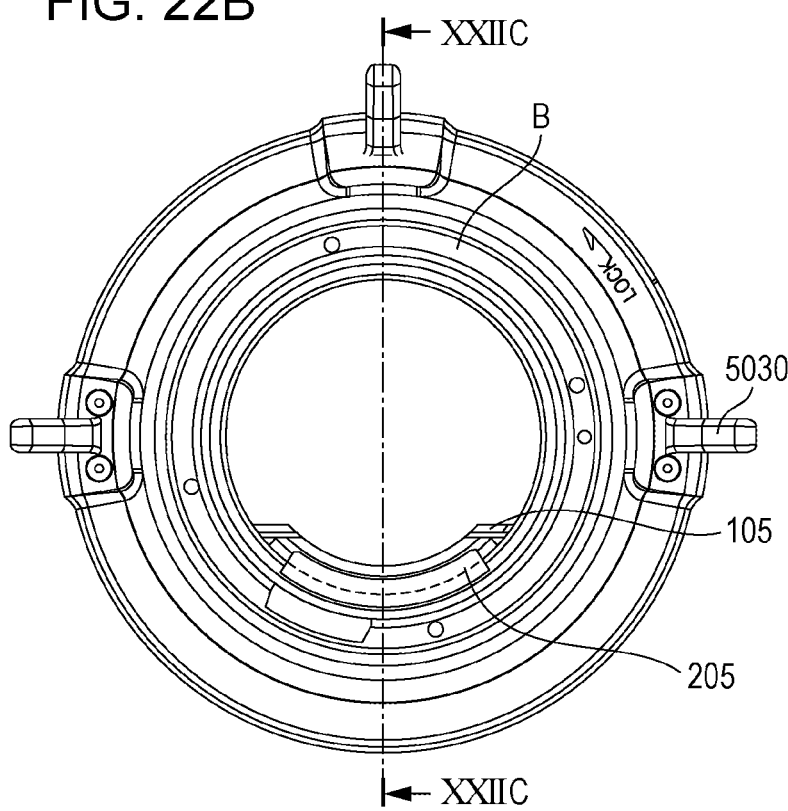
Figure 22C:
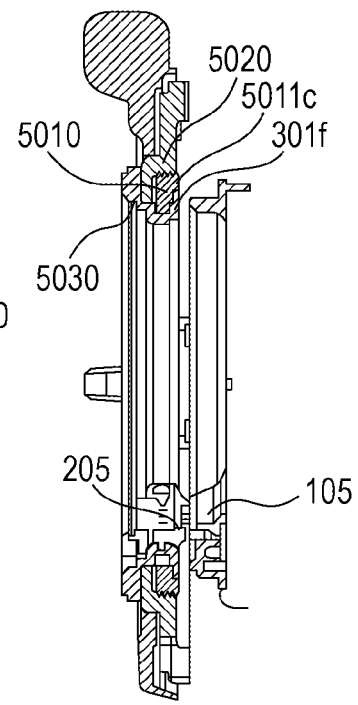

FIG. 20 is a disassembled perspective view of a mount mechanism 5000 according to a modification of the present invention. FIGS. 21A through 21C are diagrams for exemplarily describing a non-coupled state of the mount mechanism 5000 according to the modification of the present invention. FIGS. 22A through 22C are diagrams for exemplarily describing a coupled state of the mount mechanism 5000 according to the modification of the present invention. In FIGS. 20 through 22C, the lens mount that is capable of bayonet-coupling to a movable mount portion 5010 of the mount mechanism 5000 is also illustrated, for the same of description.

As illustrated in FIG. 20, the mount mechanism 5000 according to the present embodiment has, in order from the side to which the lens mount is attached, an operation portion 5030, a fixed mount portion 5020, the movable mount portion 5010, and the contact holding member 105, centered on the optical axis 3000. The operation portion 5030 is ring-shaped operating means capable of rotating on a center axis, and is fixed to the movable mount portion 5010 by screws, by arm portions 5040. Note that in the present modification, the operation portion 5030 and movable mount portion 5010 are fixed at two positions, using two arm portions 5040 disposed in an orthogonal direction as to the center axis. According to this configuration, by the operation portion 5030 being rotationally operated, the movable mount portion 5010 also rotates integrally with the center axis as the center.

Provided on the movable mount portion 5010 are movable mount claws 5011a, 5011b, and 5011c, that are each capable of bayonet-coupling with bayonet claws 301a through 301c provided to the lens mount. Also provided to the movable mount portion 5010 is a screw portion 5012 that has been threaded around the center axis, and the screwed state as to a later-described screw portion 5022 of the fixed mount portion 5020 changes in accordance with the rotation of the movable mount portion 5010 around the center axis.

The fixed mount portion 5020 has a camera mount face 5021 that comes into contact with the mount face of the lens mount, and the screw portion 5022 with which the screw portion 5012 of the above-described movable mount portion 5010 is screwed. Unlike the above-described movable mount portion 5010, the fixed mount portion 5020 does not rotate on the center axis in accordance with rotation operations of the operation portion 5030.

Next, the bayonet coupling method of the mount mechanism 5000 according to the present modification will be described with reference to FIGS. 21A through 22C. Note that the bayonet claws provided to the lens mount are in a state of being capable to engage the movable mount claws 5011a through 5011c of the movable mount portion 5010, in a state of being passed through an opening portion of the operation portion 5030 and an opening portion of the fixed mount portion 5020. The state illustrated in FIGS. 21A through 21C is a state where the operation portion 5030 is situated at an unlocked position. In this state, the lens mount face of the lens mount and the camera mount face 5021 of the fixed mount portion 5020 are in contact, but the claws of each of the lens mount and movable mount portion 5010 do not engage each other, and do not overlap, as viewed from the center axis direction. FIG. 21C is a cross-sectional diagram taken along cross-section XXIC-XXIC in FIG. 21B. FIGS. 22A through 22C exemplify the mount mechanism 5000 in a state where the operation portion 5030 has been rotationally operated from this state.

The state illustrated in FIGS. 22A through 22C is a state where the operation portion 5030 is situated in a locked position. In this state, the claws of each of the lens mount and movable mount portion 5010 overlap each other, and thereby are engaged in the center axis direction. In this state, the screwing state of the screw portion 5022 of the fixed mount portion 5020 and the screw portion 5012 of the movable mount portion 5010 changes in accordance with rotational operation of the operation portion 5030, and the movable mount portion 5010 moves toward the imaging device side in the center axis direction. FIG. 22C is a cross-sectional diagram taken along cross-section XXIIC-XXIIC in FIG. 22B. As illustrated in FIGS. 21C and 22C, the movable mount portion 5010 moves away from the fixed mount portion 5020 in a center axis direction of the mount depend on a non-locking state of the mount mechanism 5000 changing in a lock state of the mount mechanism 5000. According to this configuration, each of the movable mount claws 5011a through 5011c in a state of being engaged with the bayonet claws at the lens mount side moves toward the imaging apparatus side.

As described above, the mount mechanism 5000 can move the movable mount portion in the center axis direction as to the fixed mount portion, by rotating the movable mount portion that has claws capable of engaging lens-mount-side claws on the center axis. According to this configuration, the mount mechanism 5000 according to the present embodiment can reduce occurrence of gaps (looseness) that occurs between the lens mount and camera-side mount in a coupled state.

Although a configuration has been described in the above modification where the mount mechanism 5000 is provided to the imaging apparatus side, this can be applied to a configuration where the mount mechanism 5000 is provided to a camera accessory side, such as an interchangeable lens or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108275 filed May 31, 2017, which is hereby incorporated by reference herein in its entirety.

What is claimed is:

1. A mount apparatus comprising a second mount configured to allow coupling to a first mount included in an accessory, the accessory being mountable on and dismountable from the mount apparatus by rotating a plurality of claw portions of the first mount relative to a plurality of claw portions of the second mount in a mount direction substantially orthogonal to a center-axis direction of the second mount, wherein the mount apparatus includes
a plurality of terminals configured to be used in electrical connection, and
a terminal holder configured to hold the plurality of terminals,
the terminal holder has a height level difference for holding the plurality of terminals at different positions in the center-axis direction of the second mount,
the plurality of terminals include a first terminal configured to be used to supply power for driving an internal component of the accessory, and a second terminal configured to be used to supply power for controlling communication with the accessory,
wherein the terminal holder has a first stage and a second stage at different positions in the center-axis direction,
in a state where the accessory is mounted on the mount apparatus, the second stage projects toward the accessory in the center-axis direction further that the first stage,
the first stage is located nearer than the second stage in the mount direction,
among the plurality of terminals, the first terminal and the second terminal are adjacent to each other and are disposed further in the mount direction than the other terminals of the plurality of terminals on the second stage of the terminal holder,
the second terminal is disposed further than the first terminal in the mount direction on the second stage, and
an inter-terminal pitch between the first terminal and the second terminal is wider than at least one pitch among inter-terminal pitches of terminals other than the first terminal and the second terminal.

2. The mount apparatus according to claim 1, wherein the second terminal is disposed furthest in the mount direction on the second stage of the terminal holder, and the first terminal is disposed nearer from the first stage than the second terminal in the mount direction.

3. The mount apparatus according to claim 1, wherein among the plurality of terminals, the number of terminals disposed on the first stage is different from the number of terminals disposed on the second stage.

4. The mount apparatus according to claim 1, wherein among the plurality of terminals, the number of terminals disposed on the second stage is smaller than the number of terminals disposed on the first stage.

5. The mount apparatus according to claim 4, wherein the plurality of terminals include a third terminal located on the second stage of the terminal holder and configured to indicate a ground level corresponding to the first terminal, and
the third terminal is disposed nearer from the first stage than the second terminal in the mount direction.

6. The mount apparatus according to claim 5, wherein the plurality of terminals include a fourth terminal located between the first terminal and the third terminal on the second stage of the terminal holder, and
among the plurality of terminals on the second stage of the terminal holder, the third terminal is disposed nearest in the mount direction.

7. The mount apparatus according to claim 6, wherein the fourth terminal is provided with a protective element on a signal line connected to the fourth terminal, and is not a terminal for communication with the accessory.

8. The mount apparatus according to claim 7, wherein
the plurality of terminals include a fifth terminal located further than the other terminals in the mount direction on the first stage, and
the fifth terminal is configured to be used to detect mounting of the accessory on the mount apparatus.

9. The mount apparatus according to claim 8, wherein
the plurality of terminals include a sixth terminal located nearer than the other terminals in the mount direction on the first stage, and
the sixth terminal is configured to indicate a ground level corresponding to the fourth terminal.

10. The mount apparatus according to claim 9, wherein
the plurality of terminals include a seventh terminal through a twelfth terminal on the first stage, and
the seventh terminal through the twelfth terminal are configured to be used to communicate to the accessory and to be disposed between the fifth terminal and the sixth terminal.

11. The mount apparatus according to claim 6, wherein
the inter-terminal pitch between the first terminal and the second terminal is at least wider than an inter-terminal pitch between the first terminal and the fourth terminal.

12. The mount apparatus according to claim 4, wherein
the inter-terminal pitch between the first terminal and the second terminal is at least wider than an inter-terminal pitch between the terminals of the plurality of terminals that are held on the first stage of the terminal holder.

13. The mount apparatus according to claim 1, wherein
The second mount is ring shaped,
the plurality of terminals are disposed in a circumferential direction of the second mount and contact pins electrically connectable to a plurality of terminals of the accessory, and
the inter-terminal pitch is a distance between a center of a contact pin corresponding to a corresponding one of the plurality of terminals and exposed outside the terminal holder and a center of an adjacent contact pin corresponding to a corresponding one of the plurality of terminals and exposed outside the terminal holder.

14. The mount apparatus according to claim 1, wherein
the second mount is ringing shaped,
the plurality of terminals are disposed in a circumferential direction of the second mount and contact pins electrically connectable to the plurality of terminals of the accessory, and
the inter-terminal pitch is a distance between a point of connection of one of the terminals with a corresponding one of the terminals of the accessory and a point of connection of an adjacent terminal with a corresponding one of the terminals of the accessory.

15. The mount apparatus according to claim 1, wherein
the second terminal is disposed further from the first stage than the first terminal in the mount direction.

16. The mount apparatus according to claim 1, wherein
the mount apparatus is provided on an imaging apparatus or an adapter device being mountable on and dismountable from an imaging apparatus.

17. An accessory comprising a second mount configured to allow coupling to a first mount included in an image capturing apparatus, the accessory being mountable on and dismountable from the image capturing apparatus by rotating a plurality of claw portions of the second mount relative to a plurality of claw portions of the first mount in a mount direction substantially orthogonal to a center-axis direction of the second mount, wherein
the accessory includes
a plurality of terminals configured to be used in electrical connection, and
a terminal holder configured to hold the plurality of terminals,
the terminal holder has a height level difference for holding the plurality of terminals at different positions in the center-axis direction of the second mount,
the plurality of terminals include a first terminal configured to receive power for driving an internal component from the image capturing apparatus, and a second terminal configured to receive power supplied for controlling communication with the image capturing apparatus,
wherein the terminal holder has a first stage and a second stage at different positions in the center-axis direction,
in a state where the accessory is mounted on the imaging apparatus, the first stage projects toward the imaging apparatus in the center-axis direction further than the second stage,
the first stage is located nearer than the second stage in the mount direction,
among the plurality of terminals, the first terminal and the second terminal are adjacent to each other and are disposed further in the mount direction than the other terminals of the plurality of terminals on the second stage of the terminal holder,
the second terminal is disposed further than the first terminal in the mount direction on the second stage, and
an inter-terminal pitch between the first terminal and the second terminal is wider than at least one pitch among inter-terminal pitches of terminals other than the first terminal and the second terminal.

18. The accessory according to claim 17, wherein
the second terminal is disposed furthest in the mount direction on the second stage of the terminal holder, and
the first terminal is disposed nearer from the first state than the second terminal in the mount direction.

19. The accessory according to claim 17, wherein
among the plurality of terminals, the number of terminals disposed on the first stage is different from the number of terminals disposed on the second stage.

20. The accessory according to claim 17, wherein
among the plurality of terminals, the number of terminals disposed on the second stage is smaller than the number of terminals disposed on the first stage.

21. The accessory according to claim 20, wherein
the plurality of terminals include a third terminal located on the second stage of the terminal holder and configured to indicate a ground level corresponding to the first terminal, and
the third terminal is disposed nearer from the first stage than the second terminal in the mount direction.

22. The accessory according to claim 21, wherein
the plurality of terminals include a fourth terminal located between the first terminal and the third terminal on the second stage of the terminal holder, and
among the plurality of the terminals on the second stage of the terminal holder, the third terminal is disposed nearest in the mount direction.

23. The accessory according to claim 22, wherein
the fourth terminal is not a terminal for communication with the image capturing apparatus.

24. The accessory according to claim 23, wherein
the plurality of terminals include a fifth terminal located further than the other terminals in the mount direction on the first stage, and the fifth terminal is configured to be used to detect mounting of the accessory on the image capturing apparatus.

25. The accessory according to claim 24, wherein
the plurality of terminals include a sixth terminal located nearer than the other terminals in the mount direction on the first stage, and
the sixth terminal is configured to indicate a ground level corresponding to the fourth terminal.

26. The accessory according to claim 25, wherein
the plurality of terminals include a seventh terminal through a twelfth terminal on the first stage, and
the seventh terminal through the twelfth terminal are configured to be used to communicate to the image capturing apparatus and to be disposed between the fifth terminal and the sixth terminal.

27. The accessory according to claim 22, wherein
the inter-terminal pitch between the first terminal and the second terminal is at least wider than an inter-terminal pitch between the first terminal and the fourth terminal.

28. The accessory according to claim 20, wherein
The second mount is ring shaped,
the plurality of terminals are disposed in a circumferential direction of the second mount and contact faces electrically connectable to a plurality of terminals of the image capturing apparatus,
the first terminal and the second terminal have a width in the circumferential direction of the second mount identical to a width of at least one terminal other than the first terminal and the second terminal among the plurality of terminals in the circumferential direction of the second mount, and
the inter-terminal pitch between the first terminal and the second terminal is at least wider than an inter-terminal pitch between the terminals that are held on the first stage of the terminal holder.

29. The accessory according to claim 17, wherein
the second mount is ring shaped, and
in a circumferential direction of the second mount, the inter-terminal pitch is a distance between a center of a contact face corresponding to a corresponding one of the plurality of terminals and exposed outside the terminal holder and a center of an adjacent contact face corresponding to a corresponding one of the plurality of terminals and exposed outside the terminal holder.

30. The accessory according to claim 17, wherein
the second mount is ring shaped, and
in a circumferential direction of the second mount, the inter-terminal pitch is a distance between a point of connection of one of the terminals with a corresponding one of the terminals of the image capturing apparatus and a point of connection of an adjacent terminal with a corresponding one of the terminals of the image capturing apparatus.

31. The accessory according to claim 17, wherein the second terminal is disposed further from the first stage than the first terminal in the mount direction.

32. The accessory according to claim 17, wherein the accessory is an interchangeable lens or an adapter device being mountable on and dismountable from an image capturing apparatus.

* * * * *